US008103445B2

(12) United States Patent
Smith et al.

(10) Patent No.: US 8,103,445 B2
(45) Date of Patent: Jan. 24, 2012

(54) DYNAMIC MAP RENDERING AS A FUNCTION OF A USER PARAMETER

(75) Inventors: Leonard Smith, Seattle, WA (US); Gur Kimchi, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 754 days.

(21) Appl. No.: 11/621,006

(22) Filed: Jan. 8, 2007

(65) Prior Publication Data
US 2007/0273558 A1 Nov. 29, 2007

Related U.S. Application Data

(63) Continuation-in-part of application No. 11/354,790, filed on Feb. 15, 2006, now Pat. No. 7,466,244, which is a continuation-in-part of application No. 11/246,774, filed on Oct. 7, 2005.

(60) Provisional application No. 60/673,442, filed on Apr. 21, 2005.

(51) Int. Cl.
*G01C 21/30* (2006.01)
*G06F 17/30* (2006.01)
*G08G 1/123* (2006.01)
(52) U.S. Cl. ............... 701/208; 707/634; 340/995.14
(58) Field of Classification Search .......... 701/200–226; 707/E17.009, E17.119, E17.01, E17.032, 707/E17.11, 100; 340/995.14; 345/427
See application file for complete search history.

(56) References Cited

U.S. PATENT DOCUMENTS

| 5,652,717 | A |   | 7/1997 | Miller et al. |
|---|---|---|---|---|
| 5,917,898 | A |   | 6/1999 | Bassa et al. |
| 5,999,892 | A |   | 12/1999 | Fan |
| 6,041,335 | A | * | 3/2000 | Merritt et al. ............... 715/203 |
| 6,092,076 | A |   | 7/2000 | McDonough et al. |
| 6,100,897 | A |   | 8/2000 | Mayer et al. |
| 6,101,498 | A |   | 8/2000 | Scaer et al. |
| 6,144,318 | A |   | 11/2000 | Hayashi et al. |
| 6,150,961 | A |   | 11/2000 | Alewine et al. |
| 6,163,749 | A |   | 12/2000 | McDonough et al. |

(Continued)

FOREIGN PATENT DOCUMENTS
GB      2387244      10/2003
(Continued)

OTHER PUBLICATIONS

Roofshout; http://www.roofshout.com;2 pages; last viewed Apr. 12, 2006.

(Continued)

*Primary Examiner* — James Trammell
*Assistant Examiner* — Muhammad Shafi
(74) *Attorney, Agent, or Firm* — Shook, Hardy & Bacon L.L.P.

(57) ABSTRACT

Provided is a single repository for capturing, connecting, sharing, and visualizing information based on a geographic location, for example. Detailed information can be dynamically rendered as a function of a user parameter, which can include a user demographic, a user profile, and a user preference information. Map information and advertisements displayed in conjunction with the map information can be dynamically rendered as a function of a user advertising preference. If a user prefers one product over another product, a first advertisement for the less preferred product can be replaced with a second advertisement for the preferred product.

4 Claims, 37 Drawing Sheets

U.S. PATENT DOCUMENTS

| | | | |
|---|---|---|---|
| 6,314,370 B1 | 11/2001 | Curtwright | |
| 6,369,720 B1 | 4/2002 | Wilhelm | |
| 6,480,885 B1 * | 11/2002 | Olivier | 709/207 |
| 6,594,576 B2 | 7/2003 | Fan et al. | |
| 6,629,136 B1 | 9/2003 | Naidoo | |
| 6,711,493 B1 | 3/2004 | Andrews et al. | |
| 6,772,142 B1 | 8/2004 | Kelling et al. | |
| 6,912,462 B2 | 6/2005 | Ogaki | |
| 7,098,909 B2 | 8/2006 | Hayano et al. | |
| 7,106,219 B2 | 9/2006 | Pearce | |
| 7,130,865 B2 | 10/2006 | Moore | |
| 7,161,504 B2 | 1/2007 | Linn | |
| 7,188,025 B2 | 3/2007 | Hudson | |
| 7,289,904 B2 | 10/2007 | Uyeki | |
| 7,324,666 B2 | 1/2008 | Zoken et al. | |
| 7,340,077 B2 | 3/2008 | Gokturk et al. | |
| 2001/0014185 A1 | 8/2001 | Chitradon et al. | |
| 2001/0034588 A1 * | 10/2001 | Agrawals et al. | 703/2 |
| 2002/0035609 A1 | 3/2002 | Lessard et al. | |
| 2002/0067353 A1 | 6/2002 | Kenyon et al. | |
| 2002/0083118 A1 | 6/2002 | Sim | |
| 2002/0094868 A1 | 7/2002 | Tuck et al. | |
| 2002/0121989 A1 | 9/2002 | Burns | |
| 2002/0123841 A1 | 9/2002 | Satoh et al. | |
| 2002/0154174 A1 | 10/2002 | Redlich et al. | |
| 2003/0065805 A1 * | 4/2003 | Barnes, Jr. | 709/231 |
| 2003/0135304 A1 | 7/2003 | Sroub | |
| 2003/0158655 A1 | 8/2003 | Obradovich et al. | |
| 2003/0161499 A1 | 8/2003 | Svendsen et al. | |
| 2003/0202018 A1 | 10/2003 | Kumangi | |
| 2003/0225516 A1 | 12/2003 | DeKock et al. | |
| 2004/0036721 A1 | 2/2004 | Anderson et al. | |
| 2004/0088412 A1 | 5/2004 | John et al. | |
| 2004/0107042 A1 | 6/2004 | Seick | |
| 2004/0128314 A1 | 7/2004 | Katibah et al. | |
| 2004/0193492 A1 | 9/2004 | Applebaum | |
| 2005/0071081 A1 | 3/2005 | Hirose et al. | |
| 2005/0216336 A1 | 9/2005 | Roberts et al. | |
| 2005/0288958 A1 * | 12/2005 | Eraker et al. | 705/1 |
| 2006/0080178 A1 | 4/2006 | Lee | |
| 2006/0230056 A1 | 10/2006 | Aaltonen | |
| 2006/0230351 A1 | 10/2006 | Stehle et al. | |
| 2006/0238379 A1 | 10/2006 | Kimchi et al. | |
| 2006/0241859 A1 | 10/2006 | Kimchi et al. | |
| 2006/0241860 A1 | 10/2006 | Kimchi et al. | |

FOREIGN PATENT DOCUMENTS

| | | | |
|---|---|---|---|
| JP | 15148975 A | 5/2003 | |
| KR | 1020050077643 A | 8/2005 | |
| WO | 0108053 | 2/2001 | |
| WO | WO0213459 | 2/2002 | |
| WO | WO 0213459 | 2/2002 | |
| WO | WO 02056210 A2 | 7/2002 | |
| WO | 03049035 | 6/2003 | |
| WO | WO 2006012120 A2 | 2/2006 | |

OTHER PUBLICATIONS xSP; Advertising on Google Earth; http://www.internetnews.com/xsP/article.php/3594841; 4 pages; last viewed Apr. 12, 2006.

Y. G. Leclerc, et al., "Digital Earth: Building the New World", in proceedings of the 5th International Conference on Virtual Systems and Multimedia, Sep. 1-3, 1999, pp. 250-262, Dundee, Scotland.

N. Faust, et al., "Real-Time Global Data Model for the Digital Earth" Proceedings of International Conference on Discrete Global Grids, Mar. 26-28, 2000, 8 pages.

U.S. Appl. No. 11/246,436, filed Oct. 7, 2005, Kimchi, et al.

U.S. Appl. No. 11/246,435, filed Oct. 7, 2005, Kimchi, et al.

OA dated Dec. 8, 2008 for U.S. Appl. No. 11/334,879, 23 pages.

OA dated Oct. 9, 2008 for U.S. Appl. No. 11/335,231, 17 pages.

International Search Report dated Oct. 4, 2007 for PCT Application Serial No. PCT/US2006/15349, 2 pages.

N. Faust, et al. "Real-Time Global Data Model for the Digital Earth" Proceedings of International Conference on Discrete Global Grids, Mach 26-28, 2000, 8 pages.

Roofshout; http://www.roofshout.com; 2 pages; last viewed Apr. 12, 2006.

Y.G. Leclerc, et al. "Digital earth: Building the New World", In proceedings of the 5th International Conference on Virtual Systems and Multimedia, Sep. 1-3, 1999, pp. 250-262, Dundee, Scotland.

International Search Report dated May 20, 2008 for PCT Application Serial No. PCT/US2008/050412, 3 pages.

International Search Report dated Apr. 2, 2008 for PCT Application Serial No. PCT/US2008/050441, 3 pages.

International Search Report dated Jun. 9, 2008 for PCT Application Serial No. PCT/US2008/050373, 3 pages.

OA dated Oct. 1, 2009 for U.S. Appl. No. 10/621,010 7 pages.

EP Search Report, EP06751153, and Supplemental Search Report, Aug. 27, 2010, 11 pages.

Yates, J.D., et al., "Searching the Web Using a Map," Department of Computer Science and Electrical Engineering, the University of Queensland, Brisbane, Australia, 2000, 8 pgs.

* cited by examiner

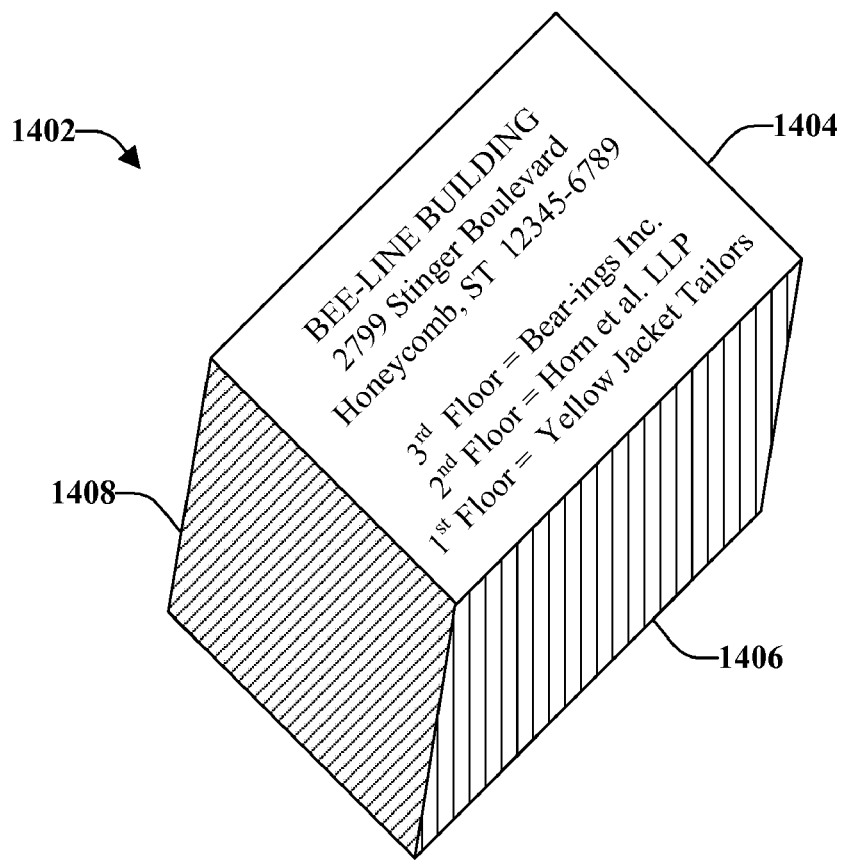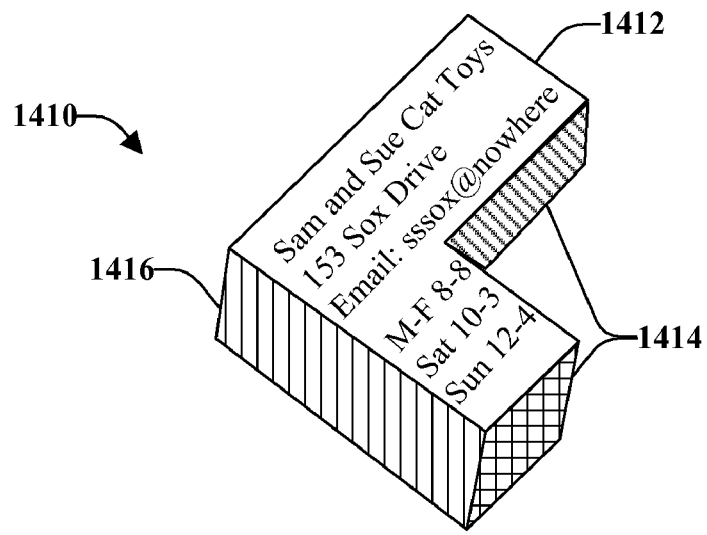
FIG. 14

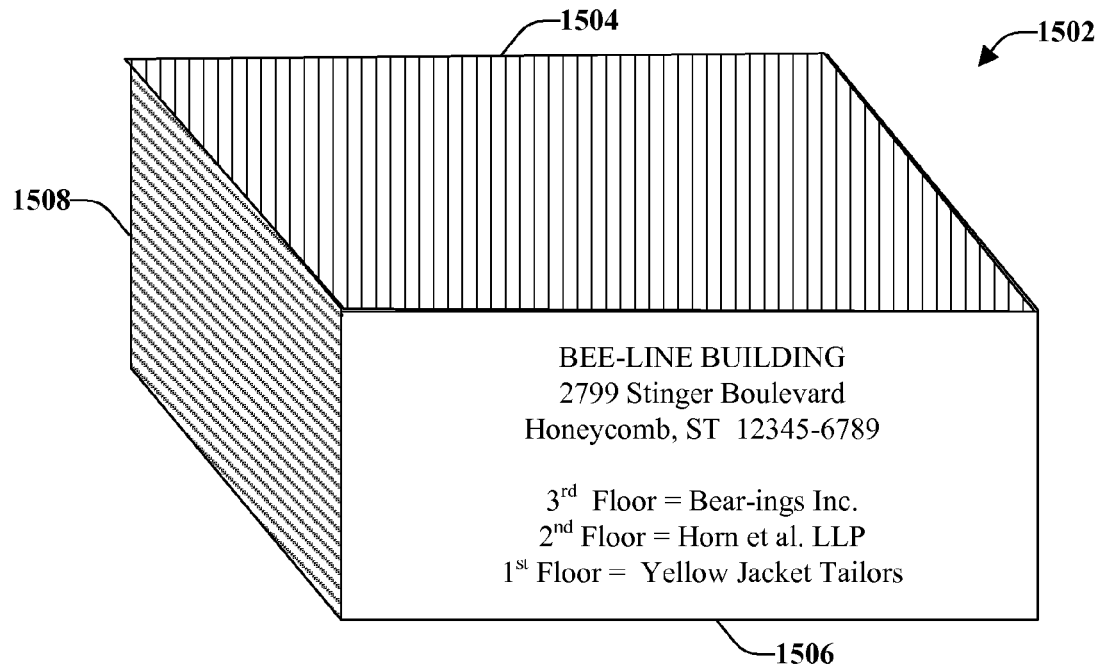
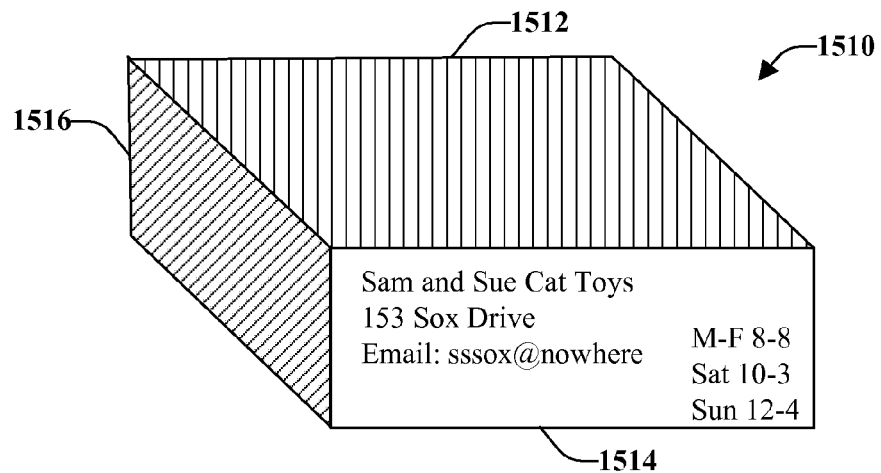
FIG. 15

DYNAMIC MAP RENDERING AS A FUNCTION OF A USER PARAMETER

CROSS-REFERENCE TO RELATED APPLICATIONS

This is a continuation in part of U.S. patent application Ser. No. 11/354,790 filed, Feb. 15, 2006, entitled, "VIRTUAL EARTH ROOFTOP OVERLAY AND BOUNDING", now issued as U.S. Pat. No. 7,466,244, which is a continuation in part of U.S. patent application Ser. No. 11/246,774, filed Oct. 7, 2005, entitled, "OBTAINING AND DISPLAYING VIRTUAL EARTH IMAGES" which claims the benefit under 35 U.S.C. §119(e) of U.S. Provisional Application Ser. No. 60/673,442, filed Apr. 21, 2005, and entitled "SYSTEMS AND METHODS FOR PROVIDING A VIRTUAL EARTH", the entirety of these applications are incorporated herein by reference. This application is also related to U.S. patent application Ser. No. 11/621,011, filed Jan. 8, 2007, entitled, "DYNAMIC RENDERING OF MAP INFORMATION" and U.S. patent application Ser. No. 11/621,010, filed Jan. 8, 2007, entitled, "MODE INFORMATION DISPLAYED IN A MAPPING APPLICATION", now issued as U.S. Pat. No. 7,777,648.

BACKGROUND

Mapping systems that provide users direction information and location of various registered locales are commonly utilized. Map making has largely been carried out by visitors to a particular place. The knowledge of places acquired by these visitors was then aggregated and assimilated into useful models that answered the question 'what's it like there?' In the Age of Discovery, the cartographic knowledge gained was often not shared. In this closed system, maps were viewed as a competitive advantage over other nation states.

The person with the best available knowledge of a particular area was in a superior position when it came to conquest, settlement, or trade. As the world was discovered, knowledge of its geography gradually spread to more and more people and maps improved. As technology advanced, so did the accuracy of mapmaking until arriving at what today is generally agreed upon as maps of the world.

As incredibly detailed and broadly available as they have become, the creation of maps remains an inherently closed system. Third party cartographers face the insurmountable challenge of keeping their maps accurate and up to date since the world is ever changing and no sooner is a map published than it is obsolete. Suburban map makers especially can never hope to visit a place often enough to keep things up to date let alone increase the resolution of today's maps. Local knowledge of a place is always better than what a visitor can hope to capture.

Today sources of information are isolated and a user, desiring a diverse amount of information generally has to access each isolated pocket of information. For example, to view weather data a user might access weather.com. Other examples of such pockets of information include real estate listings found on redfin.com, traffic on wa.gov, and personal photographs on ofoto.com. However, if a user interested in purchasing a house is concerned about the traffic and weather patterns in the area, the user has to access each isolated repository of information separately. This is not only time-consuming but can be frustrating especially if a user is not familiar with the wealth of information available and/or how to access such information.

Another development related to the wealth of information available is Internet advertising or "E-commerce." E-commerce is a way of carrying out business transactions over the Internet and is commonly used by consumers for ease of ordering. Common forms of Internet advertising are banner ads and pop-up ads. Banner ads are advertisements placed on a web page by a third party, who can provide free services or payment in return for the ability to place the ads on the web page. Some web pages are supported by banner ads. A pop-up ad is an advertisement that appears automatically in a separate window when a particular web page is viewed. However, banner ads and pop-up ads offer no effective means for an advertiser to tailor advertisements based on a user location and/or a user preference.

SUMMARY

The following presents a simplified summary of one or more embodiments in order to provide a basic understanding it is not an extensive overview and is intended to neither identify key or critical elements of the embodiments nor delineate the scope of such embodiments. Its sole purpose is to present some concepts of the described embodiments in a simplified form as a prelude to the more detailed description that is presented later.

In accordance with some embodiments, one or more user parameters can be monitored and/or logged and a displayed map area can be dynamically updated based in part on the user parameters. A user parameter can include personalized annotations made by the user in a current or a previous mapping application. When the user views a particular geographic area, the annotations can be displayed along with the map information, allowing the user to create a customized map that can remain private (e.g., not viewable to other users that are viewing a similar map display area) or that can be published allowing other users to view the information. The user can also view information relating to one or more individuals (e.g., contact, buddy, and so forth), provided the individual has authorized the viewing of such personal information. Viewed information can include the individual's name, address, or other information that has been authorized or published. Global positioning tracking can also be provided within the detailed map area, through displaying the actual location of the user and individuals.

Some embodiments relate to advertisement information that is tailored for a particular user based in part on user preferences. The advertisement can be rendered in such a manner that it obscures one or more items (e.g., a different advertisement, an object, blank display space) and/or replaces the items with something besides an advertisement that is tailored to the user preferences. As it relates to advertisers, information can be dynamically presented to notify an advertiser (e.g., illustrated in a web-based mapping application) if there are other advertisers (e.g., competitors) that are advertising in a particular geographic area. As it relates to businesses, imagery can be displayed in the viewed map area to assist in various business making decisions, such as where to open (or where not to open) a particular business or to facilitate a decision regarding a type of business to open in a certain geographic area.

Related embodiments describe a method and/or system for providing a common repository for information about the "real" world. Such information can include detailed information about a particular object or area of interest. A user can request information regarding, for example, a university campus. A bird's-eye view of the campus can be displayed along with specific information regarding each building, structure, office, etc. associated with the campus. The displayed information can include names of buildings, faculty, subjects, room numbers, phone numbers, etc. Such information can also be provided for a variety of other structures or areas (e.g. shopping malls, office buildings, government buildings, apartment buildings, and the like). The information can be submitted from the owner, occupant, and/or other authorized persons associated with the structure and/or can be obtained from public resources.

Real world information can further include detailed three-dimensional models of locations on planet Earth, satellite photographs, real-time web cams, user annotations, maps, points of interest, geological information, real-time traffic, real estate sales, driving directions, interior places, etc. In accordance with the features presented herein, is a platform, a set of experiences, and continuous capturing of data and images (e.g., live video, traffic information, continuous motion), which includes any and all information about the physical world, and allows such information to be accessible to a user "on demand", or can influence the information displayed to the user (e.g., display cars on city streets where the distribution of the cars is guided by real-time traffic data). This information can further be updated over time, allowing for current viewing, historical viewing, and/or projections as to how the area will be viewed in the future. The features presented herein are not limited to the earth and can encompass objects in outer space as well as imaginary world(s) as provided by users. Also provided is an active community for capturing, connecting, sharing, and visualizing information based on location. Embodiments provide the schema, repository, index, and Application Program Interfaces (API) for any information, place, entity, attribute, service, or person that can be referenced geographically.

The disclosed embodiments are built on core premises: location relates otherwise disparate information sources, there is value in "tail" information sources, and tail information is (in many cases) intrinsically local. These concepts together enable a self-sustaining ecosystem that is rich in relevant information. The data model is able to encode anything in the real word and is a collection of layers attributed in many ways, based on a common core schema. The web-based mapping application is assembled from an earth model (a sphere), multiple topography attitude maps, multiple overhead and non-overhead raster images, vector objects (roads), cultural objects (buildings), dynamic objects (cars), time information (including transient objects (events)), and interactive objects (people).

According to an aspect, a map is provided that is the centerpiece of a page or screen and can cover the entire screen or viewing area. A variety of controls, such as "zoom in" or "zoom out," for example, are placed on top of or overlaying the map, rather than being placed around the perimeter of the map, which tends to reduce the viewing area of the map. When a user moves a cursor around the screen, the map and everything associated with the map, including the controls, are dynamically and automatically updated with that movement. As the cursor is moved, the map is continuously refreshed in an "auto refresh" process without requiring the user to manually refresh the screen.

According to an embodiment is a rich application that allows users to immerse in a virtualized earth, e.g. to intimately know "what it is like there." Provided is a set of augmentation technologies, clients, applications and services that enable applications to overlay location-related data "on top of the real world," spanning mobile devices to automotive solutions to wearable computers. Disclosed is a spatial database with a powerful spatial search and filtering engine.

According to another embodiment is a set of APIs, protocols, schemas, services, servers and clients that allow data-owners to manage, publish, selectively-share and monetize location-related content and location-aware application. Also provided is an ecosystem that allows publishers (both commercial and individual) to be compensated for sharing location-related data.

According to an embodiment is a 3D navigation of the earth at a high resolution, which allows integration with 3D video and 3D models that are geo-referenced to allow a seamless experience from space down to street-level and even within interior spaces. The user can get an understanding of what a remote location is like, or obtain views on a known location that are only possible through overlaying visualizations of ancillary data (e.g., weather, traffic, real-estate information, pollution plumes, sales by territory, demographic stations and projections or simulation model results.) In another embodiment, this information can be produced for mobile devices, thin clients, or non-visual representations (e.g., text, voice).

According to a further embodiment, community based content and location information provided by sources combined with features such as real-time social networking are joined to provide one-stop answers about what is going on at a particular place. Combining location, history, time, and community information facilitates an automated selection of local events, restaurants, places and more based on a user's (and people like the user) historical set of decisions. According to another embodiment, temporal attribution allows users to obtain information on past, current, or future (forecast) data. Discrete time-based information is supported, such as events as well as real-time or near real-time data (e.g., traffic, weather, river, or tide levels, vote tallies, observe sun/moon/stars, seasons, and other temporally tagged information that can be modeled, archived, or forecast). Also supported is historical data to allow applications to perform time filters of projections, such as historical and predictive traffic data.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents. Other advantages and novel features will become apparent from the following detailed description when considered in conjunction with the drawings.

BRIEF DESCRIPTION OF THE DRAWINGS

FIG. 14 illustrates an image overlaid on building rooftops as viewed from overhead.

FIG. 15 illustrates an image overlaid on the viewable sides of two buildings as viewed from a side perspective.

DETAILED DESCRIPTION

Figure 1:
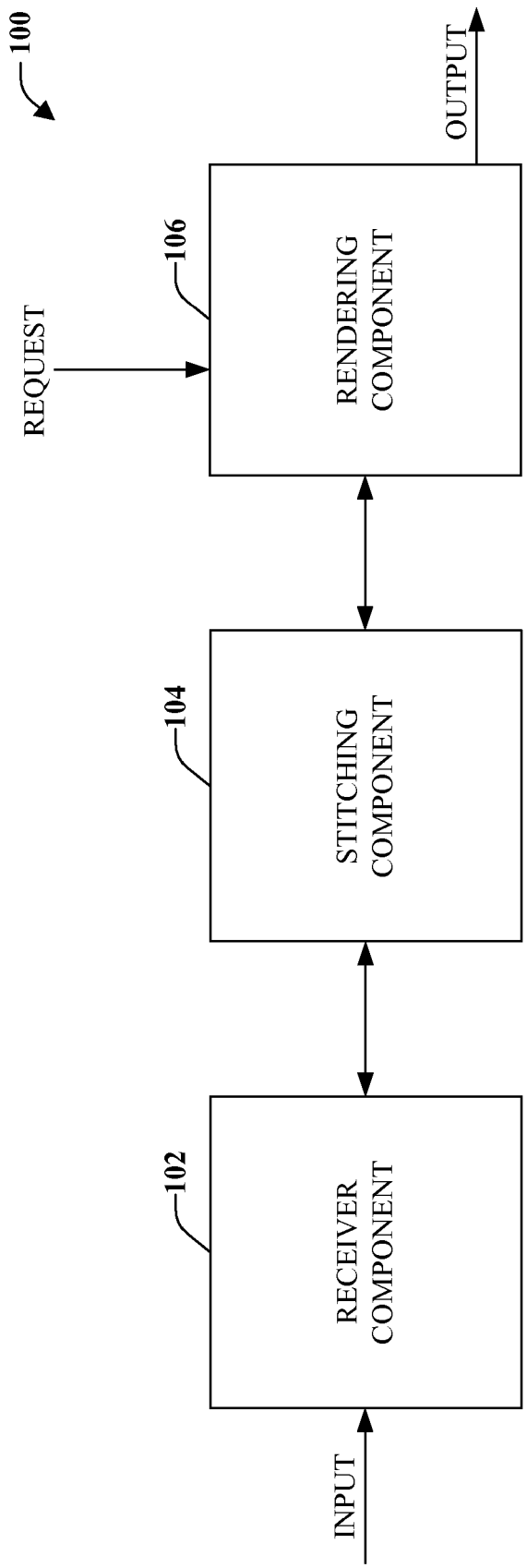
FIG. 1 illustrates a system for obtaining and displaying map information and associated data.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

With respect to taking automatic action, machine-learning techniques can be implemented to facilitate performing automatic action. Moreover, utility based analyses (e.g., factoring benefit of taking correct automatic action versus costs of taking incorrect action) can be incorporated into performing the automatic action. More particularly, these artificial intelligence (AI) based aspects can be implemented by any suitable machine-learning based technique and/or statistical-based techniques and/or probabilistic-based techniques. For example, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, and so forth are contemplated and are intended to fall within the scope of the disclosure.

Referring initially to FIG. 1, illustrated is a system 100 for obtaining and displaying map information and associated data. The system 100 facilitates receiving from a multitude of users and/or entities (e.g., the Internet, another system, a computer, ... ), hereinafter referred to as users, a vast amount of information to populate one or more databases or repositories. The system 100 further facilitates providing to a multitude of users map information including information about the world as it is at the time the user is viewing the map ("right now"). The map information can include real traffic, a skyscraper under construction, interior spaces, or anything else that can be perceived and for which a user desires information. The map information can include personalized location-based (distance, relevance, etc.) results, including directions and navigation results. By way of example and not limitation the map information can include restaurants in a neighborhood, results for restaurants the user has visited recently, each displayed restaurant's specials for the night, how others (e.g., friends, family, contacts, neighbors, ... ) have rated each restaurant, restaurants that might be of interest to the user (based on historical information relating to the user's preferences, for example), etc.

According to some embodiments, the map information can include detailed information regarding an object or point of interest. For example, information regarding a name of a building or other structure can be provided upon request or automatically, such as when a user hovers a mouse over the object. Other information regarding the structure can also be provided, such as telephone numbers, email alias information, web-site information, hours of operation, special events, etc. This information can be provided within the footprint or boundary of the object (e.g., rooftop dimensions) or it can be located on a display near the object or point of interest with a pointer indicating that the information belongs to that particular object or point of interest. In some embodiments the information can be located elsewhere on the map.

System 100 includes a receiver component 102 that interfaces with a data collection or stitching component 104 and a rendering component 106. The receiver component 102 is configured to obtain, receive, request, etc. input from a multitude of users. The input can be a multitude of information in various forms including written data, voice communication, one-dimensional (1D), two-dimensional (2D), two and a half-dimensional (2.5D), three-dimensional (3D), etc. imagery that relates to a variety of geographic locations, and other data that can be transmitted through wired and/or wireless communication. Information can be provided to the receiver component 102 through users (e.g., database, computer system, ... ) that contain isolated data. Isolated data can include data maintained by a separate database or server. For example, isolated data maintained by a corporation entity can include information relating to the history of the corporation, employee information, standard operating procedures, financial information, and so forth. The receiver component 102 can be configured to access the isolated data (provided accessibility is authorized) and bring all these disparate sources of information together into a single logical framework.

At a substantially similar time as information is available at the receiver component 102 it is transmitted to a stitching component 104 that stores the data in a format that is readily retrievable. In another embodiment, the input data from the receiver component 102 might be delayed before transmission to the stitching component 104. In a further embodiment, the information can be sent to the stitching component 104 at substantially the same time as received at the receiver component 102 and retained in the stitching component 104 for a predetermined time before the data is available at the rendering component 106. The delay in transit time of the information between the receiver component 102, stitching component 104, and/or rendering component 106 takes into account various factors including privacy issues. For example, a user that provides three-dimensional or other data concerning such user's current location might not want others to know the exact location of such user (e.g., real-time tracking). Thus, there can be a delay function associated with system 100. The delay can be measured in time (e.g., hours, days, weeks), during certain time frames (e.g. from 8 a.m. to 5 p.m. provide my exact location to everyone, from 5 p.m. to 8 a.m. only allow my spouse to see my exact location), or other means of tracking an interval or period. An optional opt-in (or opt-out) procedure can be utilized whereby a user decides whether to allow the system 100 to provide others real-time data about the user. The user might update information, such as a current location, through various means (e.g., accessing the Internet, sending an SMS message, accessing a call center, and so forth). For example, the user might go on a hiking trip and notify others of the trail that will be followed. If the user does not send location updates for longer than a specified amount of time or designated delay, a warning message can be sent to certain people (e.g., friends, relatives, an so on) and/or to an emergency number (e.g., 911).

The user can set-up and control privacy parameters regarding when to display real-time data, the precision of such data, the persons who can access the data. The system can provide for encryption of data rendering it only recoverable on the user's machine. The user can select an option to make trails local-only with no publication to the service, as well as other parameters that take into account privacy and safety concerns.

The user can also supply annotated information about a particular location. For example, for a zoo, a user can input a picture of a particular animal that the user wants others to see, or the user can input a text or voice message, such as "check out the new monkey display!". This information can be available when another user conducts a search and the zoo or surrounding area is displayed on the map. In addition, information provided from the particular source (e.g., zoo) can be provided for the user to select. Such information can include particular data about the entity, such as exhibits, hours of operation, internal map of the zoo showing paths, etc. Other data that can be displayed can be a task list or other user-defined information that the user would like to view that is personal to the user. For example, the user might paste pictures of his family from that location.

Data communicated to the receiver component 102 from a user generally is associated with a particular entity or object (e.g., building, landscape, house, street corner, landmark, ... ) or a specific geographic location (address, geographic coordinates). The stitching component 104 is configured to associate each piece of data with a geographic location, such as through geographic coordinates, for example. The stitching component 104 is configured to bind the data, including a three-dimensional image together using the discrete data and/or data images received. The stitching component 104 communicates the information to the rendering component 106 when a user request is received by system 100.

The rendering component 106 is configured to provide (output data to) a user the ability to retrieve requested information and navigate the stitched image data in a seamless three-dimensional manner. The three-dimensional rendering can be a variety of navigation angles (e.g., oblique-view, bird's eye angle, perspective angle, top viewing angle, front viewing angle, downward trajectory, upward trajectory, ... ). The user can receive the information based on a user inquiry that can include a specific location and/or a range (e.g., 10 miles, 25 miles) surrounding a location. The location can be based on geographic coordinates, street name, street address, city, street, or other means of identifying a place, person, and/or thing to be viewed.

The rendering component 106 is configured to enable a multitude of users to view similar geographic images and associated data at a substantially similar time. For example, a certain geographic area may be or may become a "hot spot" due to a foreseen event (e.g. sporting event, music concert, political event, ... ) or an unforeseen event (e.g., environmental conditions, terrorist attacks, ... ), wherein a multitude of users desire to view the event or place at substantially the same time. The rendering component 106 is configured to provide each user with the requested geographic area while allowing each user the ability to manipulate the viewed image and associated data (e.g., zoom, move the image around on the display surface, ... ) independently from the viewing performed by the other multitude of users.

In another embodiment, information regarding a user's contacts (e.g., family, friends, co-workers, co-students, ... ) can be provided to a user in response to a prompt or request for information regarding places that might be of interest (e.g., restaurants, sporting events, stores, ... ). For example, a user could be visiting a location for business or another purpose and desire information about what to do while visiting that place. The user can request such information, while at the actual location or remotely from another place which could be anywhere, provided there is a means for system 100 to obtain and communicate the information to user.

According to another embodiment, system 100 can facilitate providing directions or navigational information to one or more locations. The quickest or best route can be determined by system 100 based on information recently received from one or more users in the area. The route can be highlighted or marked in a different color. In a further embodiment, system 100 can facilitate real-time advertising and/or on-line advertising to one or more users based on various criteria including a user location, user preference, user request, advertiser location, advertiser rank, advertiser rating, etc.

Figure 2:
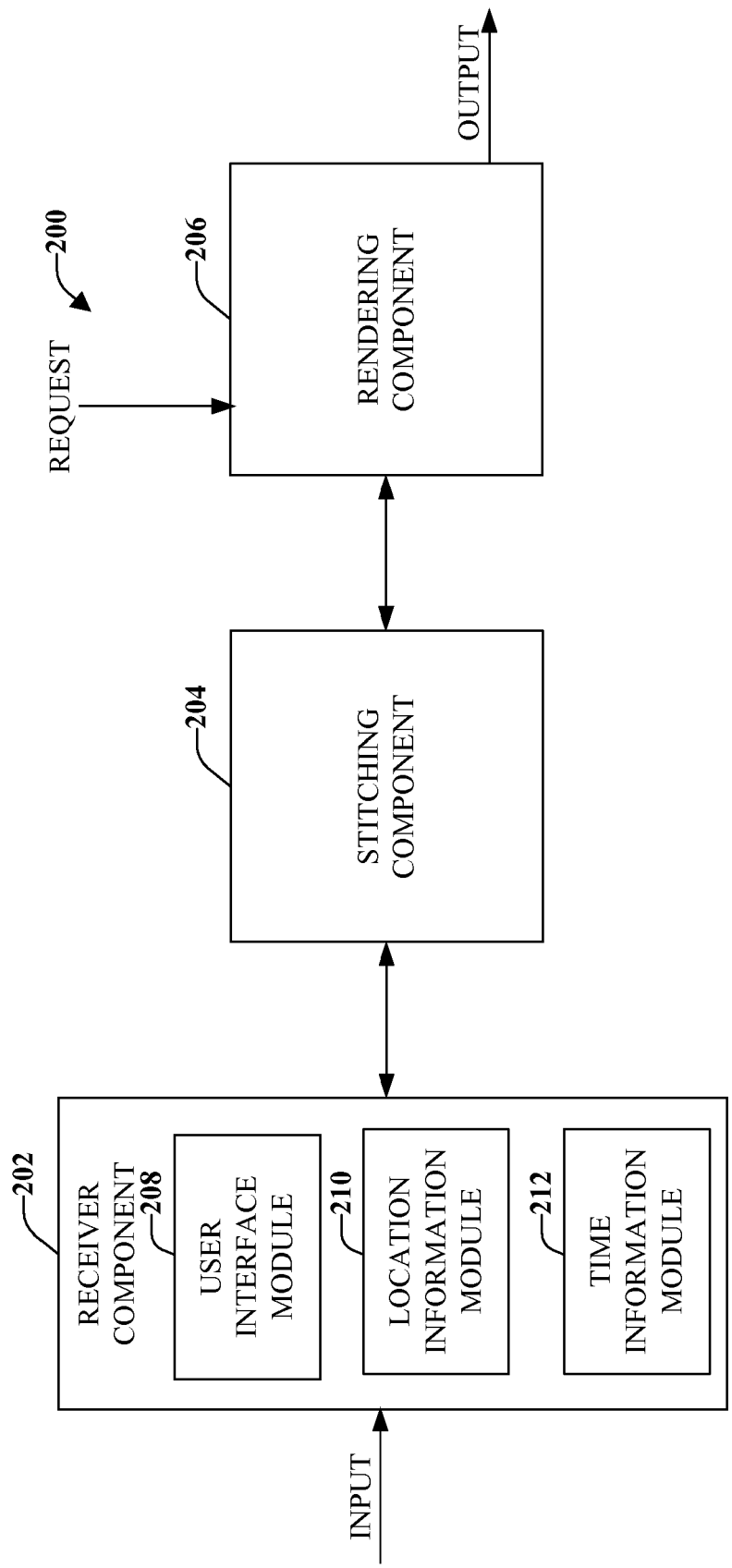
FIG. 2 illustrates a system for facilitating user input for data compilation.

FIG. 2 illustrates a system 200 for facilitating user input for data compilation. System 200 includes a receiver component 202 that accepts information from a variety of users. The information is communicated to a stitching component 204 configured to organize the data and transmit the information into a usable format. A rendering component 206 provides a variety of users with the information in an "as needed" or "on demand" basis. The rendering component 206 outputs the requested data to the user(s).

The receiver component 202 is configured to receive, request, query, accept, etc. data from a variety of users. The data can be received from a multitude of devices, including mobile phones, regular and panoramic cameras, and other devices that can communicate information. To facilitate such data acceptance, the receiver component 202 can include various modules including a user interface module 208, a location information module 210, and/or a time information module 212. It should be understood that there might be more or less modules than those illustrated and described. Although the modules 208, 210, and 212 are shown and described with reference to a receiver component 202, they can be located as individual modules or they can be associated with other system 200 components.

The user interface module 208 is configured to enable a user to interact with system 200 and provide image data or other information. The user interface module 208 can provide a graphical user interface (GUI), a command line interface, and the like. For example, a GUI can be rendered that provides a user with a region or means to load, import, read, etc. the various forms of data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with the user interface module 208 by entering the information into an edit control.

The user can also interact with the regions to select and provide information through various devices such as a mouse, a roller ball, a keypad, a keyboard, a pen, a digital camera, and/or voice activation, for example. Typically, a mechanism such as a push button or the enter key on the keyboard can be employed subsequent to entering the information in order to initiate information conveyance. However, it is to be appreciated that the embodiments described herein are not so limited. For example, merely highlighting a check box can initiate information conveyance. In another example, a command line interface can be employed. For example, the command line interface can prompt (e.g., through a text message on a display, an audio tone, ... ) the user for information by providing a text message. The user can than provide suitable information, such as digital image data, alpha-numeric input corresponding to an option provided in the interface prompt, an answer to a question posed in the prompt, or other input data. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The user interface module 208 can also receive data from user-entities (e.g., the Internet, another system, a computer, ... ). For example, owners of data can interact with system 200 to publish data "by reference" and the system 200 will either redirect queries to the actual data (link model) or proxy the data through the system 200 (syndication model, which can include aggregate-type processing). The system 200 can be pre-populated (head data) and/or continuously updated (tail data) with a database of readily available commercial and public information.

Interaction with the receiver component 202 allows the community of individual users to build on, expand, and update the database with input data, thus continuously increasing the quantity, improving the quality, and updating the accuracy of the data. The information provided by individual users might be considered untrustworthy and can be distinguished from trustworthy data until its level of trustworthiness rises to an appropriate level. The system 200 can further gather and display data images and other information relating to interior spaces (e.g., homes, buildings, stores, restaurants, factories, . . . ), aerial images, and underwater locations. Information that can be added by individual users includes roads, best fishing or bird watching spots, annotations that show construction information, etc. Other information can be provided from commercial organizations, such as shopping malls that upload mall layout information and individual stores that provide information about sales or other relevant data. It should be noted that this information can be collected worldwide and the data associated with the disclosed embodiments is not limited to one area or country. Additionally or alternatively, the information relating to the businesses can be presented to the user based on the user's actual location or based on a mapping area viewed by the user. In such a manner, a user can receive business information for a geographic region of interest to the user (e.g., planning a vacation or business trip).

Users can also input or provide to the receiver component 202 rating and reviews for every entity (e.g., businesses and services, events, venues) and can rate each other's reviews to reduce potential spam. Ratings can be on different dimensions, for example, "the location is fantastic, great sunsets, but the picture you have here is terrible." The ratings can be input into a Recommendation Engine associated with the receiver component 202, for example, that utilizes the ratings to create cross recommendations between highly rated services or activities. Different aggregations of the ratings and recommendations can be provided for an individual user (e.g., from all users, from my community, from my family, . . . ).

Receiver component 202 can also receive metadata information associated with the received image. This data can include for example, a logo for a store or business, hours of operation, phone number(s), special events, or other information associated with the image (e.g., object or area of interest). This information can be displayed when the image data is displayed, or upon a request for more information regarding the object or area of interest.

The location information module 210 can provide information regarding the location of the user and/or entity that provided the data image or other information. A Global Positioning Service (GPS) or another locating means can be employed to facilitate location information. GPS accuracy in urban areas is limited, and in a number of situations (e.g., interior spaces) is not generally available. Wi-Fi based location solutions can be utilized to complete the location-gap and enable the various embodiments disclosed herein to work in a multitude of environments.

According to a further embodiment, the system 200 can verify the location of a user periodically through a multitude of resources. For example, the location of a user's mobile device can be resolved utilizing a location server. The device the user is using when information is provided to system 200 can actively track its location locally and periodically upload the location information. In another embodiment, the user can manually choose a location (e.g., "I am here") to create a named checkpoint.

The location information module 210 is configured to provide a location pivot for the images or documents based on where the images were taken or the documents were created, edited, etc. When a user has a location-enabled device (e.g., SmartPhone), a location-trail feature can record the device's location at a predetermined time interval or period (e.g., every 5 minutes). This trail can later be associated with the time-stamp on the file (e.g., picture, document) similar to data in an electronic picture storage medium or a directory of stored documents. The location information module 210 allows the user to virtually re-visit the trip in the original sequence and to associate other location-indexed information with each picture (or data) in the album. Keywords can automatically be associated with the picture, data, document, etc. to facilitate finding and viewing the information. It is simple to browse the directory structure by specifying a keyword that was previously associated with the image and/or data. In another embodiment, the browse can be based on the time and sequence of images and/or data.

The time information module 212 is configured to time-stamp the image, data, and/or other information and can operate separately or in conjunction with the location information module 210. The time information module 212 is further configured to provide a context to match the time of an event to the location of the event. For example, cameras can record the time a picture was taken and input the picture with the time-stamp to the system 200. This allows the user(s) a source of context for both personal and public data. According to another embodiment a position is not saved each time an event is recorded but rather a location-tracking service maintaining a "breadcrumb trail" of the user location at a pre-defined fixed interval (e.g., 5 minutes, 15 minutes, 30 minutes, . . . ). This information can later be utilized to determine the location of any time-stamped information, for example, a document edit timestamp can reveal where a specific change to a document was performed (and possibly prompt memory recollection of why an edit was made). The time-stamp information can also facilitate time-shifting functionality that allows a user to view not only current data, but also historical information and predicated future information. For example, the user can time-shift to see what the weather will be like tomorrow, based on historical forecasts or to time-shift to an earlier date to accurately observe how the weather behaved.

The location and time information can be utilized to confirm that someone was in a particular place at a particular time. For example, a non-repudiation service can sign a user certificate with the time and position of the user. This information can be verifiable (e.g., a wireless carrier's cell-tower or a commercial Wi-Fi Base station can offer this service). Drive-time algorithms can also provide that the user could have (or could not have) arrived at a destination before a certain time.

User location and/or time information should take in privacy and safety concerns as well as parental-control aspects. A variety of means can be utilized to protect a user's privacy. These means can include allowing a user to be identified with an alias (in lieu of a real name) when contributing content. The user can choose to share personal content with all users or with a specific set of people (e.g., buddy list or named individuals).

A user can choose to share personal content and location information for a specific set of time (e.g., location dithering, per-watcher dithering). For example, if a user has a meeting scheduled the user may send directions to the attendees. The user can also give the attendees an internal map of the office or building in which the meeting is being held. Thus, the attendees might have not only a route to the meeting location but also the route to the user's office. Further, this information might be made accessible to the attendees only on the day of the meeting. The attendees can also be allowed access to the user's location during the hours of the meeting, in case the user is running late. This information can be configurable by the user. At other times, the user might only be located based on the neighborhood or city.

Another privacy concern revolves around street-level (and potentially other high-resolution, short range) images that can reveal personal information. Thus, various automated solutions for making the images anonymous should be employed. These solutions can include face-detection algorithms to look for and "dither" or blur people's faces, mitigating the occurrence of people finding their picture on-line. Other algorithms can be employed for detecting and removing license-plate numbers and other identifying criteria.

In addition, since the disclosed embodiments are predicated upon community contribution, special considerations for controlling, mitigating, and dealing with spam, obscenities, pornography, malicious information, and the like should be taken into account. Eliminating all such data might not be possible, however, there are a number of strategies for mitigating the prevalence of such content.

Accordingly, users who rate, review, or contribute content should sign-in with a unique identification and/or password and the receiver component 202 can prohibit those that do not supply such information from inputting content. Those who are merely searching or viewing content (e.g., restaurants, events, locations, points-of-interest, . . . ) could either sign in or remain anonymous. A "virtual reputation" can be created for a user who contributes content (including rating and reviewing content). This reputation can be based upon ratings of other users who have ranked a user that contributed content. A user who has consistently contributed poor quality content may have a low virtual reputation. Such a user can be prohibited from uploading, reviewing, or rating further content.

For example, a user contributes content regarding a restaurant. If the content is reviewed and a predetermined number of other users provide ratings indicating that such content is spam, the content in question can be hidden and the contributor prohibited from contributing further content. The user can be provided the opportunity to explain the content. A system (e.g., virtual arbitration system) can be put into place to settle the issue whether the content is spam or not and whether the content should be permanently removed or if is should be redisplayed for viewing by others.

In another embodiment, each user who contributes can have an associated ranking. A user who contributes spam or other malicious content can be issued demerit points or another tracking means. In addition, users who falsely accuse another can be issued demerit points. If a user falls below a certain ranking due to such demerit points, they can be flagged and no longer permitted to post, upload, or provide content. It should be understood that the receiver component 202 can be configured with other dynamic checks and balances enabling the system to allow the community to self-regulate.

Figure 3:
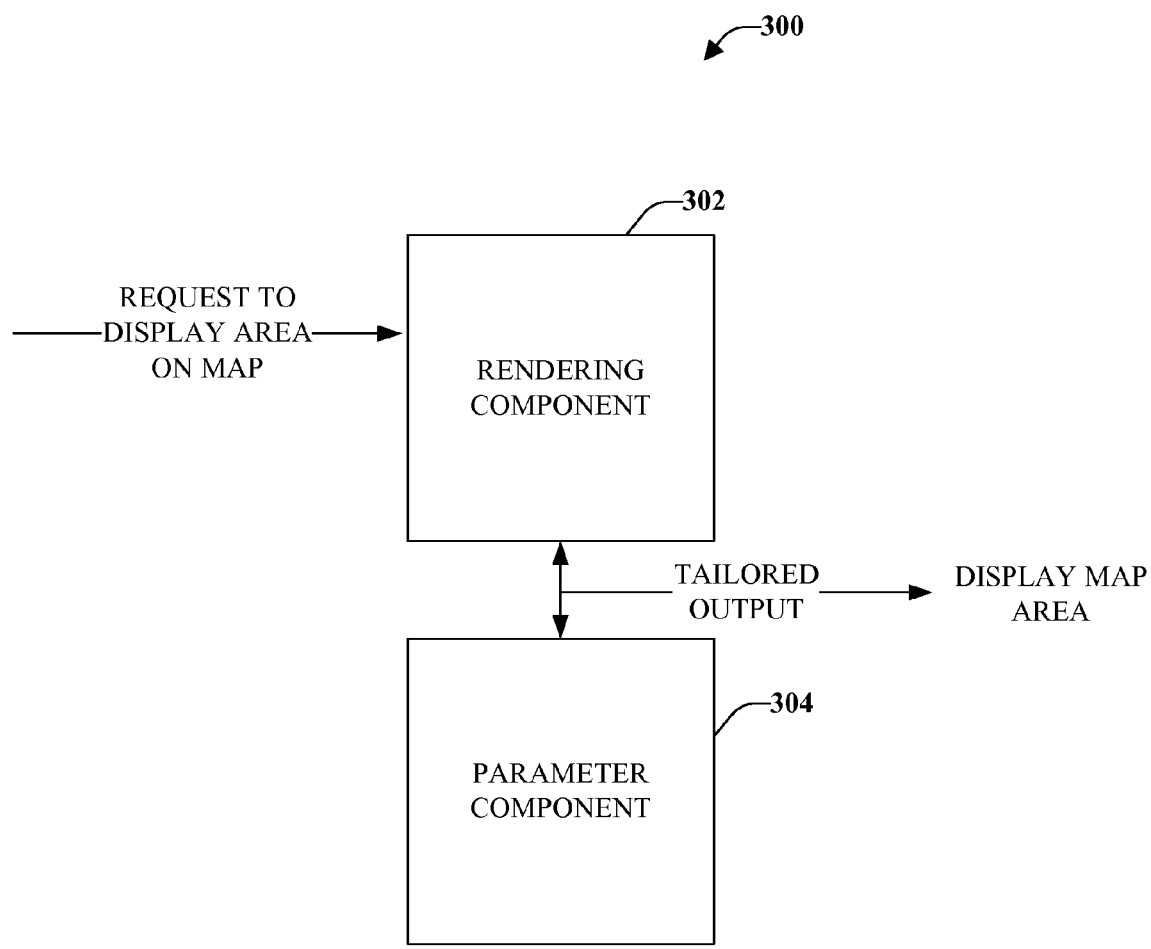
FIG. 3 illustrates a system for rendering web-based map data as a function of one or more user parameters.

With reference now to FIG. 3, illustrated is a system 300 for rendering web-based map data as a function of one or more user parameters. System 300 can be configured to provide a mapping application user with tailored information to enhance the user experience. System can display a mapping area with map information (e.g. names of streets, buildings, and so on) and can display additional information that would be informative and beneficial to the user based on one or more user parameters. For example, a user familiar with an area or that has specific interests can personalize map information through configuring user parameters. These user parameters can include user demographic, user profile, and/or user preference information. The one or more user parameters can be user specified or inferred by the system based on historical user data as well as other data collected from the user or other users that share similar parameters.

For example, a user may want to manually annotate information (e.g., location of parent's house, friend's house, work) and have such information (user parameter) dynamically displayed in conjunction with the map whenever that particular area is viewed by the user. In addition, specific interests of a user can be automatically identified and displayed.

Artificial intelligence-based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" or "infer" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

In further detail, system 300 can include a rendering component 302 that can be configured to obtain and display a specified geographic area and related information of a web-based map. The geographic area can be manually input by a user (e.g., geographic coordinates, street address, name of location (e.g., "White House") and so forth) or it can be inferred based on the location of the user (e.g., GPS, or other locating means). To display information tailored for the user, rendering component 302 can be configured to interface with a parameter component 304 that obtains (e.g. from a storage media, on-the-fly from a user, or from another medium), specific parameters related to the user (e.g. preference, demographics, profile, and so forth) as well as other information relating to the user or similar users (e.g., historic data). Thus, parameter component 304 can dynamically annotate or modify the information to be presented to the user by rendering component 302 to provide different map features to each user that may be viewing the same geographic map area. The parameter component 304 (or rendering component 302) can present the user configured information and the specific geographic area to a user. In such a manner, the information presented to the user can be selectively configured based on the one or more user parameters.

Figure 4:
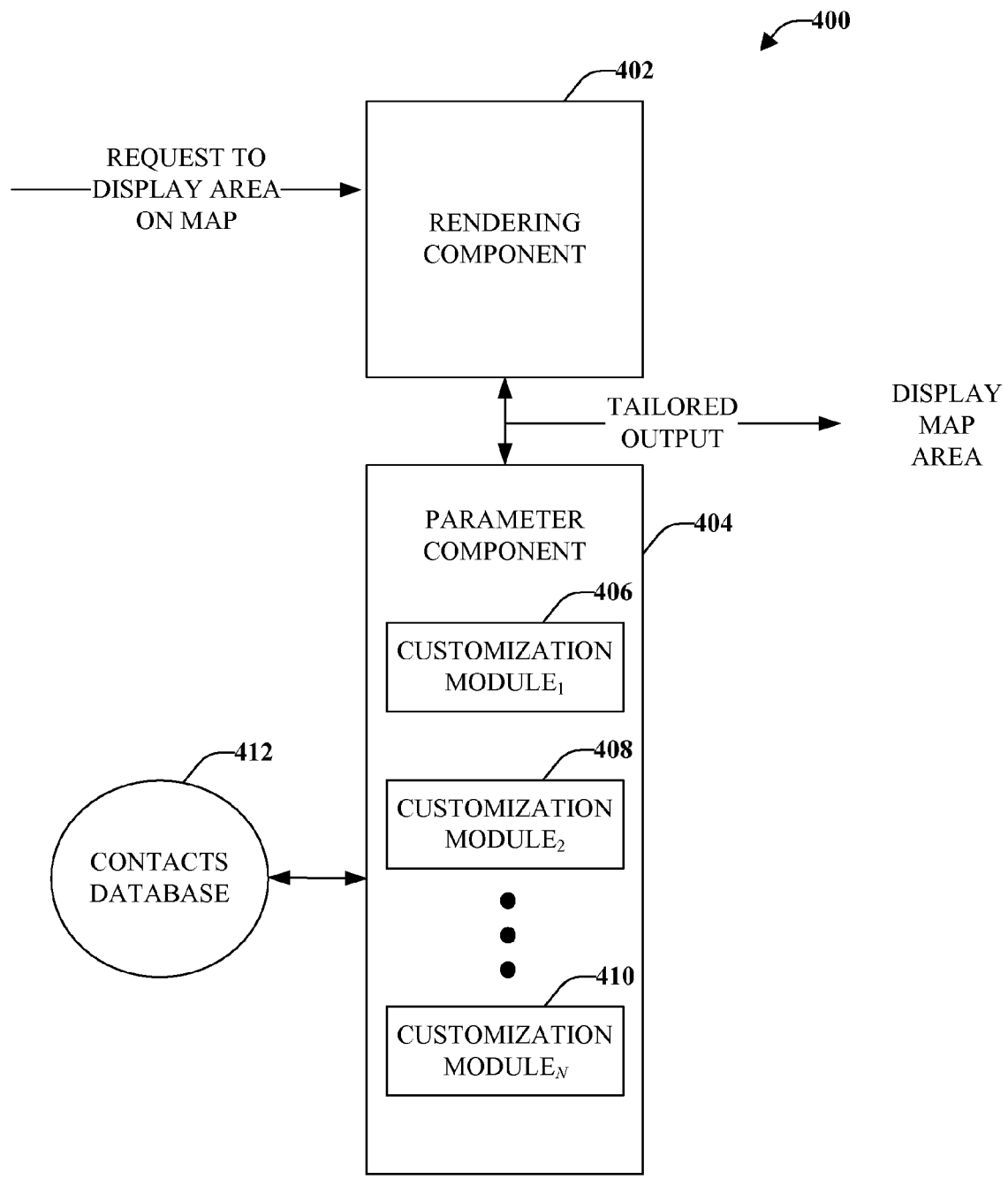
FIG. 4 illustrates a system for rendering web-based map data as a function of one or more user parameters in further detail.

FIG. 4 illustrates a system 400 for rendering web-based map data as a function of one or more user parameters in further detail. System 400 can be configured to personalize a displayed map area by annotating the area with text, graphics, or other information. A rendering component 402 can extract the map and map features for a geographic area, requested by a user, from a remote server(s) or database(s) that has compiled and maintained various types of information relating to the requested area as well as other geographic areas.

A parameter component 404 can be configured to interface with rendering component 402 to tailor the requested map area for a particular user. Various customization modules or databases can be accessible to parameter component 404 to individually tailor the map area. A multitude of customization modules, labeled customization module$_1$ 406, customization module$_2$ 408, through customization module$_N$ 410, where N is any integer, can be included in system 400.

An example of a customization module is an annotation module that can be configured to receive, maintain update changes made by a user. Such changes may have been made in a previous user session (e.g., historical information). For example, a user can annotate the map with text that labels the user's house, or other objects of interest. The map annotations can be maintained by the customization module and when the user requests a similar map area to be displayed, the annotations can be automatically applied to the displayed data, allowing the user to utilize the customized annotated map based on the user's personal needs. Users viewing a similar mapping area at substantially the same time (or at a different time) might not view the annotations made by others. However, according to some embodiments, users can authorize system 400 to share or distribute their personalized annotations with others. For example, a user can add text to a map area such as "this is my favorite breakfast place." When the viewer requests another map area (e.g., within the same city) that includes at least a sub-portion of the (breakfast) location, the added text is automatically displayed, provided the user requested such changes to be maintained (by the client machine, remote server, or other database or server).

Additionally or alternatively, annotations can be applied by the user manually or the system 400 can extract various information from a contacts database 412, for example. Such extracted information can include a contact's name, place of employment or home and/or other objects of interest that are contained in the contacts database 412. In accordance with some embodiments, an annotated mapping application can be rendered that details a current position of a contact person (e.g. a friend, co-worker, child) if such contact person is within the map viewing area (e.g. requested map area). However, there should be security measures in place so that each contact authorizes individuals (or everyone) to view a current physical location of the contact. There should also be security measures that allow the contact person to deactivate (or reactivate) the authorization at any time to ensure privacy when desired.

Other examples of configuration modules include a demographic module that can be configured to dynamically render on the displayed map an advertisement or other information (e.g., public announcement, community events, and so forth) based on demographic information known or inferred about the user (e.g., city of residence, occupation, and so forth). Another example is a profile module that can be configured to display, in conjunction with the map and map features, customized information compiled based on known or inferred information about the user (e.g., gender, age, interests, and so on). A preference module is another example and can be configured to collect and retain information regarding a user's preferences. Such information can be input manually by the user (e.g., "do not show me any information relating to sporting events or equipment"). Alternatively or additionally, system 400 can infer various preferences of the user, such as through a machine learning component. For example, system 400 has previously displayed to the user information relating to animals (e.g., pet store, animal shelters, animal shows, and so on). As the animal information is displayed, the user continuously deletes or otherwise indicates that the information relating to animals is not desired. Based on such action performed by the user (e.g. historical information), system 400 can infer that the user would prefer not to view this information and tailor the information displayed so that animal information is no longer presented to the user. A temporal element or module can also be provided, wherein if the user will be in a known location at a known time, the user can be notified of events that are scheduled to occur at that place and time. Other types of configuration modules can relate to dynamically rendering advertising information in conjunction with map information, which will be described below with reference to FIG. 6.

Figure 5:
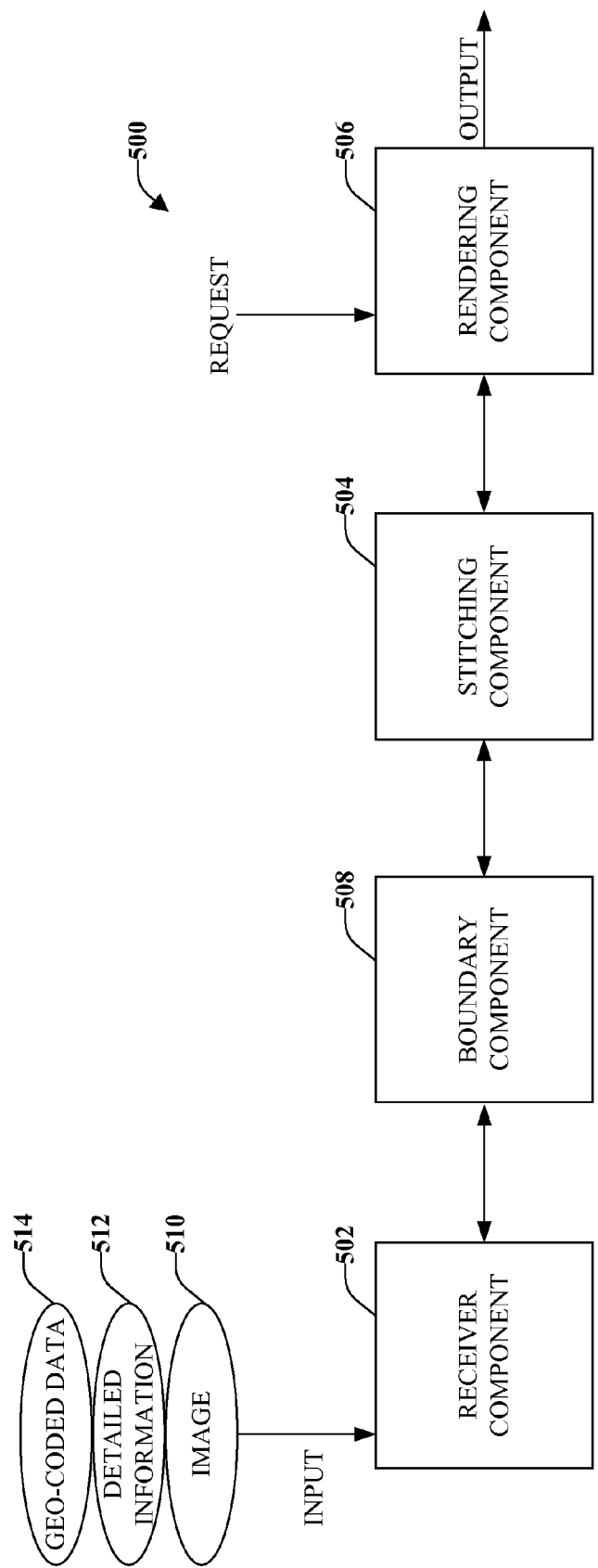
FIG. 5 illustrates a system for obtaining and displaying detailed object information and associated data.

FIG. 5 illustrates a system 500 for obtaining and displaying detailed object information and associated data. System 500 can include an acquisition or receiver component 502, a stitching component 504, and a rendering component 506, similar to the system components described with reference to the above figures. Also included in system 500 can be a boundary component 508 that can be configured to determine a boundary or perimeter of an object or point of interest.

Receiver component 502 can be configured to receive from one or more users and/or entities (e.g. the Internet, another system, a computer, . . . ) input that includes imagery 510, and/or detailed object information 512. An object can be for example, a building, an office, a parking garage, a house, a restaurant, a park, or other locations, things, and/or points of interest. The object information can include imagery associated with the object (e.g., picture, 3-D picture or image, panoramic picture, internal images, and the like). Information received by receiver component 502 can include identification of the object (e.g., name, address, . . . ) and/or geo-coded information 514 (e.g., geographic coordinates, latitude, longitude, street location, and the like). In addition, receiver component 502 can receive, obtain, request, etc. detailed information regarding subcomponents of the object. Subcomponents and detailed information can include, for example, a listing of all tenants in an office building or apartment building, telephone number(s), and other information. It should be understood that tenants in the building should submit or approve usage of the detailed information. According to some embodiments, the information can be obtained from telephone records and/or other public information sources. Alternatively or additionally, the information can be obtained from a subscription or subscriber service whereby the tenants (or authorized persons) request their information be included or displayed when map data is displayed. Such authorized person can provide the information that should be available upon a request. Other embodiments can allow an authorized person to register an object (e.g. house or property owned, which will be discussed in further detail Boundary component 508 can be configured to identify at least one discrete location in the image. The discrete location(s) can be the center of a roof or wall(s) of a structure, the center of an outside area or other object of interest, the corners of a roof, wall, outside area, or object of interest, or any location in the image that can act as a pivot point or axis for displaying object information. Boundary component can also ascertain a boundary or perimeter of the object or area of interest. The perimeter can be, for example, the footprint of the object (e.g. roof, sides of a structure). According to some embodiments, the perimeter or boundary information can be ascertained from an algorithm. For example, a parcel polygon or geometric figure (e.g., circle, rectangle, square, cube, . . . ) that defines a rooftop or viewable surface can be received by receiver component 502. Such geometric information can be uploaded by a business, for example, that defines the rooftop. Boundary component 508 can utilize that parcel polygon information and infer that there is potentially only one building (or other area of interest) inside that parcel polygon area. Based on the inference, the edges or perimeters of the area of interest (e.g., structure) can be computed to ascertain a built-up area (e.g., side of a structure) that includes the area of interest. It should be understood that various algorithms, methods, and/or techniques can be employed to ascertain the object shape, size, or area.

Also included in system 500 can be a stitching component 504 that can be configured to maintain the location-based information in one or more repositories through which the location-based information and associated imagery and data can be retrieved as if from a single repository.

A rendering component 506 included in system 500 can be configured to display the metadata associated with the area of interest and can selectively alter the position or perspective of the metadata based on a viewing perspective or on one or more axes (e.g., discrete location). The metadata or detailed information can be provided for a single structure or object or for each structure (or selected objects) shown on a map area. The rendering component 506 can display the metadata within the boundary of the footprint of the rooftop or within the footprint of a wall or side of a structure, for example. According to some embodiments, the metadata can be selectively displayed in accordance with a viewing angle of the image. For example, if a viewing angle or perspective changes from an overhead view (e.g., the metadata is displayed on a rooftop) to a forty-five degree angle, the information can change location from the rooftop to the side of the object, for example. Alternatively or additionally, the metadata can be displayed away from the footprint of the area of interest with a pointer or other marker indicating the area of interest to which the metadata refers. In still other embodiments, the metadata can be displayed in a list or on another viewing page.

Rendering component 506 can display the data as an overlay over the map information. In such a manner, the metadata can be transparent allowing viewing of the map area surrounding the metadata. Rendering component 506 can be configured to ascertain that the metadata displayed is current or updated based on retrieving or accessing internal and/or external information available to rendering component 506 and/or other components in system 500.

Figure 6:
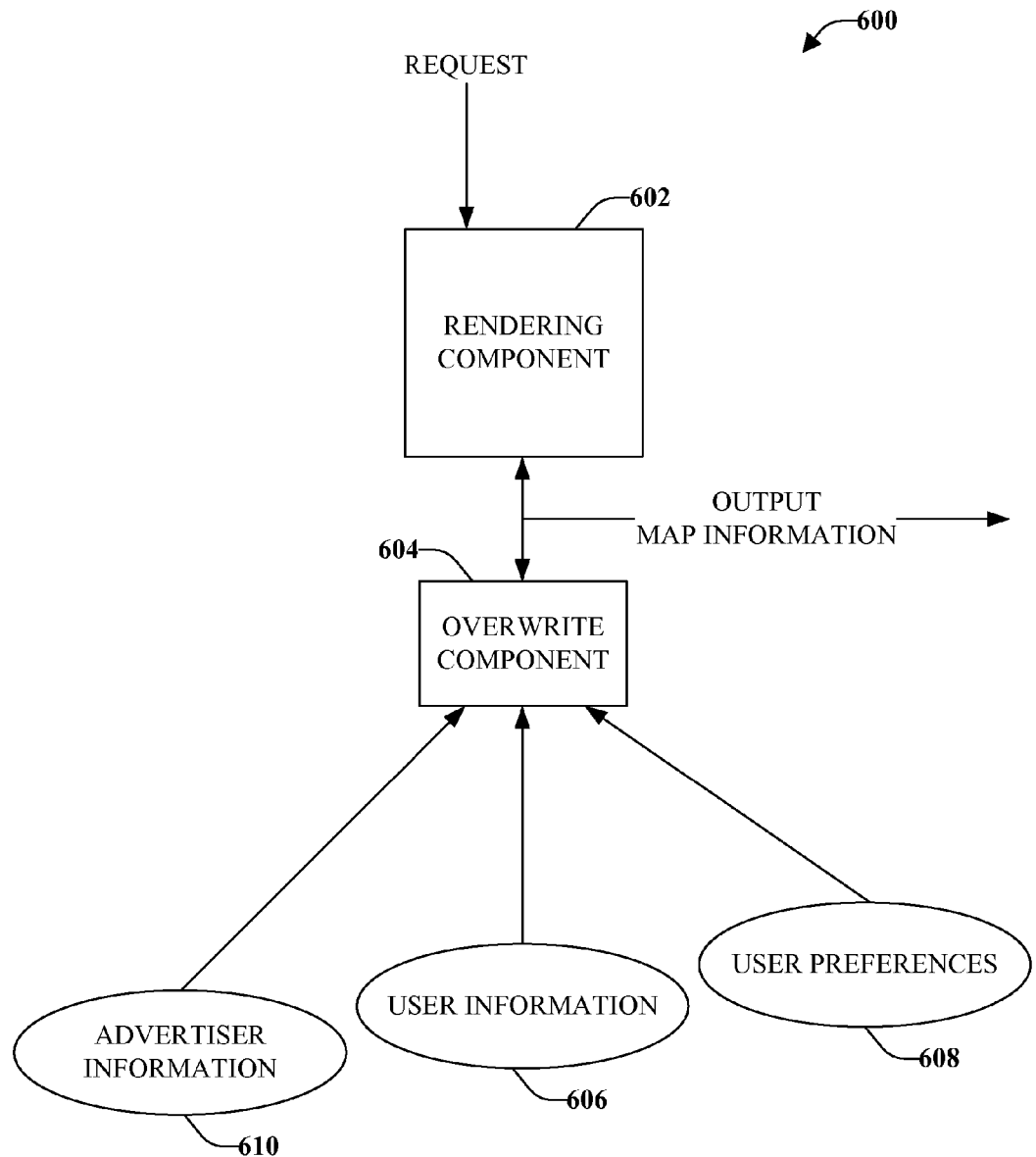
FIG. 6 illustrates a system for dynamically rendering mapping information in a three-dimensional space on a display area or screen

With reference now to FIG. 6, illustrated is a system 600 for dynamically rendering mapping information in a three-dimensional space on a display area or screen. System 600 can utilize the real-estate or geographic landscape on a display screen in conjunction with object boundary information to present various information in conjunction with other map features and/or to obscure various features and replace such obscured or deleted features. For example, results of a search can be dynamically rendered in a three-dimensional display space, which can be a function of the user position (actual or virtual). In addition, users have different needs and an advertisement or other information presented to one user may not be beneficial or of interest to another user. Thus, if advertisements (or other information) are presented as a function of a user preference, such advertisements might have a higher success rate.

A rendering component 602 can interface with an overwrite component 604 to present or output map information that is relevant to a user. The overwrite component 604 can be configured to delete one or more objects (e.g. a subset of the map information) or otherwise obscure such objects and replace them with different information, including advertisements. For example, an existing advertisement (e.g., on the side of a vehicle or building) on the display screen can be obscured or overlaid with a different advertisement based on the particular user (e.g., based on a user preference) viewing the map.

Overwrite component 604 can interface with a database or other source that captures user information 606 and/or user preferences 608. User information can relate to a search or query entered by the user or can be inferred by a machine learning component. For example, a user may be searching for places to eat and specifically for places that serve pizza. The user can enter as a search term "pizza" to request any known pizza places within the displayed map area (e.g. local based search). The system 600 can provide search results as a coarse animation of the topography of the area including streets. The viewing image can include an identification of all pizza places utilizing an actual image of the topography. The system can further virtually take the user to the pizza place and present a visual representation of the building. System 600 can also allow the user to view the inside of the place, if such images are available. In addition, system 600 can provide names and phone numbers of each pizza place displayed and/or provide an automatic means for the user to contact the place of interest (e.g., pizza place). In such a manner, system 600 takes advantage of the geographic landscape to enhance query results.

The user preferences 608 can provide information in addition to the results of a query for other places that might be of interest to the user. For example, in addition to displaying an image of the pizza place, system 600 can also display an advertisement for an ice cream shop that is in the neighborhood. Such advertisements can be appended to buildings in a street-side image, for example, by overwrite component 604.

In some embodiments, system 600 can be configured to provide advertising content in a tool tip (or mouse hover). Thus, rather than having the advertisement or other text automatically displayed, system 600 can display such information when the user hovers over a particular area of the map. This can be utilized in a top-view, a ground level view, or other views. When the user hovers over a particular area of the map, such as a clothing store, system 600 can display different information based in part on user preferences 608. For example, if a store is displayed, system 600 can provide a link to the store allowing the user to automatically be presented with a website or other information relating to that particular store. If the user is a woman, the system 600 may display items that are on sale in the store such as perfumes or dresses. However, if the user is a male, the system 600 can display different sale items, such as ties. In such a manner, the user is navigating through virtual space and system 600 is automatically annotating the map area with individual preferences as related to advertising.

In accordance with some embodiments, a particular advertisement that is physically present in the particular mapping location the user is viewing may be obscured or overwritten by overwrite component 604. The obscured advertisements might be replaced with a different advertisement (e.g., replacing advertising) that is user specific. For example, advertisements of objects such as businesses that are not clearly visible can be replaced with other advertisements more suitable for a particular user. In such a manner, the advertisement viewed by the user is applied as a function of the user preferences (user defined or system inferred).

In some embodiments, an advertisement can overlay various objects (e.g., buildings, houses, streets, parks, vacant land, vehicles) in the mapping application. The various objects with the overlaid advertisement need not have previously been overlaid with an advertisement. However, based on the user preferences and the desires of the advertiser, the objects might have the advertisement overlaid based on the user preferences.

In accordance with some embodiments, a user can take a digital picture of an area of interest (e.g., place) utilizing a mobile device, for example, and send that picture to a server or process it locally on the mobile device. Upon a request to view that area of interest, the picture can be displayed to the user in annotated form wherein some of the annotations are advertisements.

Overwrite component 604 might further be configured to modify map features based on advertiser information 610. Advertisers can purchase advertisements in the display space utilizing a per diem scheme, a click through scheme, any other scheme or combination of schemes. Advertisements can also be purchased based on geographic location. Such geographic location can be the actual physical location of the user or alternatively can be the geographic area that the user is viewing, which may not be the same as the physical location of the user.

In some embodiments, advertisements are not contained or limited by a geographic area. For example, an animated airplane with a streamer advertisement can periodically fly across the displayed map area. Thus, advertisements can be connected to a specific geographic area or can be general and move around among viewers and the display depending on the viewing area. These advertisements can be artificially placed within the displayed map area.

Figure 7:
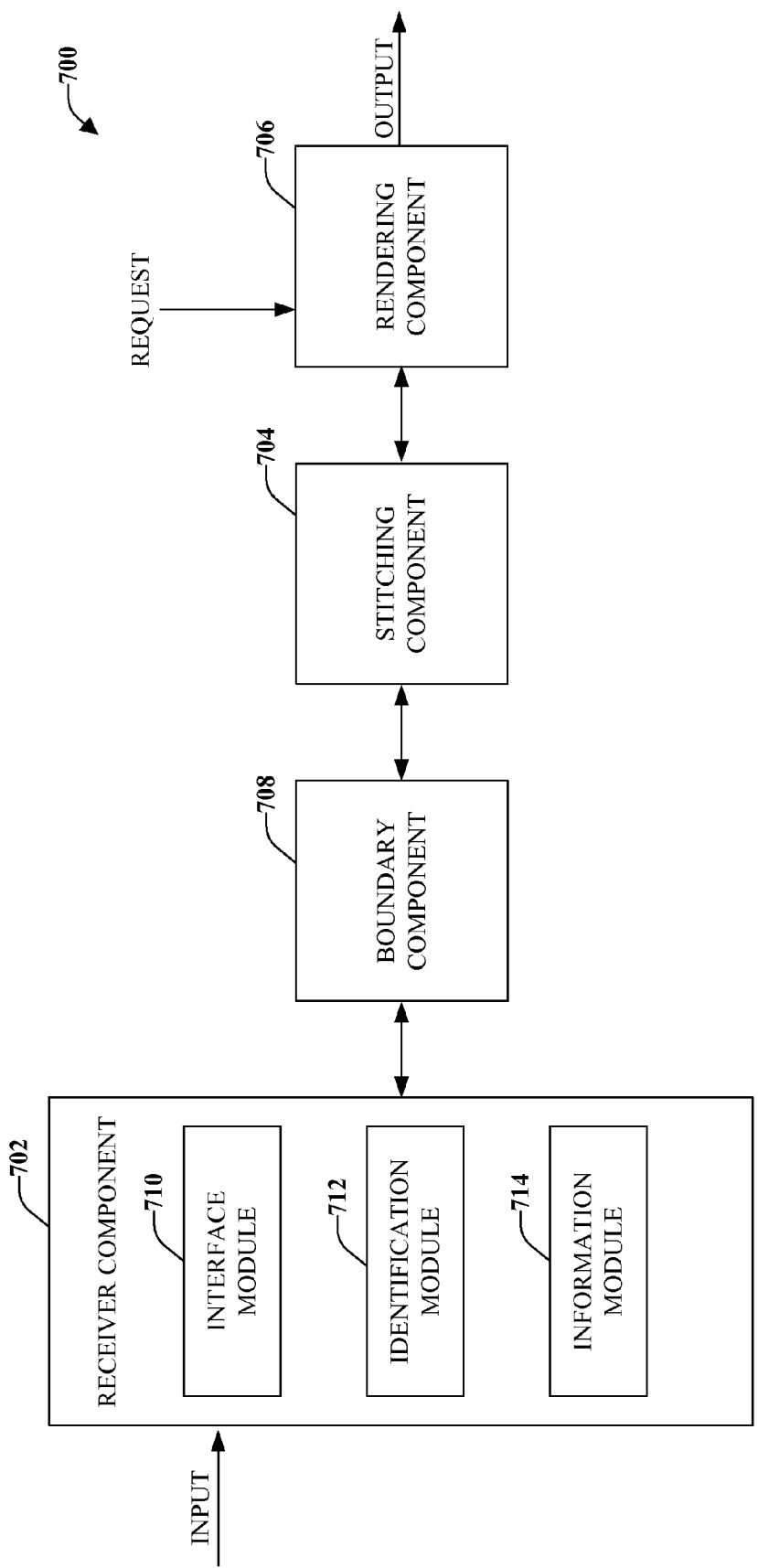
FIG. 7 illustrates another system for obtaining information relating to objects or areas of interest in a mapping environment.

FIG. 7 illustrates a system 700 for obtaining information relating to objects or areas of interest in a mapping environment. System 700 can include an acquisition component or receiver component 702 that obtains information from a multitude of sources, a stitching component 704 that maintains the information in a retrievable format and a rendering component 706 that displays the information upon request or based on a system 700 inference that such information should be displayed. Also included in system 700 is a boundary component 708 that can ascertain a parameter or footprint of an area of interest.

Receiver component 702 can include an interface module 710 that can be configured to receive, request, obtain, etc. one or more image(s) relating to an area of interest from at least one user. In some embodiments, receiver component 702 can receive more than one image of an area of interest from one or more users. For example, an image or picture can be obtained from a mobile device that is located in the vicinity of the area of interest. If two users are in the vicinity at substantially the same time or at disparate times, each user may capture an image of the object and each image might be different based on the location of the user when the image was captured. For example, one image might be taken from the west facing the front of the building at an angle and the other image from the east facing the front of the building at an angle. An algorithm or ranking technique can be utilized to ascertain which image and/or information is the most accurate and/or which image and/or information to retain for that particular object or place of interest or whether both images should be retained.

An identification module 712 can be configured to identify the captured area of interest. Such identification can be received along with the image or can be identified at a different time. Such identification can include the address of the object, the geographic coordinates, or other identifying data including geo-coded information. The identification can be supplied by the user when the image data is received at the interface module 710. For example, a mobile device from which the information or image was provided can include a Global Positioning System (GPS) functionality or other functionality for ascertaining the location (e.g., geographic coordinates) of the mobile device. Such information can be captured and associated with the received image and/or information.

Another module associated with receiver component 702 can be an information module 714 that can obtain, receive, request, etc. detailed information relating to the object of interest. As used herein an object of interest is any entity or object (e.g., building, landscape, house, street corner, landmark, . . . ) or a specific geographic location (address, geographic coordinates). For example, the detailed information can be metadata associated with the object of interest and such metadata can include a hierarchy of information.

At a high level, the hierarchy can include information such as a location (e.g., address, geographic coordinates) or the name of the object of interest, if one is associated with the object. The naming convention can be, for example, the name of a restaurant, zoo, park, office building, library, university, government areas, etc. A next level of the hierarchy can be a phone number of the object. A next level can be a contact person name and so forth. The user can drill down into the hierarchy to obtain more detailed information concerning the object.

Figure 8:
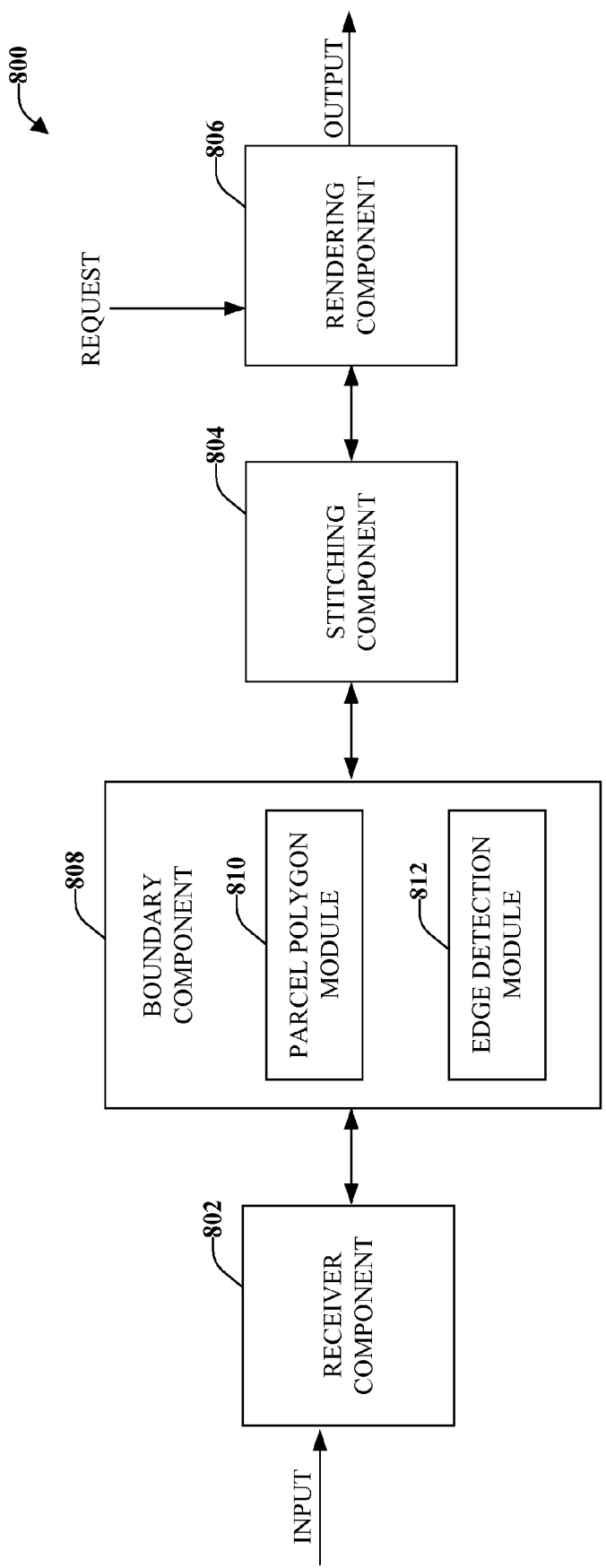
FIG. 8 illustrates a system for detecting or ascertaining an area or footprint of an object of interest.

With reference now to FIG. 8, illustrated is a system 800 for detecting or ascertaining an area or footprint of an object of interest. System 800 is similar to the systems shown and described with reference to the above figures. Included in system 800 can be a receiver component 802 that can obtain information from one or more users (e.g., 3-D image of a particular location and/or geo-coded information), a stitching component 804 that maintains the information in a retrievable format, a rendering component 806 that can display the information, and a boundary component 808 that can detect or ascertain an area or footprint of an object of interest.

Boundary component 808 can include a parcel polygon module 810 and an edge detection module 812. Parcel polygon module 810 can be configured to receive or ascertain a polygon or geometric shape that defines a rooftop, wall, plane, viewable surface, etc. of an area of interest. For example, a building owner or other authorized person can submit or upload a polygon that defines the rooftop. Based on this submitted information, the polygon of the rooftop can be duplicated and information provided within the parameters of the polygon (or the building or rooftop obscured based on the known parameters). If the building or rooftop is not large enough to contain viewable information about the object, the information can be displayed adjacent to the object or at another position on the display, provided a user can ascertain which information belongs to which object.

The edge detection module 812 can be configured to determine the edges or outside area of the object of interest. In some embodiments, the area of interest may be an outdoor area, such as a park, zoo, garden, etc. and, as such, has no rooftop associated with it. For these areas of interest, the parcel polygon module 810 can ascertain that the area of the object of interest is the perimeter of the parcel (e.g., park, zoo, . . . ). The edge detection module 812 can be configured to render the information viewable within the area of the object of interest.

Figure 9:
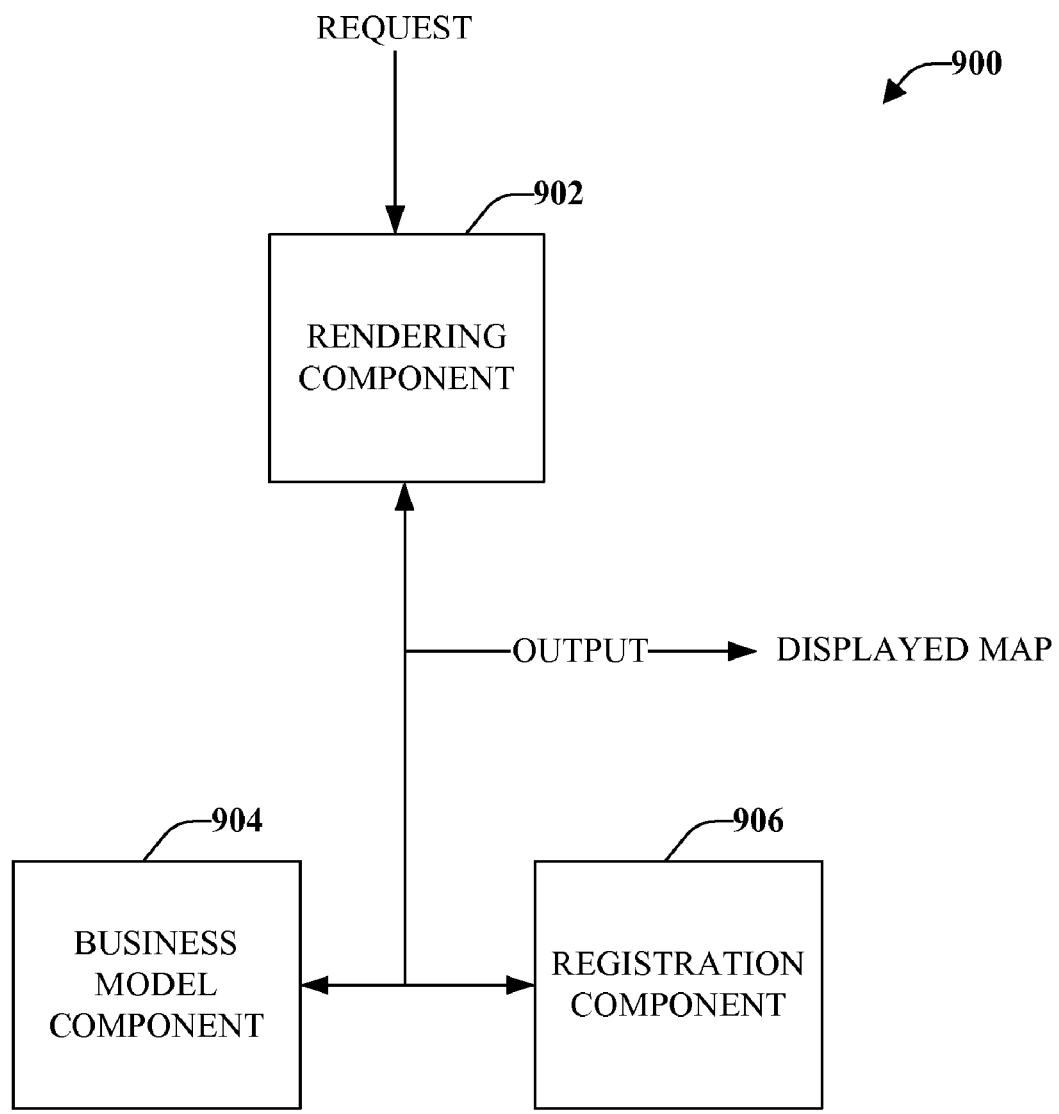
FIG. 9 illustrates a system that can be configured to render various actions as it relates to registering locations and/or making business decisions.

FIG. 9 illustrates a system 900 that can be configured to render various actions as it relates to registering locations and/or making business decisions. System 900 can allow a user of physical property to register such property with a web-based mapping application to allow advertisers or others to utilize the display area. System 900 can also provide various information that can lead to informed business decisions (e.g., where to open a business, advertisers in a geographic area). This detailed information can be provided based on location information within the map area as well as information relating to business trends and other criteria.

System 900 includes a rendering component 900 that can be configured to display a web-based map and corresponding map features based on a request for such information. Rendering component 900 can be configured to interface with a business model component 904 that can be configured to facilitate business decisions by presenting various business and legal aspects with respect to the geographic area (e.g., local, regional, country) displayed. Business model component 904 can access various codes, regulations, laws, and the like to render such information.

Business model component 904 can be configured to identify an optimal location for a business given the density of population, the distance of potential competitors, and the like. For example, it might be illegal in a particular location or country to open a store within a predetermined distance of a similar business. Business model component 904 can identify the existing business and display an area around such business on the map area where the new business should not be placed. Alternatively or additionally, business model component 904 can notify an advertiser if a competitor is advertising in a map area. In such a manner, existing advertisers can be aware of what is going on in a virtual physical world and make informed business decisions.

Rendering component 904 can also be configured to interact with a registration component 906 that can be a tool configured to facilitate registration of a particular three-dimensional space (similar to domain registration). An advertiser desiring to rent or own a particular three-dimensional space can utilize the tool to register the physical location. Owners, renters, or other authorized persons can register their home, building, or other space. Such owners etc. can claim, register, and lease (or give away) the rights to overlay information on their registered space(s).

Figure 10:
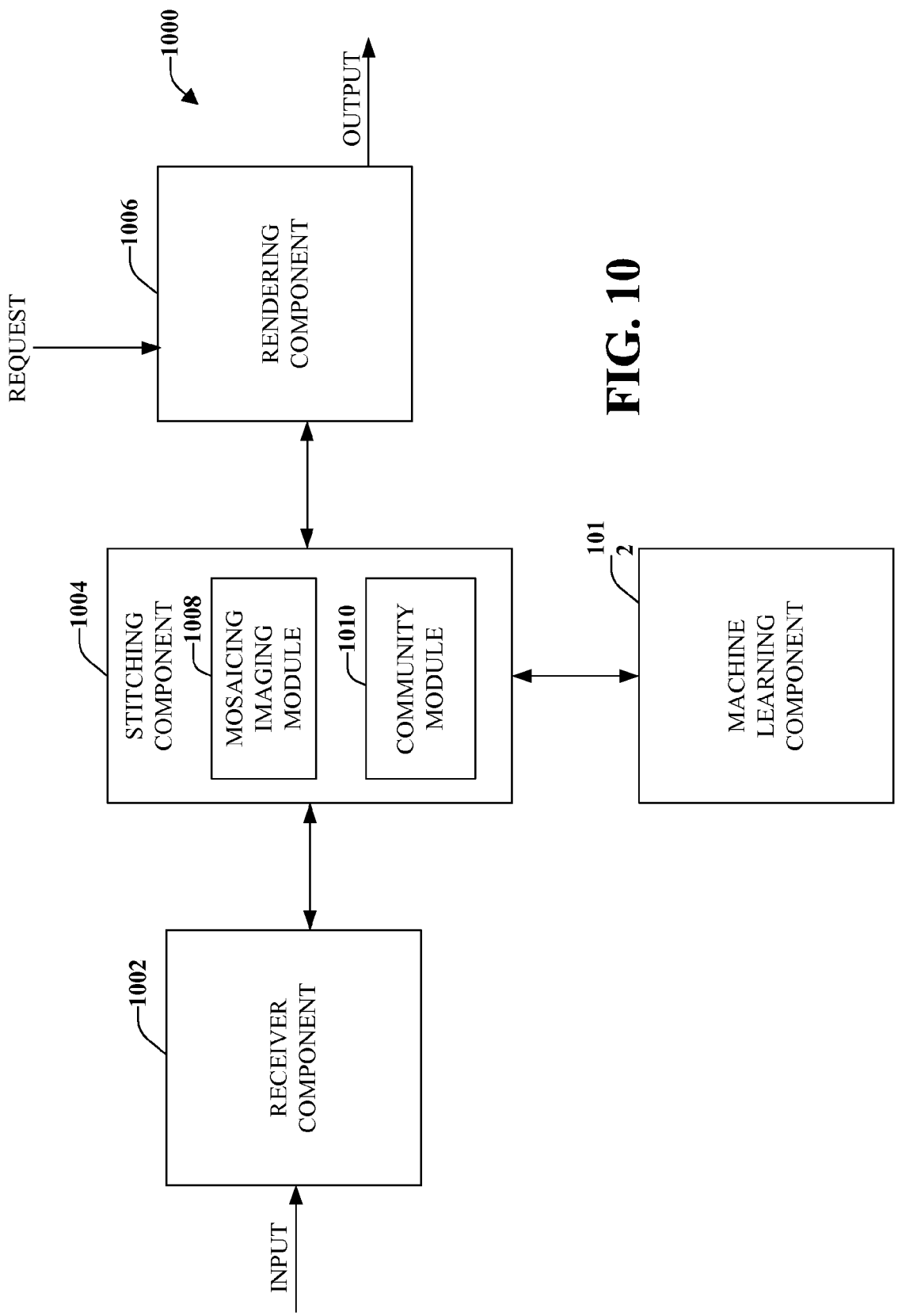
FIG. 10 illustrates a system that maintains a central repository of location-based information.

With reference now to FIG. 10, illustrated is a system 1000 that maintains a central repository of location-based information. System 1000 includes a receiver component 1002 that facilitates user entry of location-based (and time-based) information. The location-based information is maintained in a stitching component 1004 and transmitted to a rendering component 1006 upon a user request for a subset of the location- (and time-) based information.

The stitching component 1004 is configured to maintain the location-based information in one or more repositories through which the location-based information can be retrieved as if from a single repository. The stitching component 1004 facilitates breaking down an image into stitchable squares or tiles, each rendered and downloaded independently. A code, such as HTML, combines the squares to show a seamless image. As the user pans and zooms, additional sections are downloaded.

The data collection or stitching component 1004 can include a mosaicing-imaging module 1008. Mosaicing imaging applies at a pixel level and provides mapping to physical locations. This allows a street side to be scanned such that the street, when viewed, has side streets connecting to such street. Both the main street and the side streets can be viewed at various angles including from a forty-five degree angle and from a top view. Mosaicing imaging also allows viewing of cultural objects and those objects, things, events, etc. associated with a neighborhood. It also allows a user to use pixel level mapping to view a physical location.

In a practical implementation, there is a tremendous amount of information available through the collection of a vast amount of image data from a multitude of sources. Obtaining a granular level viewing, such as a house, is simplified because the image collected is a geo-reference and the system knows where every pixel relating to the image data is located on earth. When a variety of users provide image data and/or oblique images, the system identifies each pixel of the image and stitches all the images together to form a comprehensive data image.

The images received from the variety of users may or may not be related, thus every point should be identified as it relates to real world experiences. This is similar to embedding on a clay model by setting an identification for every point on earth and providing an exact location of each point. There are at least three things going on at any point in time. The first is pictometry to collect the imagery (receiver component 1002), which are all geo-referenced and included in the model. The second is mosaicing that makes one large function point out of the variety of images. The last is a huge image that is compiled by taking each digital image and associated tiles and making them into stitchable parts. It is these stitchable parts or tiles that are put on a multitude of servers. Each tile is organized with a reference or identification indicator allowing the system 1000 to locate each tile based on the identification associated with each tile. The stitching is applied to the map and provides reference labels as well as other identifying criteria. Further information regarding providing or serving up these large images quickly will be discussed in more detail below.

The stitching component 1004 can include a community module 1010 configured to maintain information received from a community of users. The community module 1010 can find an entity (e.g. location, place, event . . . ) based on a community that recommends that particular entity. The community can be defined as persons listed in the user's instant messenger, frequent contacts, or other defined criteria. The community may also be a certain geographic region, such as a city, portion of a city, etc. An entity can be based upon a subset of all entities the user has saved, such as with a bookmark, or can be based on the entire spectra of entities that particular user has enjoyed. Thus, when a user visits, for example, a restaurant, and has liked the food, service, atmosphere, etc. the use can save the specifics of that restaurant as a bookmark and can further include user-defined descriptions, such as notes or recommended foods, etc. This provides a way for others to search for a particular entity based upon the user's saved bookmarks, provided such user is defined as a member of the other's community.

A community search can be broadened or narrowed depending on user requirements. The broadest spectrum is the entire community (city), a middle spectrum is a user's own community (frequent contacts), and the narrowest is associated with the specific user or that user's saved bookmarks. The user is able to go back and forth from narrowest to broadest search and additionally can search any spectrum between the narrowest and broadest. It is also possible for the user to request a search for, or based upon such user's contact(s), those contacts' contact(s), or those contacts' contacts' contact(s), etc. in an ever expanding and/or distant range of contacts away from the user.

The search can be conducted based upon inference, or artificial intelligence provided by a machine-learning component 1012 that interfaces with the stitching component 1004 or other components of the system 1000. For example, a first user may have a preference for a particular restaurant and a second user has a similar, although not necessarily identical, preference. If the first user is unfamiliar with an area and/or not aware of similar restaurants such user might enjoy, a search can be conducted based on an inference using the second user's preferences. The search can be conducted utilizing user-defined criteria or system defined criteria based upon that user's known likes and dislikes, as previously entered by the user. An inference or machine-learning component 1012 and/or engine can then search for additional users that have similar preferences, such as a second user. The system 1000 can recommend suitable restaurants based upon an inference that the likes and dislikes of the two users are similar, even if the users do not know of each other and provided each user previously agreed that his/her information can be used in such a manner. Some of this inference can be based upon a social network, such as utilizing an instant messenger system as a social network.

An inference search can be based upon an inference of what another person would prefer. For example, a husband may want to take his wife out for a special occasion and has decided, since it is special, to do something his wife would prefer doing, rather than what he would prefer. In this instance the husband can search based upon his wife's preferences and his wife's community preference with no relationship to and/or combination with the husband's preference. This is basically a search to determine what another person would prefer without actually asking such person, which provides an element of surprise and/or good judgment. Another type of inference search can be based upon a combination of the preferences of two or more people. By combining the multiple preferences, an inference can be drawn about something both or all might enjoy doing together.

An inference engine (e.g., machine learning component 1012) can provide a geographic inference search based upon time-based information and/or social network-based information. A training mode could be started with a seed model and as data is captured or pushed into the system 1000 it can learn the preferences of the user. The system 1000 or architecture can capture data relating to the places the user has previously viewed, searched for, or indicated in some manner a preference, and, based upon that data, infer that the user will be interested in a particular activity, such as a sport activity, a social activity, a business activity, etc. The preferences of the user are placed into large types or groupings of activities and by applying filters, the system can infer what that person may be interested in and drills down into a particular activity. Once the system 1000 learns such user's preference the system 1000 achieves an intelligence and can apply such user's preference in relationship to the community enabling faster and more accurate searches and recommendations.

Figure 11:
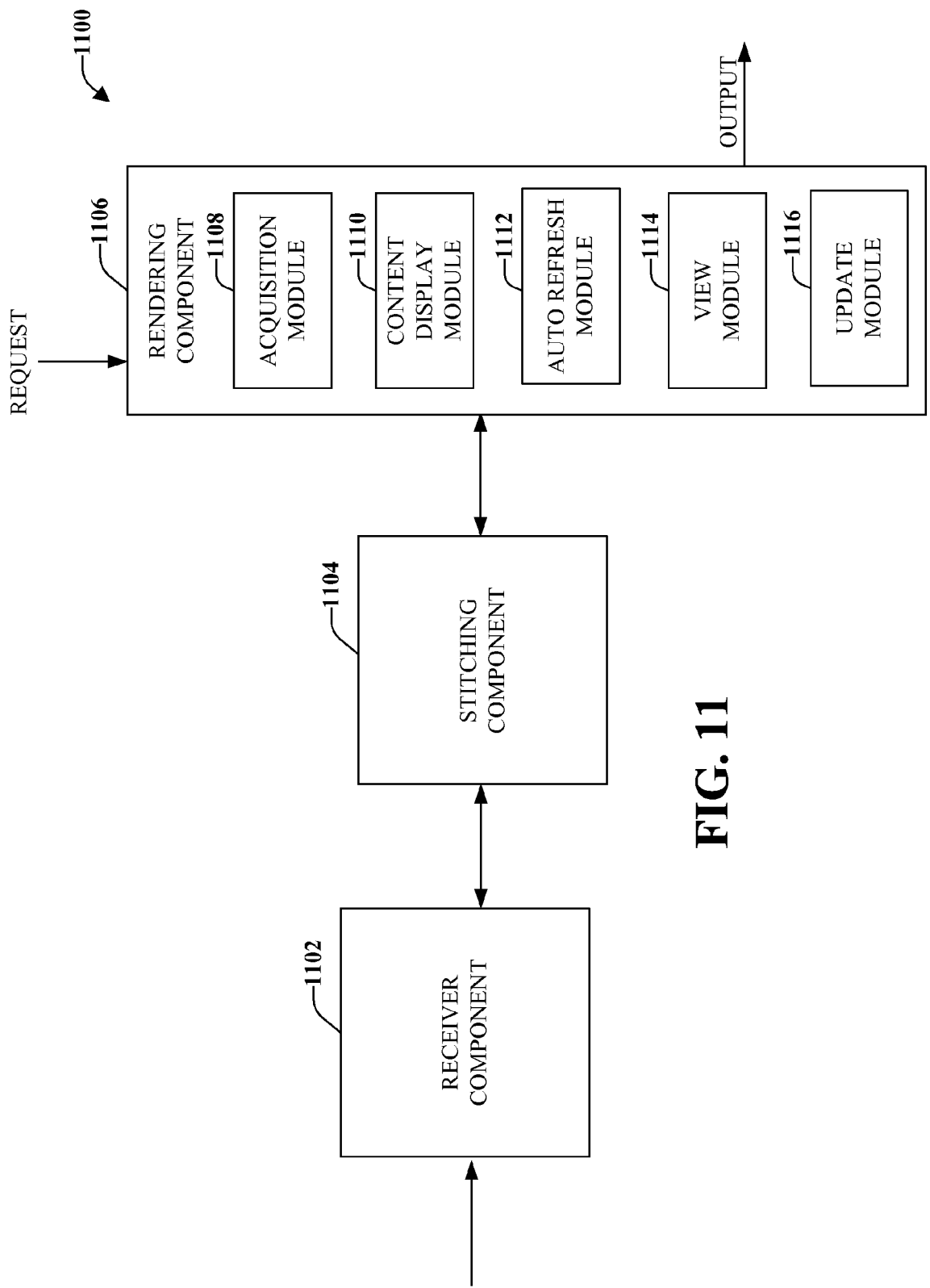
FIG. 11 illustrates a system for outputting map information to a multitude of users.

FIG. 11 illustrates a system 1100 for outputting map information to a multitude of users. System 1100 includes a receiver component 1102 that receives data, images, and other information from a multitude of users. The data, images, and/or information is communicated to a stitching component 1104 that maintains the data in a logical format allowing the data and images to be available for a large number of users through an interaction with the rendering component 1106. The rendering component 1106 is configured to display map information and associated data through an interface between an acquisition module 1108, a content display module 1110, an auto refresh module 1112, a view module 1114, and an update module 1116 that ascertains if updated information is available and updates the information before or at substantially the same time as the information is displayed. It should be appreciated that less or more modules than those shown and described can be utilized in conjunction with or separate from the rendering component 1106.

The acquisition module 1108 is configured to receive map information to be displayed, which can include receiving a user request to view an area or place on a map. For example, the user can request to view a particular geographic area (e.g. city, street, building, address, . . . ), through a user interface. The map focal point can be based on the center of the screen, however, a user can also look at a specific entity or location, such as a restaurant, and/or certain accommodations associated with entities of that type. For example, a search can be performed for all Mexican restaurants that have a five star rating, a nice view, live music performance, serve alcoholic beverages, etc. Associated with the search results can be additional data including imagery, text, and/or voice data.

The content display module 1110 is configured to render a subset of the map information in a display space or a viewing area (e.g. monitor, display, . . . ). The content display module 1110 is also configured to render user interface controls so as to overlay the map information within the display space. The controls are rendered so as to be semi-transparent such that map information residing under the control(s) is viewable. In such a manner, a user can manipulate the user interface controls and at substantially the same time view the map contents and associated information.

By way of example and not limitation if a user wants to find all Starbucks® in Seattle as well as the different places available for parking in the area, the user can view both results together on the map. The user would enter a search, such as "Starbucks in Seattle" and/or "parking in Seattle." A search based on the user input criteria is performed by the system 1100 and on the viewing page (map) both criteria, if both were entered, are shown and distinguished by, for example, different colors. The user can selectively turn each search criteria "on" or "off" individually for ease of clarification and distinction. Thus, if the user, having conducted the above search, only wants to see places to park, such user would select an "off" feature and the indicators for Starbucks® would be removed from view. The user is able to turn those features back "on" and they will reappear on the viewing screen.

In another example if the user, having conducted the above search, additionally or alternatively wants to find an Italian restaurant and an ATM machine, such user can enter search criteria, such as "Italian food in Seattle" and/or "ATM in Seattle." The system conducts the search and layers the results of the search with the results of the above search allowing viewing of all search criteria at a substantially similar time. This layering feature allows the different search features to be viewed together, with for example, different colors or other marking indications, such as flags, geometric figures, etc. Further information regarding the display overlay or laying function will be described below.

Additionally or alternatively, content display module 1110 can be configured to display information associated with an area of interest. Such information can include, for example, a listing of offices or tenants in a building or stores in a shopping mall, telephone number(s) (e.g., voice, facsimile), hours of operation, services provided, current sales information, and the like). The displayed information can be transparent such that the area of interest and surrounding objects (e.g., map information) residing under the information is viewable. In such a manner, a user can manipulate the information through, for example, a user interface control, and at substantially the same time view the area of interest(s) and associated information and map objects.

The auto refresh module 1112 is configured to dynamically update the map displayed information as a function of cursor movement within the display space. A multiple or layering search can be done within a specified distance and/or geographic area, such as miles or city blocks, and can be limited to the portion, section, or area of the map that is in the viewing area. When the user "zooms in" a portion of the map to view a small section on the map in an enlarged view, the screen automatically refreshes and the search is automatically performed again but this time limited to the area of the map that has been enlarged. When the user moves the map around, such as moving north, south, etc. the search is automatically performed or auto refreshed for that new area as the map is moved, allowing for the indicators or controls to constantly change. This refreshing is performed autonomously by the system 1100 without any necessary interaction from the user.

For example, a user can request the location of all museums with a city. Textual information regarding the museum name, address, phone number, hours of operation, etc. are displayed with a pointer or line indicating the specific location of the museum. If there are no museums in the requested area or if the user wants to broaden the search area, the user can "zoom out" to view a larger geographic area, such as the surrounding cities. The auto refresh module 1112 automatically refreshes the data associated with the map such that the requested information is updated for the display area. In the above situation, additional museums may display while others, no longer in the viewing area, are removed from the display screen The auto refresh component 1112 mitigates the necessity of the user reinitiating the search after a "zoom in," "zoom out," or other command functions are complete.

The view component 1114 is configured to provide a multitude of users the ability to view the map information from a variety of viewing angles as well as viewing the map information in its format at some time in the past, future, and its current format. The user can control the view with a user control adjustment associated with a user interface. The view component 1114 can render an oblique view of the map information. The map information can be viewed as a bird's eye angle, a top viewing angle, a perspective angle, a front viewing angle, a back-viewing angle, a downward trajectory-viewing angle, an upward trajectory viewing angle, etc. In this manner, an image can be viewed from a variety of angles and directions.

A "nearby" search based on vicinity is available that facilitates searches for specific places, such as restaurants, parking areas, ATM machines, movie theaters, buildings, homes, etc. For example, the nearby search can find all ATM machines that are within a user-defined area or distance from a Starbucks®. In this way, the user is not only finding the specific locations for both "Starbucks" and "ATM machines" but the system 1100 is limiting the search to return results for only those Starbucks® that are located near an ATM machine.

System 1100 contains a large amount of data and the data should be in a format that allows a user to enter search criteria to easily retrieve the desired information. The information can be retrievable based upon a specific moment in time (past, present, future prediction) for which the user desires information. For example, the view module 1114 can include a time component that is configured to provide a user the means to locate a particular place, thing, etc. at a particular time. As data is received by system 1100 the data can be time stamped, either with the time received or with the time the information was captured by the inputting device. Thus, when a user selects a location and time combination, the user is presented with easily retrievable data in the format that is valuable to the user. For example, a user may want to view a location before a hurricane and also view the same location after the hurricane. System 1100 allows such viewing and can tailor the information to a specific user request.

An update module 1116 can be associated with rendering component 1106, however, it should be understood that update module 1116 can be associated with other system 1100 components (e.g., receiver component 1102). Update module 1116 can be configured to ascertain whether updated information (e.g. image, metadata, location, . . . ) has been received and/or associated with the object of interest. Such information can be appended to the metadata associated with the object. According to some embodiments the information associated with the object of interest can be modified, substituted, etc. with information obtained by update module 1116. For example, a user can submit object information that conflicts with information previously received. The conflicting information can be reviewed by one or more users and ranked according to which information is the most accurate for that particular object of interest. The information receiving the highest ranking (on a scale where the higher the number the more accurate the data) can be associated with the object of interest. In such a manner, if the new or updated information received is not considered appropriate (e.g. has a lower ranking than the previous information), the previous information should not be replaced or updated by update module 1116. It should be understood that other systems, techniques, or methods can be utilized to determine accuracy of information associated with an object of interest and/or mapping information.

Figure 12:
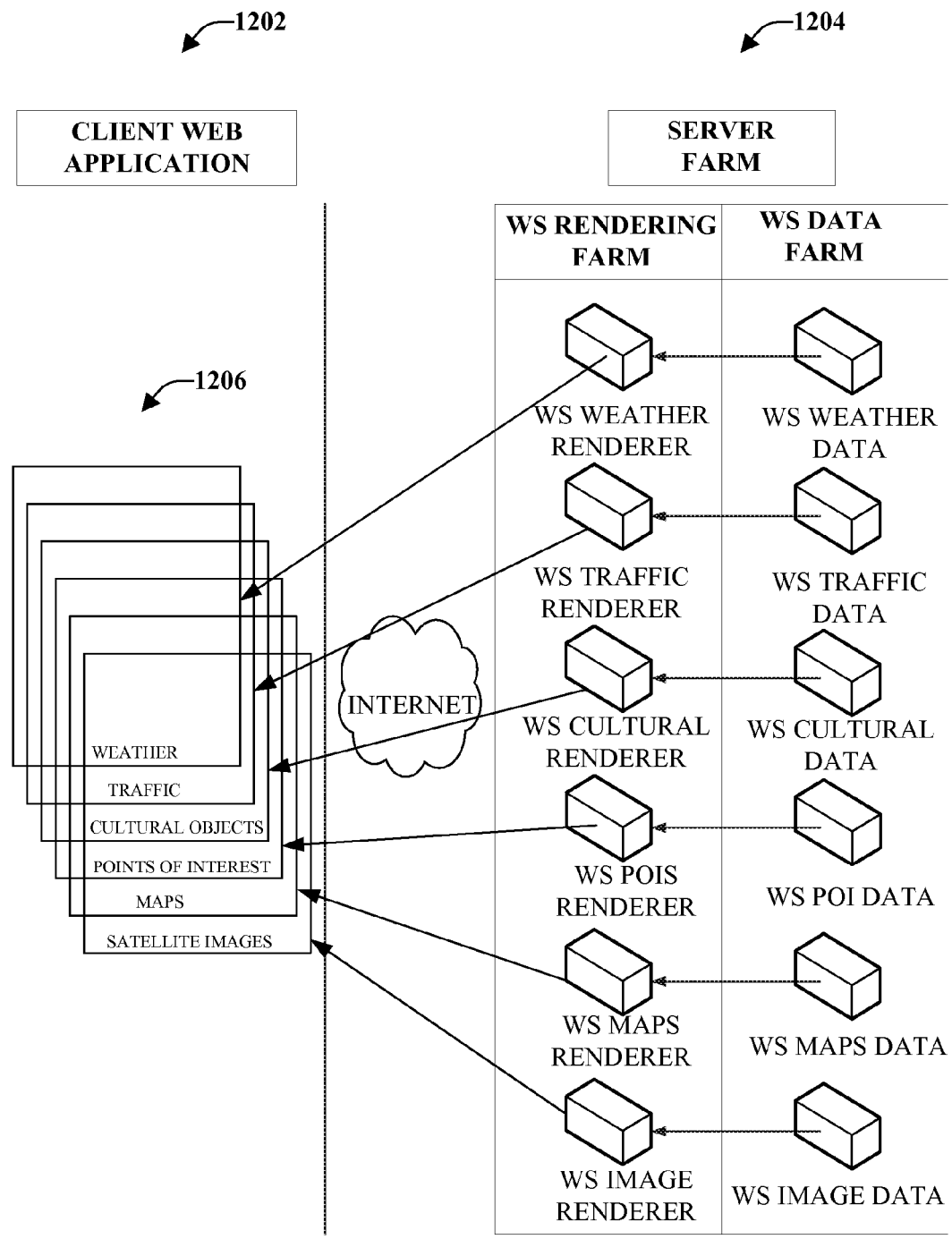
FIG. 12 illustrates components for creating mapping layers.

FIG. 12 illustrates components for creating mapping layers. As illustrated, a client web application 1202 communicates with a server farm 1204 through the Internet, for example, to request mapping information. The mapping information is split into independently downloaded tiles 1206. As illustrated, each tile can represent different subject matter (e.g., weather, traffic, cultural object, points of interest, maps, satellite images). However, the tiles can represent different subject matter or a single subject matter can be distributed over more than one tile. A user can also configure personal tiles depending on the tiles that the user desires to view.

Figure 13:
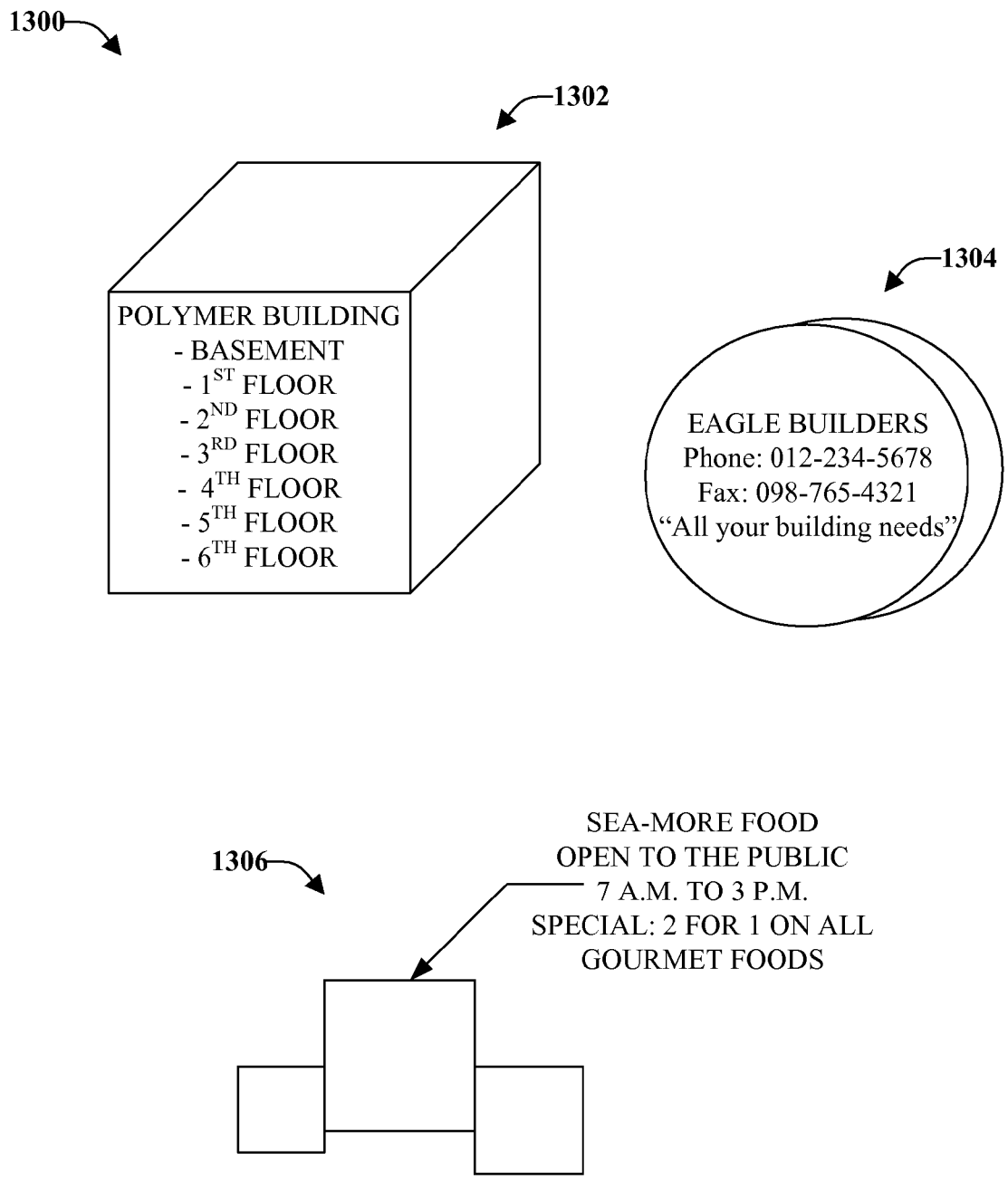
FIG. 13 illustrates exemplary rooftops displaying information relating to one or more objects of interest.

FIG. 13 illustrates exemplary rooftops 1300 displaying information relating to one or more objects of interest. Illustrated are three rooftops: a square rooftop 1302, a circular rooftop 1304, and a combination of closely spaced rooftops 1306. It should be understood that while square and circular rooftops are illustrated, the disclosed technique work equally well with any shape of rooftop (e.g., rectangular, octagonal, pentagon shaped, or other shapes and/or configurations).

According to some embodiments, illustrated at 1302 and 1304, the information is annotated to the image and can be displayed directly on the rooftop, as if it were physically located on the rooftop. Such information can overlay the rooftop and may utilize the entire rooftop bounded by its physical shape and can comprise various information including an advertisement or logo. In some embodiments, the information can be displayed in three-dimensional format, whereby the information appears to project from the rooftop, giving depth to the image. In some embodiments, a rooftop may be physically painted a particular color to provide sophisticated fill-in/overlay, similar to blue screen technology used in movies.

As shown, at 1302, the information provided can be the building name and a listing of floors located in that building. The user can select one or more of the floors to drill down into more detailed information about the building and the various occupants of the building. Such detailed subcomponent information can be provided, for example, with a drop-down menu. According to some embodiments, the user can automatically contact a selected tenant or move to the tenant's website, by clicking on or selecting the tenant name or other selectable information.

The rooftops illustrated at 1306 are for three different structures. Since these rooftops are small and/or the structures are compact and close to each other, the information displayed can be placed adjacent to the rooftop with a pointer or other means of identifying the structure to which the information belongs. According to some embodiments, the information can be truncated to fit within the footprint of the structure. It should be understood that while the above has been illustrated and described with reference to rooftops, the disclosed techniques can be applied in a similar manner to objects of interest that do not have a rooftop (e.g., park, zoo, . . . ).

In accordance with some embodiments, an overlaid image or information can selectively rotate about one or more axes (e.g., discrete location) and/or be repositioned about another location (e.g., side of building, parking lot, unoccupied property or land, and the like) as a function of a user viewing perspective. For example, if a user is viewing an object of interest (e.g. building, item, location) from overhead, the orientation of an overlaid image can rotate based on the user's relative location to the object of interest. Moreover, vanishing points can be employed to dynamically alter the image (e.g., stretch) so that an overlaid image appears to the user in a similar manner as if it was painted on the object of interest. If a user is viewing a building or item from a side perspective (as compared to a bird's eye view), the overlaid image could migrate to the side of the building or the item most exposed to the user. By way of example and not limitation, FIGS. 10 and 11 depict various views of an overlaid image as a function of a user viewing perspective.

FIG. 14 illustrates an overhead view of a first structure or building 1402 having a roof 1404 and two sides 1406, 1408 that are in view. Also illustrated is a second structure or building 1410 having a roof 1412 and two sides 1414, 1416 that are in view. It should be understood that either or both buildings 1402, 1410 can be viewed from other sides or angles than that illustrated, including internal viewing of the structure. Each building 1402, 1410 has annotated information overlaid on their respective roofs 1404, 1412, based on the overhead viewing perspective.

FIG. 15 illustrates a side view of a first structure 1502 having a roof 1504 and two sides 1506, 1508 and a second structure 1510 having a roof 1512 and two sides 1514, 1516. The viewing perspective of the structures 1502, 1510 is from a side view, therefore, the annotated information is displayed or overlaid on respective sides 1506, 1514, of the structures 1502, 1510. As illustrated on the side 1514 of the second structure 1510, the annotated information can be displayed in a different format than if displayed on another viewable surface (e.g., the rooftop as illustrated in the preceding figure) or the information can be truncated to fit within the footprint of the structure.

According to some embodiments, respective users can be exposed to the different overlaid images over a same object of interest at substantially the same time. More particularly, user A and user B could be viewing the same building from two different computers at approximately the same time, however, each user would be exposed to a different overlay that can be a function of a variety of metrics (e.g., demographics, user preferences, user state, historical data, client-side advertising, auction models, . . . ). Accordingly, the overlay experience can be customized and tailored to optimize user viewing experience and/or revenue maximization.

In view of the exemplary systems shown and described, methodologies, which may be implemented in accordance with one or more aspects of the various embodiments, are provided herein. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement a methodology in accordance with one or more aspects of the disclosed embodiments. It is to be appreciated that the various acts may be implemented by software, hardware, a combination thereof or any other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Those skilled in the art will understand and appreciate that a methodology could alternatively be represented as a series of interrelated states or events, such as in a state diagram.

Figure 16:
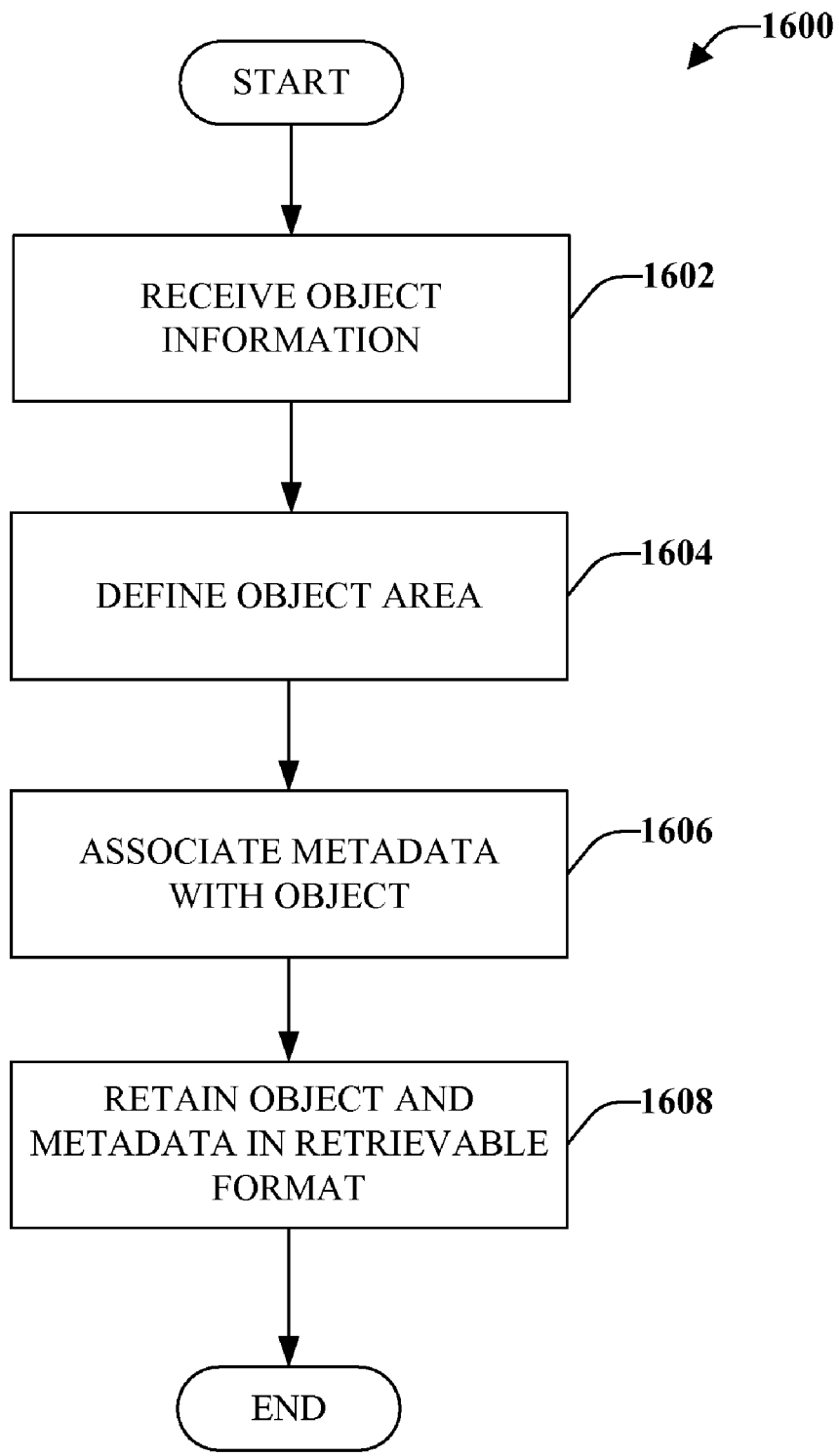
FIG. 16 illustrates a methodology for associating information with an object of interest.

FIG. 16 illustrates a methodology 1600 for associating information with an object of interest. Method 1600 begins at 1602 where object information is received from one or more users and/or entities. The object information can include an image or picture depicting an object of interest. The image can be a three-dimensional image of a particular location, place, etc. The object information can include geo-coded information (e.g., longitude, latitude, street information, and the like). As used herein an object of interest is any entity or object (e.g., building, landscape, house, street corner, landmark, . . . ) or a specific geographic location (e.g., address, geographic coordinates). At 1604, an area of the object of interest is defined. The area can be, for example, a footprint (e.g., rooftop) of a building or other structure, the perimeter of a parcel of property (e.g., structure, land, and the like). The area can define the viewing space for information associated with the object of interest. For example, the viewing space can be the entire rooftop (or outside area) bounded by its physical shape. At 1604, one or more discrete locations of the object can be identified or defined. The discrete location(s) can be the center of a roof or wall(s) of a structure. If the object does not have walls or a roof, the discrete location can be the center of the outside area or other object of interest. Additionally or alternatively, the discrete location(s) can be the corners of a roof, wall, outside area, object of interest, or any location in the image that can act as a pivot point for displaying object information.

At 1606, optional metadata can be associated with the object or area of interest. The metadata can include a name, logo, trademark, trade name, phone numbers, hours of operation, special events, and the like. Other information that can be associated with the object can relate to various items that may be of interest to a user. The metadata can include the geo-coded information received with the object image.

The object and associated information, including metadata can be retained in a retrievable format, at 1608. This information can be retained or stored until such information is overwritten or replaced with new information, if an authorized person requests the information be removed or no longer subscribes to a service, if the information is deemed untrustworthy, or for other reasons. The object, information, and metadata can be retrieved and appended upon a request for the object of interest.

Figure 17:
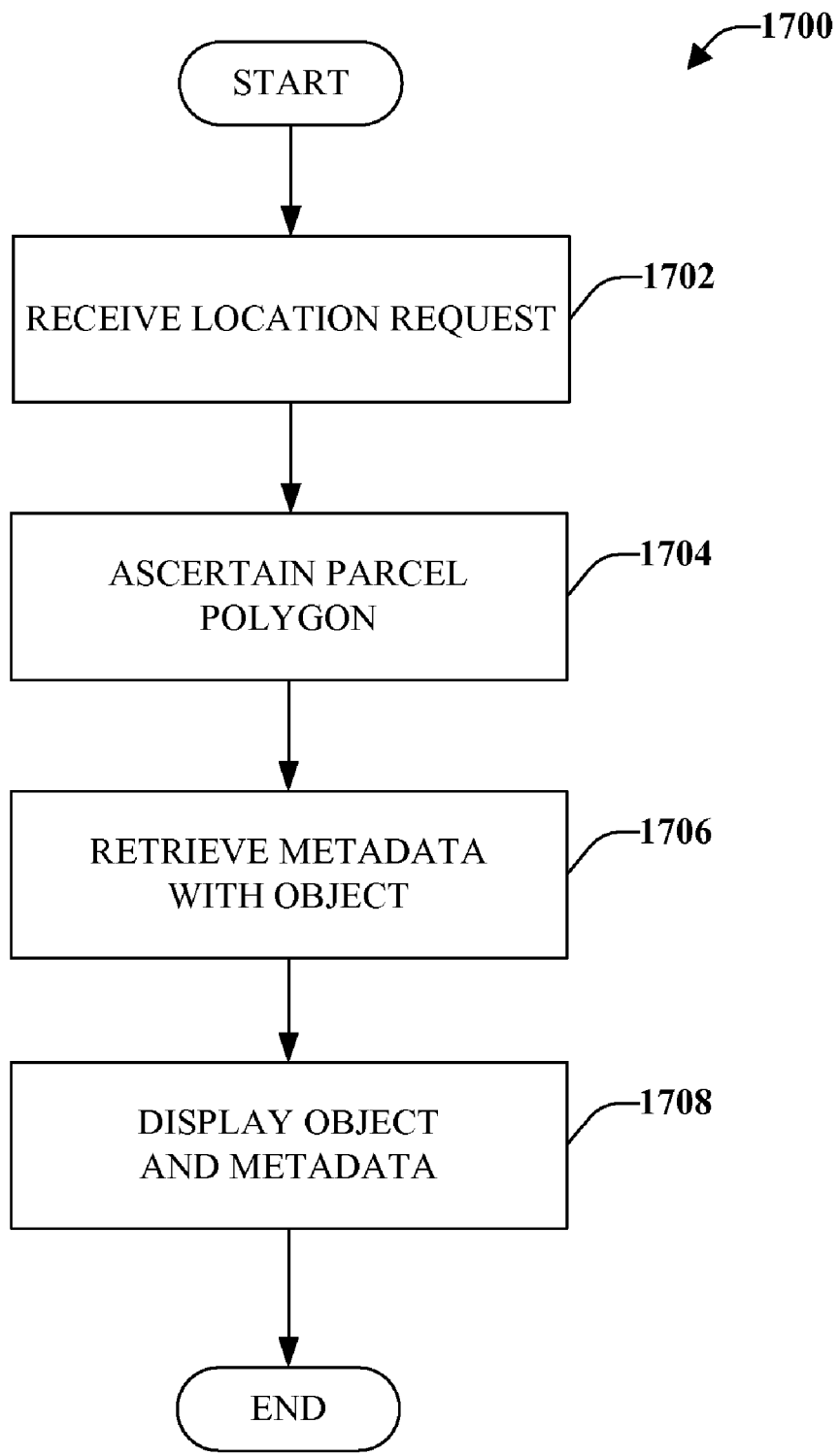
FIG. 17 illustrates a methodology for displaying an object of interest and associated data.

FIG. 17 illustrates a methodology 1700 for displaying an object of interest and associated data. At 1702, a location request is received. The location request can be a physical mailing address for a particular place (e.g., 7389 Crow Avenue), geographic coordinates, or other means of identifying a specific place of interest. Based on the request (e.g., address) the particular object can be resolved to a parcel identification or to one or more discrete locations in the image. At 1704, a parcel polygon for the location request is retrieved. The parcel polygon can define or ascertain the viewing area or a perimeter of the location or object for the metadata or other information relating to the object.

At 1706, the object information and optional data (e.g., metadata) is retrieved from, for example, a storage medium. The object, information, and/or metadata is appended and displayed to the user, at 1708, and can be manipulated to provide more detailed information. The manipulation can include annotating the information according to a user perspective. For example, the information can be displayed on a rooftop if the user perspective is an overhead perspective. If the user perspective is a side view or an angle relative to the object, the information can be displayed, for example, on the side of the object or adjacent to the object, depending on a map location that is most exposed to the user, or based on other criteria, such as the location of other objects on the map. The location of the information can be automatically changed when a user viewing perspective is changed.

According to some embodiments, the other information can include finding the nearest road or route to the area of interest or structure or to display road conditions or problems a user may experience while traveling to the destination. In some embodiments, a particular entity (e.g., store, business, . . . ) associated with the area of interest can be automatically contacted to display information requested by a user (e.g., do you have in stock the book "Abracadabra"?). The store or business can respond to the request, in real-time, with an answer or a request for further information.

Figure 18:
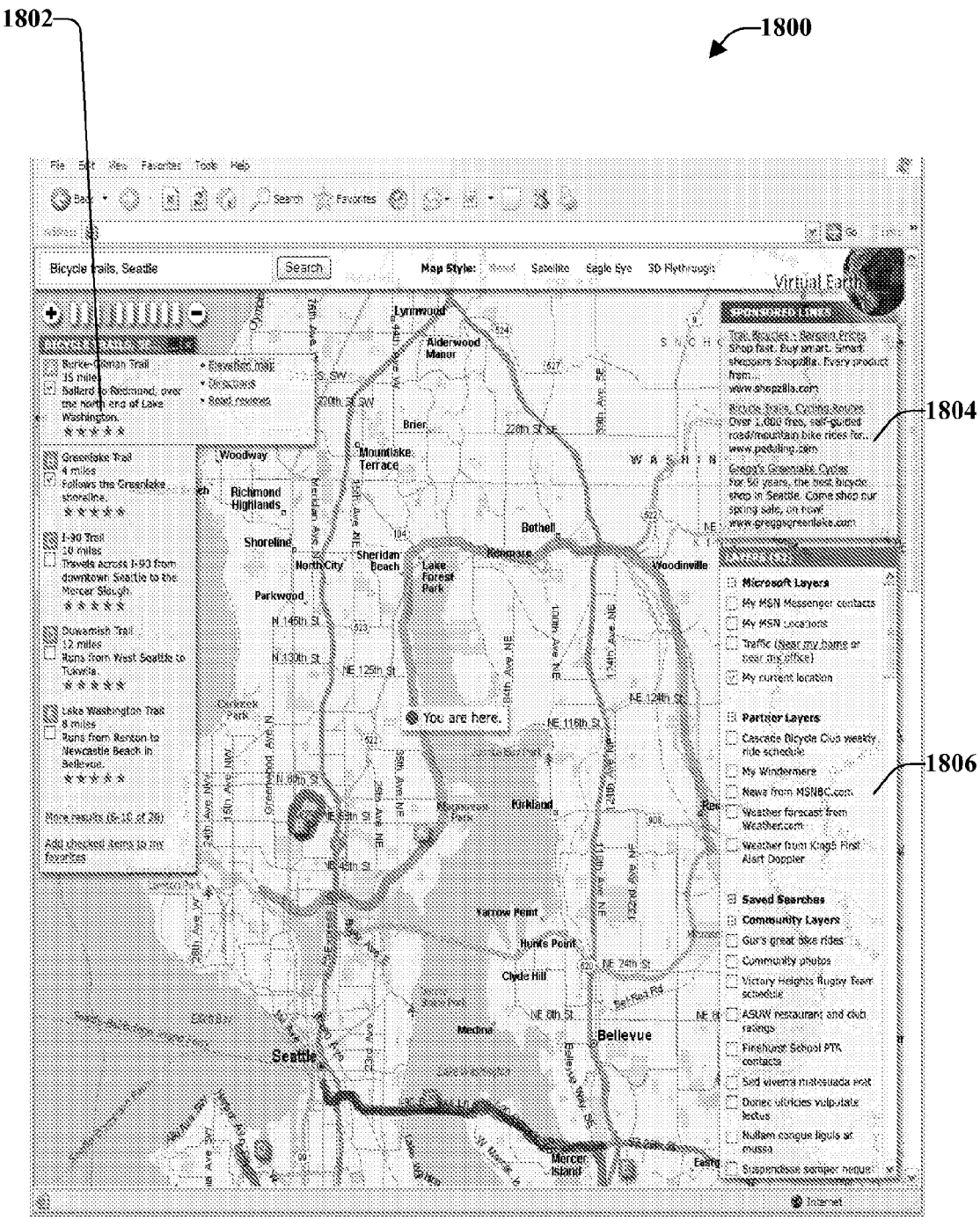
FIG. 18 illustrates an exemplary screen shot of a display that shows mapping information overlaid with user controls.

FIG. 18 illustrates an exemplary screen shot of a display 1800 that shows mapping information overlaid with user controls. The different controls 1802, 1804, and 1806 are placed on different layers and there is an intelligence associated with each control 1802, 1804, and 1806. A layer captures a local augmentation of available information and the display provides a complex, multi-layer world made of raster, vector, cultural objects, moving elements, people, avatars, bots and other elements. Layers are basically a set of geo-coded entities (e.g., points, lines, polygons) and their extent and attributes (e.g., name, photo, URLs, . . . ). Examples of layers include: Bellevue Square Mall, best fishing on Snake River, Windermere published home listings.

Initial layers can be automatically provided to give the user a search that is meaningful in the absence of customized layers. Such initial layers can include Wi-Fi hotspots, movie times, etc. from, for example, users (end user publishers, commercial publishers, . . . ). Individual users can create personal layers (e.g. "my house") or raster upload (e.g., "Woodland Park Zoo"). Text data files can be uploaded for multiple points (e.g., "my fishing holes", "Starbucks® locations"). It should be appreciated that a set of layers, such as top and bottom, might be unavailable for user modification to ensure control of the viewing display.

Selection of layers can be through a palette or a search engine and can be categorized based upon a user-defined category. Alternatively or additionally, layers can be recommended based on a user usage and/or viewing patterns. Users can rate and review layers through an interactive process. The top layer associated with each search can be based upon a layer popularity trend and can be related to user ratings and user reviews. If a particular layer is not relative to the current map displayed, the layer can be hidden. The user interface provides each layer a different rendering mechanism (e.g., raster, URL, through a web service method).

The value of layers is unique for each user. An end user (individual) can utilize layers to find the best local knowledge when needed. An end user publisher can utilize layers and receive compensation for such publisher's knowledge. A commercial content publisher can utilize layers to provide advertising and information to a large number of customers.

Figure 19:
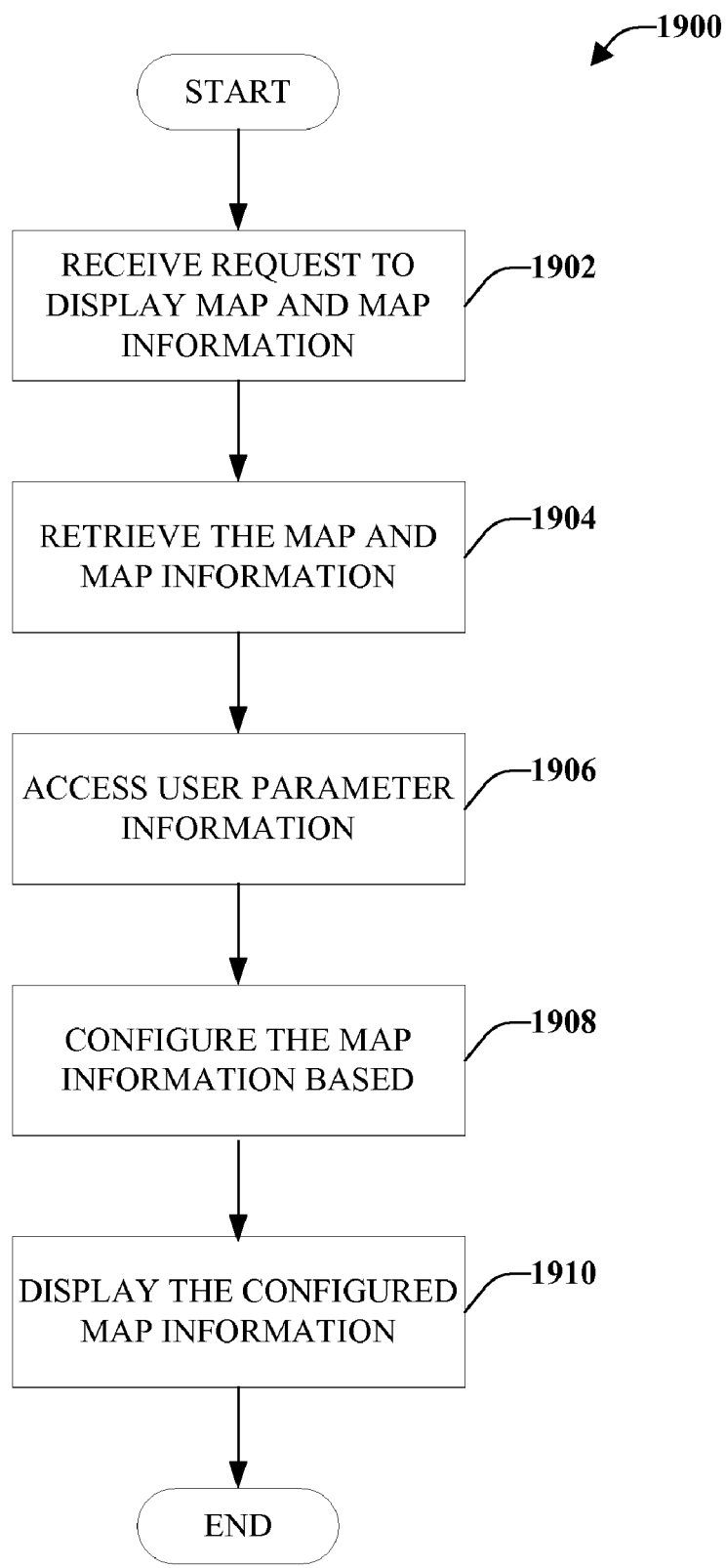
FIG. 19 illustrates a method for displaying map information configured for a particular user.

FIG. 19 illustrates a method 1900 for displaying map information configured for a particular user. Method 1900 starts, at 1902, when a request to display a geographic area (e.g., web-based map) and associated information is received from a user. The request can include a specific geographic coordinate, location, or a general location such as a city or state. At 1904, the geographic area requested and its associated information is retrieved from one or more remote servers. Such servers can maintain map information for a variety of geographic locations that can be displayed to a multitude of users.

At 1906, one or more databases that contain information relating to one or more user parameters are accessed. Such user parameters can include a user demographic, a user profile, and user preference information. The database can receive the user parameters based on previous or historical modification and/or annotations made by the user when a similar geographic area was displayed. At 1908, the geographic area and related information can be dynamically configured or tailored for the user. The configuration can be based partially on information relating to the user preferences. The configuration can further relate to preferences of others that have a similar profile (e.g., similar demographics). At 1910, the configured geographic area and associated information can be presented to the user.

If the user modifies or annotates the presented geographic area (e.g., enters text information marking a place of business), the information can be inferred as a user parameter and can be automatically retained in a database. When a similar geographic area is requested by the user, the newly obtained user parameter can be combined with the historical user parameters and a displayed map can be tailored using such combined information. Thus ongoing monitoring of user actions regarding displayed map information can be utilized to further tailor the information for the user.

Figure 20:
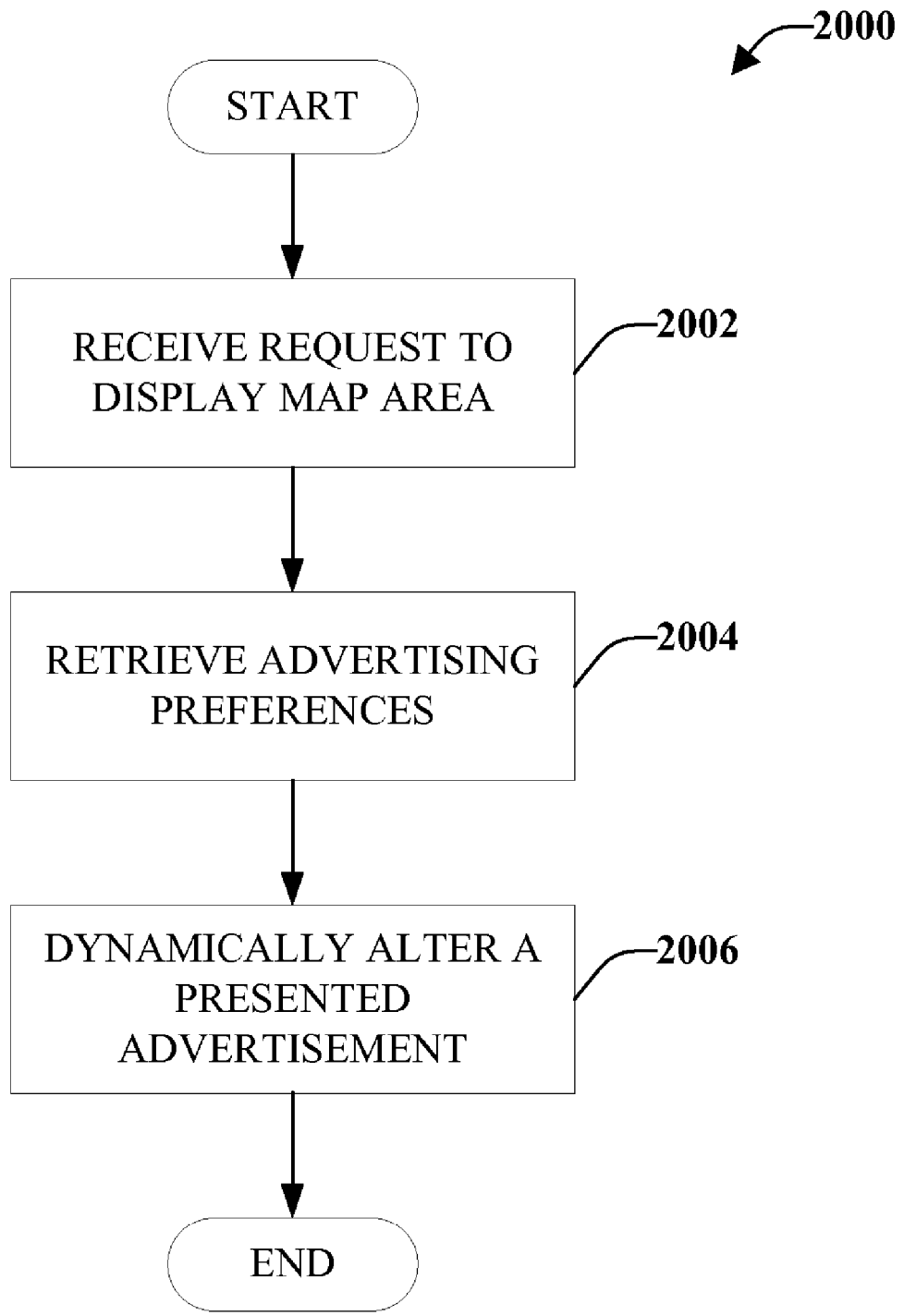
FIG. 20 illustrates a method dynamically altering a displayed map area.

FIG. 20 illustrates a method 2000 for dynamically altering a displayed map area. Method starts, at 2002, when a user request to display a map area is received. One or more user advertising preferences can be retrieved, at 2004. Such user preferences can be retrieved by accessing a user profile information database. In some embodiments, the user preferences can be inferred based in part on historical user input information.

At 2006, an advertisement presented in the requested map area is dynamically altered based in part on the user preferences. Such altering can include deleting a first advertisement that does not conform to the at least one user advertising preference and replacing the deleted first advertisement with a second advertisement (more preferred) that conforms to the at least one user advertising preference. Dynamically altering the advertisement can be further based on an actual geographic location of the user. In some embodiments, the method 2000 includes displaying the altered advertisement in a tool tip that is a function of a pointer hovering on a portion of the display area.

Figure 21:
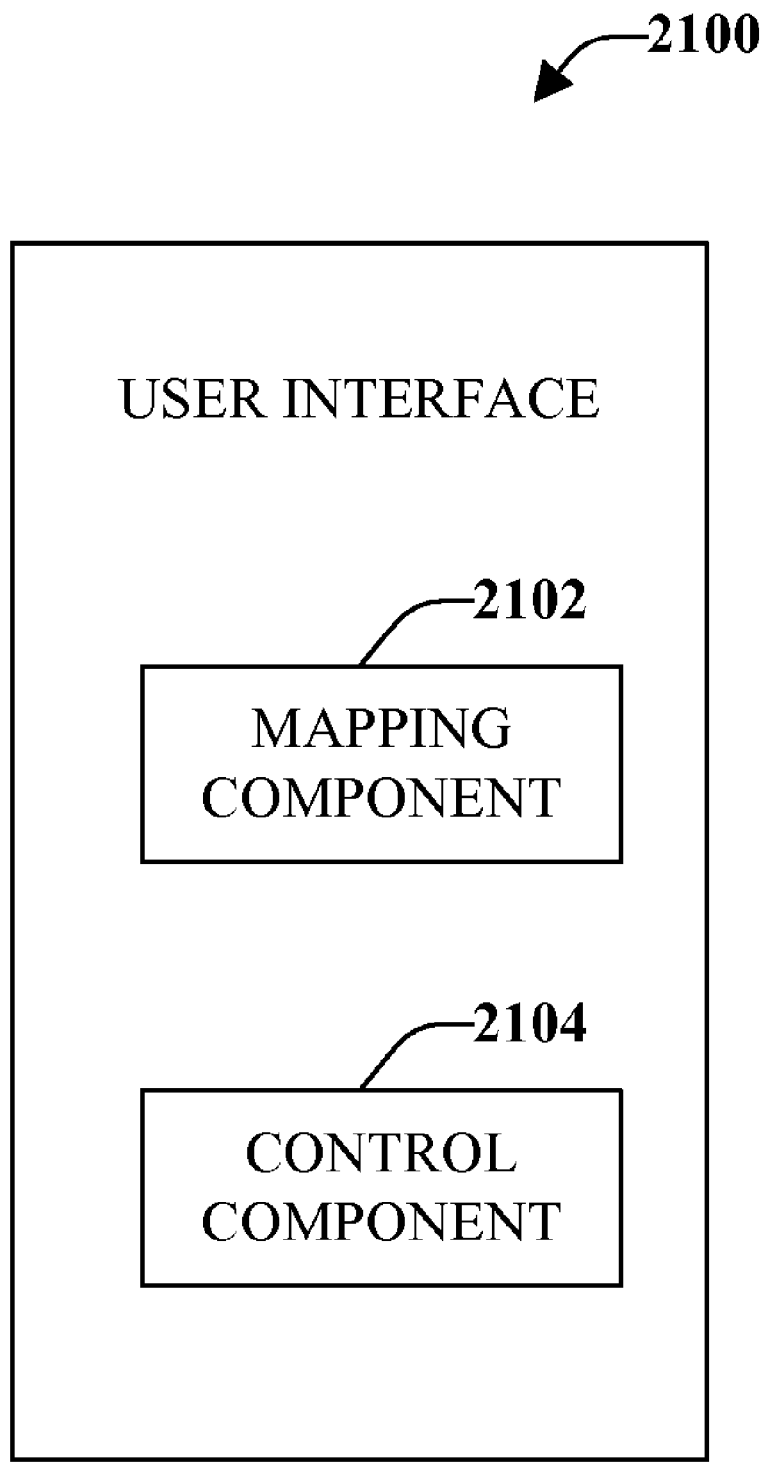
FIG. 21 illustrates an exemplary schematic of user interface components.

FIG. 21 illustrates a schematic representation of an exemplary user interface 2100 utilized with the embodiments disclosed herein. The user interface 2100 can include a mapping component 2102 and a control component 2104. The mapping component 2102 is configured to view or cover a specific geographic area and can alter the viewing angle of the map to provide a user with a unique viewing experience.

A viewing angle of the map can be an oblique view wherein the appearance of the map can be twisted or turned about forty-five degrees allowing the user to view the map from at least four viewpoints (e.g. north, south, east, and west). There are a variety of other viewing angles available including a panoramic view and/or a three-dimension view of the map.

The map can be angled at forty-five degrees allowing viewing of the sides of buildings and the roofs of buildings, if desired. This is referred to as a pictometry image and allows the user to switch from an over-view or top-view to an oblique view, etc. and the user can switch back and forth between the various types of view. The oblique view allows the user to choose a minimum of two rotation angles that can be, for example, based upon the street directions. The user may also import rotations providing maximum flexibility and a unique user experience.

A user can enter a request for a specific geographic area, such as Alexandria, Va. After initiation of the search, the mapping component 2102 retrieves or receives the requested location and displays the particular place (e.g., city, street, address, building, house, . . . ). The user can further define the search, such as to search for U.S. Patent Office in Alexandria, Va. In such a manner, the user can continuously refine the search. Once the desired object to view is displayed, the user can alter the viewing angle to view the object to achieve a different perspective and/or to achieve a perspective of the actual size, shape, construction, etc. of the object. The user can alter the view utilizing controls associated with the control component 2104.

The map can be the background or centerpiece of the viewing area and/or cover the entire page with the things associated with the map located on, or overlaying the map. The controls associated with the map and control component 2104 can be translucent to allow viewing of both the map and the controls concurrently. Thus, the control component 2104 is translucent and overlaid on top of the mapping component 2102 to allow a visual representation of both the mapping component 2102 and the control component 2104 at a substantially similar time.

The control component 2104 can be configured to display only the required or most relevant data. There is a vast amount of data that can be displayed for a small strip mall or high-rise building as dozens of businesses can be listed in the area. In addition, a variety of users may leave Geo-coded notes on hotspots within that area. Some techniques that can be utilized to limit the information include a NearMe button that provides a dropdown menu that is customized for a user that has signed on. The user can choose or pick a saved location from the drop down menu, such as Home, Work, Tony's School, Along My Daily Commute, etc.

Other techniques include providing each list of data with an element of community filtering, e.g., "only show me businesses that are 3-star rated or above." This enables a filtering of results. Another approach can be grouping results based on community ratings. The user can utilize a slider control or bar or other techniques to control how much the community choices affect the displayed result. Another technique can be a "Today's Destinations" tray that allows for adding and removing of listings from the map view.

Profiles can control the filtering of the results lists. For example, profiles could be a "soccer mom", "teenage boy", or "photo enthusiasts". These profiles can initially be chosen by the user but modified over time based on the user's behavior. Users can then publish their profiles for others to view and use. The other user(s) could then pick the "photo enthusiast" profile to perform searches when searching for a good location to take pictures of the Space Needle, for example.

Another technique to limit the information to only relevant or requested data can include displaying relevant data sources on the map view based on the category of the user search. For example, when a user searches for "Football in Seattle", in addition to the Seahawks home page and Seattle PI football newspaper section, the system could also provides local event listings and fields.

The disclosed embodiments are not limited to consumer applications and can encompass business, industry, government, law enforcement, etc. For example, in a law enforcement application a police officer can log in as "user" with an associated user name and possibly even a password. The officer can be presented with a case log listing all the projects (ongoing investigations) with which such officer is currently engaged. It is possible that an expanded listing overlaying the map can show a case log of all activities with which the department, city, county, state, etc. has listed as ongoing or current investigations. The officer can initiate a search for a particular person (suspect) in an investigation and the last known location for such person can be presented to the officer. The last known location can be based on various collected data, such as user input, user statistics, or other collection means. In such a way, law enforcement officers have a better chance of tracking down persons based on dynamic information through autonomous data gathering.

Layering aspects of the disclosed embodiments are included wherein the controls are overlaid and placed on top of or in front of the map allowing the user to perceive the controls and other information in combination with the map. The controls and other information are translucent thereby allowing viewing of the detail underneath the controls/information and viewing of both the map and controls/information concurrently. In a layering application based on the above example, a police dispatcher may have a map of the police district showing the location of all officers, cars, etc. The police dispatcher would have the ability to track each officer as well as the ability to individually turn on/off the controls that allow viewing/tracking of each police car.

Figure 22:
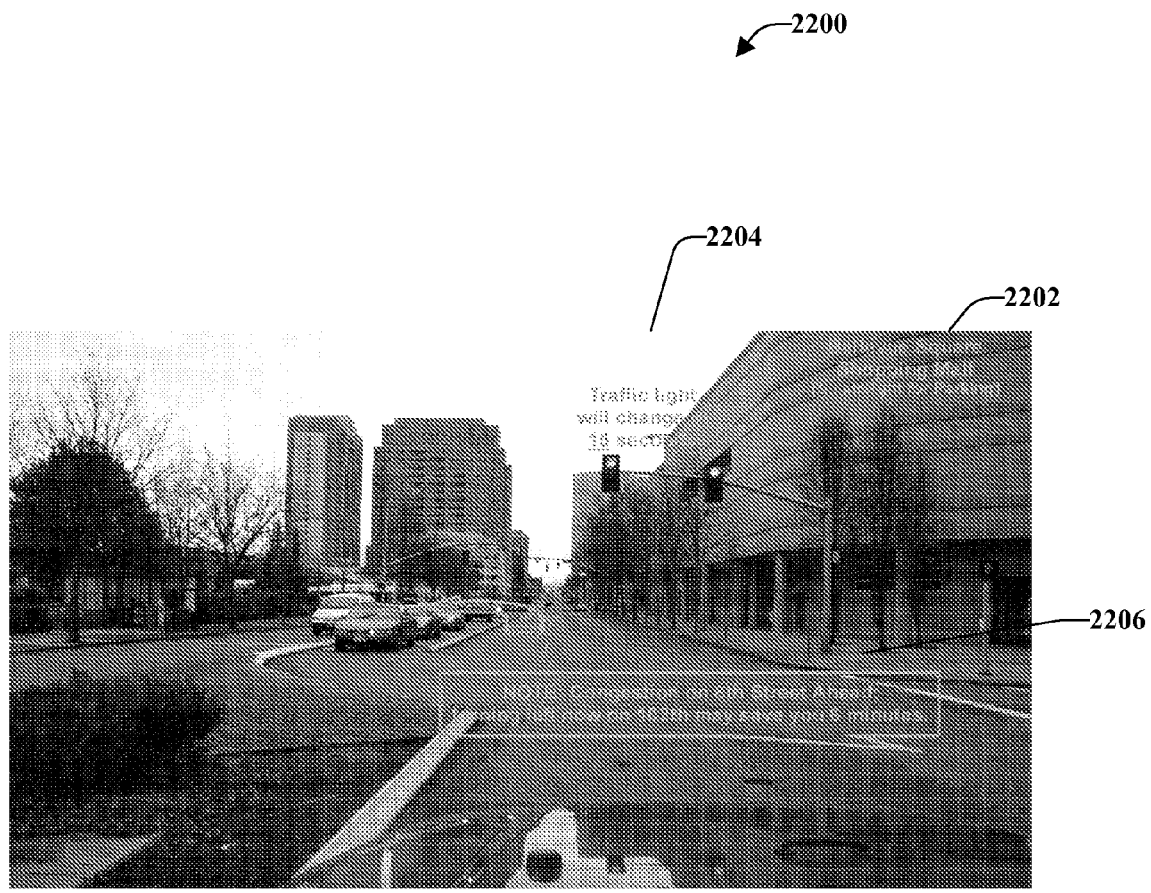
FIG. 22 illustrates an exemplary screen shot of the disclosed embodiments utilized in an automotive application.

FIG. 22 illustrates an exemplary screen shot 2200 of the disclosed embodiments utilized in an automotive application. Laser projection displays and head-tracking equipment (to determine what the driver is looking at) can be "drawn" literally on top of the real world (e.g., windshield). For example, instead of hunting for the driving destination, when the navigation system claims "you have reached . . . " an illustration can be drawn (on the windshield) with an indicator 2202 marking the spot, on the actual location as perceived through the windshield. Thus providing a better visualization system than other navigation solutions (e.g., voice prompting, removing eyes from road to view a screen inside the car).

The display on the windshield should not cover the entire windshield for safety, thus the laser projector can mechanically lack this capacity. Non-traffic-related information above a predetermined speed threshold (e.g., 35 mph, 55 mph) can be disabled. This non-traffic related information can include information such as remaining fuel in car and projected remaining driving distance, the name of the building the car is near, etc. In addition, the system, upon noting a low-fuel indicator, can automatically search for the area's best prices for gasoline and minimize re-route time. The price information can be supplied by the local gas stations (and other retail establishments can supply information regarding their particular goods, services, etc.).

Car-to-car communications (e.g., ad-hoc networking with Wi-Fi's range of around 150 feet and a GPS) can be utilized for active safety support. These communications can include information such as "slow down now, car in front turning."

Other data can be obtained by discovering that near-by entities have APIs that can be queried dynamically. For example, a municipal traffic center might be computerized and the current wait time for a traffic signal can be computed, shown at 2204. In another situation, the system can analyze the current route for traffic and notify the user that the system determined that an alternate route might be quicker.

To support the traffic service and information, a community traffic service can be utilized where people who subscribe to traffic information also share their traffic. For example, a driver can have a SmartPhone device with a GPS and some WAN connectivity (e.g., GPRS or Generation WAN technologies). As the driver drives, the driver's speed is compared to the speed attribute of the road-segment being driven on. If the speed is slower (e.g. by 25%) the device can report the road-segment identifier and the actual speed to a traffic service (using appropriate privacy considerations).

Other devices subscribed to the service and in the same general area subscribe to their route segments. This can relate to a particular time and known route that the user will be taking. A filter can be utilized so that the user receives data about only those road segments where the other device's attributed speed and reported speed is different (e.g., 25%). The system, utilizing mapping information can guide the user around the slow spots, saving time and gasoline. An example of such a display is shown at 2206.

In alternate embodiments, information about a driver's driving habits can be collected and the driver provided a virtual score. This score can take into various considerations (e.g., driving speeds, traffic light habits, . . . ). The score can be utilized to provide the driver with better car insurance rates, through a participating insurer. In another embodiment, urban planners can receive anonymous patterns to better plan road repair and build-up. Archived traffic data can be analyzed to understand trends and provide valuable information to local municipalities and planning agencies.

Figure 23:
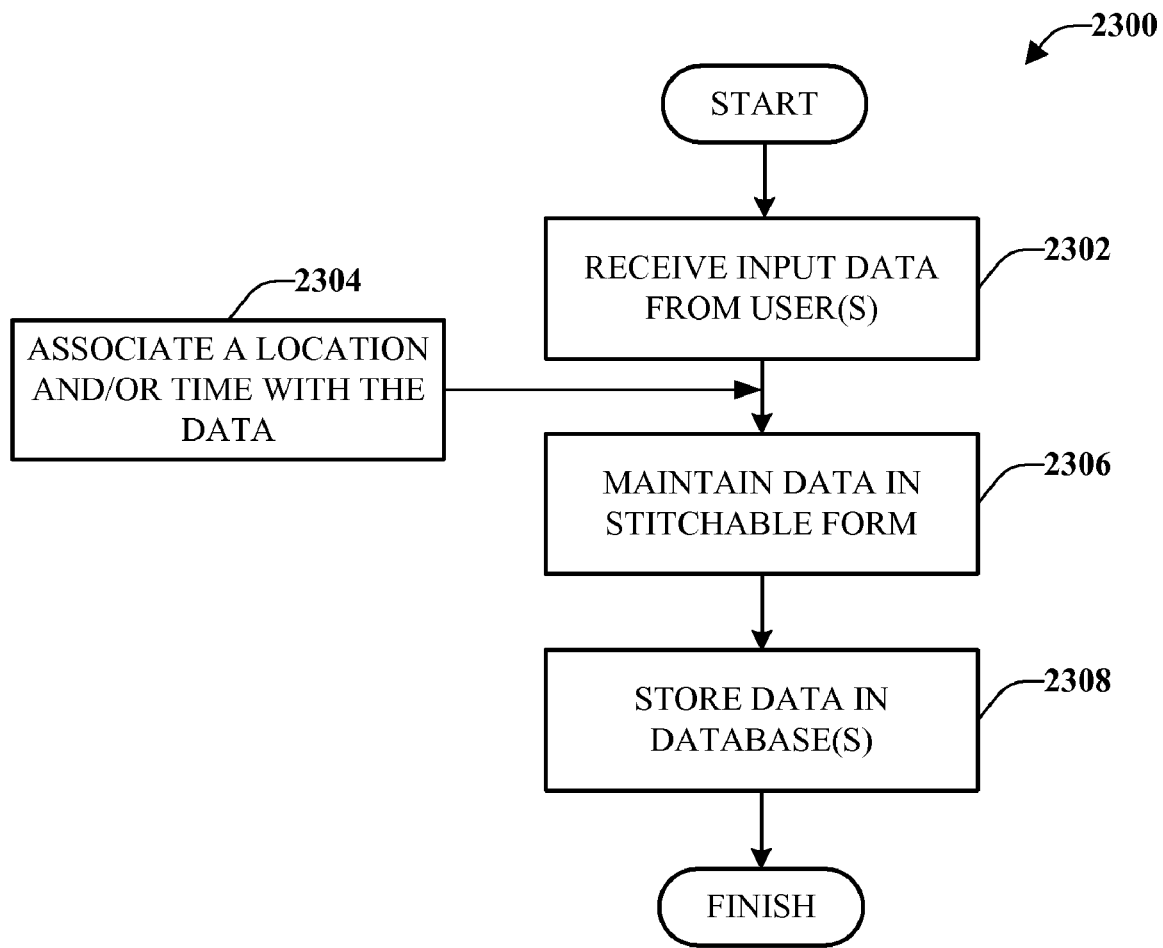
FIG. 23 illustrates a methodology for receiving input data from one or more users.

With reference now to FIG. 23, illustrated is a methodology 2300 for receiving input data from one or more users. The method 2300 begins, at 2302, where input data is received from a large number of users and/or entities. The data can be pictures, text, sound or other data associated with an object, place, person, etc. At 2304, a location and/or time can be associated with the input data. This information can be provided by, for example, the user device. The location and/or time can provide context to the images, data, or information. Much of the data received will be isolated and not in context with other data received. Thus, at 2306, the data is placed in stitchable form. The data in stitchable form is then maintained or stored in one or more databases, at 2308, wherein the data will be provided to one or more users upon request.

Many applications can be location-enabled by the disclosed embodiment(s) including news events, office related information, shopping, city guides, vacations. Examples of each type of application and available data are detailed below and the disclosed embodiment(s) are not meant to be limited to the following examples.

News events can be clustered by location on a globe. As a user reads about a tsunami in Asia, the user can see on a map the other locations that the tsunami hit and/or read news articles about those locations. The user can view before and after aerial imagery of the affected locations. For sporting events a user can see that a cluster of Super Bowl articles appearing in Philadelphia (Eagles), Boston (New England Patriots), and Jacksonville (location of the Super Bowl). The user can easily find and read what local newspapers and national newspapers are reporting about the match-up or other related stories.

Office events allow a mobile worker to edit documents on a business trip. The disclosed embodiments allow the worker to geocode (e.g. latitude, longitude, altitude, heading, speed, acceleration) the worker's documents, e-mail, meetings, etc. The user can then view the work performed while on the business trip. This can range from meetings attended, documents and e-mails written, reviewed, edited, presentations given, notes taken during the trip, etc. Smart Tags can also be supported in an office event situation, for example. This allows the location(s) of an email or document to automatically be recognized with smart tags to get other content the user created around that location (e.g., directions to and from it, . . . ).

The disclosed embodiments allow a user to not only shop on-line but also to view the object and see how it really looks, etc. By knowing the user's location, the user can be provided with the names and locations of the nearest stores that have the item(s) in stock. If the user is shopping for a cell phone, for example, a suggestion can be provided indicating the best cell phone service provider based on carrier coverage maps that take into consideration historical information regarding the locations the user has visited in the past. A request for a product can be location-enabled to show a user the product results sorted by distance from the user (e.g., nearby search).

City guides can be customized for a user's interests. If a user has repeatedly visited a restaurant, pub, store, etc. the user's affinity for that location is remembered. This information, combined with collaborative filtering techniques can be utilized to suggest other places the user may wish to visit. The user is able to layer this information with editorial comments onto a personal version of the disclosed embodiments.

In a vacation scenario, a user may wish to view the destination before deciding on the destination or before actually traveling there. The disclosed embodiments enable a 3D (or other dimensional) street level immersive walk-through. This allows the user to virtually walk up to every hotel (or other place) located in the destination and experience what it would be like there. Thus, a Space-to-Street-to-Interior-Spaces concept is achieved.

In another embodiment, the request for information can be based on viewing contacts by their logical distance. Different pivots on location-context can be utilized, viewing each contact by city, state, or county. When the location of a contact changes, the user can be notified by various means including a pop-up text message.

Figure 24:
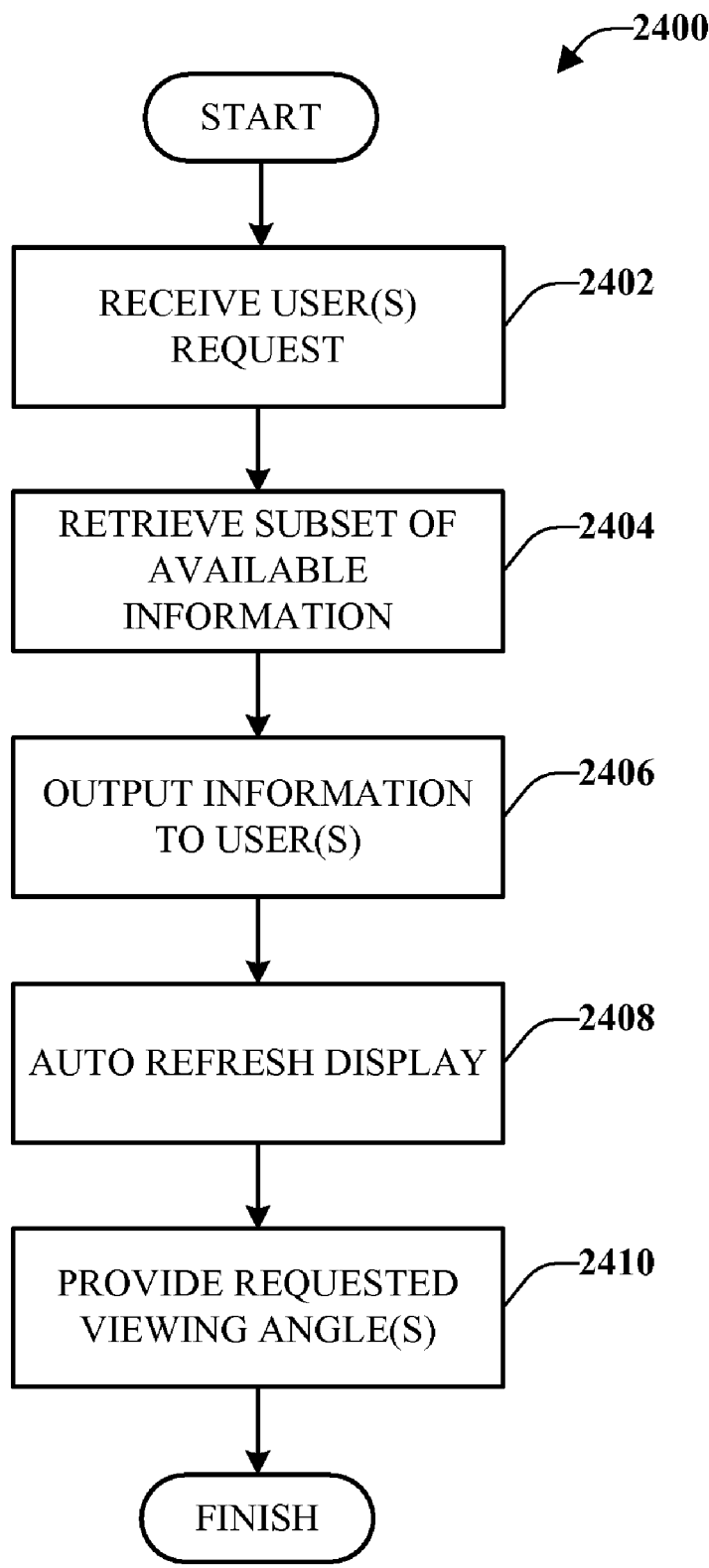
FIG. 24 illustrates a methodology for providing a user with requested mapping data.

With reference now to FIG. 24, illustrated is a methodology 2400 for providing a user with requested mapping data. The method 2400 begins at 2402, where one or more user(s) requests map information. The request can be received from a multitude of users at substantially the same time. The request can also be for a multitude of mapping locations. When this request is received, a subset of available information is retrieved, at 2404. The subset of available information can be maintained on one or more databases or servers. The information is output to the user(s), at 2406, on a display. The display can be a map showing the location and can show additional information, including names of streets, landmarks, requested locations, etc. As the user views the information on the screen, the user can move around on the display surface, using the cursor, to manipulate the map by altering its direction or the zooming level. As the user manipulates the display, the display is automatically refreshed to continuously provide the user with the requested data, mitigating the need for the user having to reenter the search criteria and/or reinitiate the search. A different viewing angle is provided based upon a user request. For example, the user can request a bird's eye view, a front-view, a trajectory view, etc. Thus, the user can virtually walk or experience the location viewed on the display area.

Alternatively or additionally, instead of listing contacts by their presence state or location, they can be shown on a map

Figure 25:
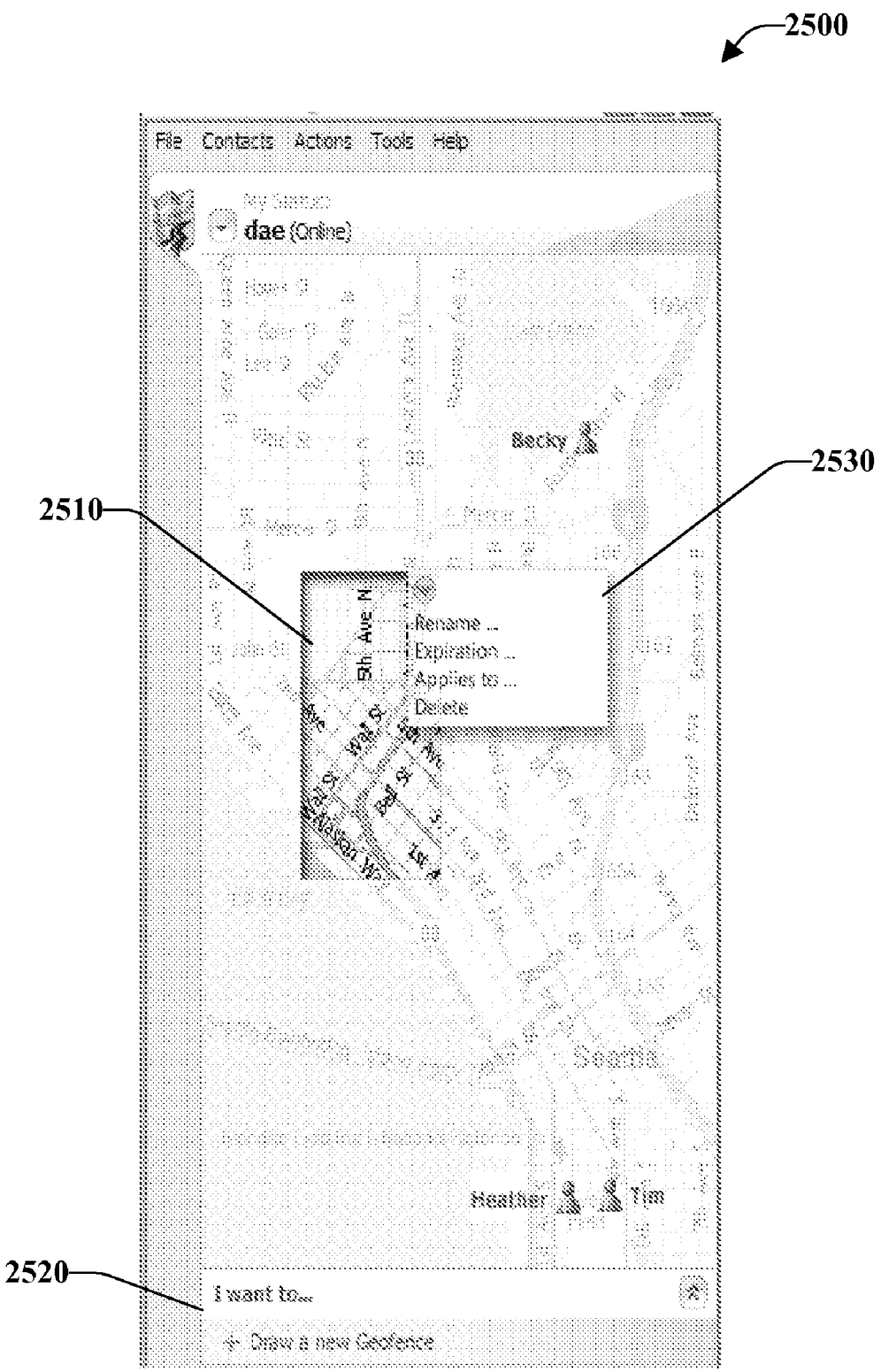
FIG. 25 illustrates a screen shot of a map with overlay controls and a Geo-fence according to the disclosed embodiments.

2500 as illustrated in FIG. 25. The user can create a Geo-fence 2510 or section utilizing a control 2520 (associated with a control component) on the display space. The Geo-fence 2510 enables the system to notify the user when a contact enters the specific area within the Geo-fence 2510. The Geo-fence 2510 can be customized 2530 to expire after a set time or set to look for specific contacts. For example, the user may create a Geo-fence to find someone to go to lunch with but does not care if contacts come nearby after 2 p.m. It should be understood that while a rectangular Geo-fence 2510 is illustrated, non-rectangular and logical (e.g., College Campus) Geo-fences can be utilized and supported with the disclosed embodiments.

In another embodiment, the Geo-fence 2510 can be automatically created by the system. For example, if there is a meeting scheduled with people coming from other locations, the system can Geo-fence the area around the meeting and intelligently notify the user when it is time to go to the meeting area. Geo-fences can support a multitude of types of objects, including dynamic and transient objects (e.g., notify me when <x> is nearby" is a Geo-fence around <me>).

In another embodiment, location-based services can be added in-session. For example, if a group of users wants to meet for lunch and there is a time/distance constraint, the system can determine and create a drive-time zone based on the location of the contacts. This zone can be displayed to the users showing only the targeted search results within that zone. The system can create the zone by monitoring messages between the contacts and certain trigger words or phrase (e.g. "Lunch", "Chinese", "cannot leave before 11:45", "be back by 1", "within a 15 minutes drive") can be utilized to auto-create the search query and results while the users are conversing.

In the above embodiments, the viewers can move around, drill in, rate objects, add/remove data views, time-shift, etc. the displayed information. Once the destination is chosen, each user can be presented with unique driving instructions. Additionally, each user can be presented with a personal "latest time to leave" estimation.

Figure 26:
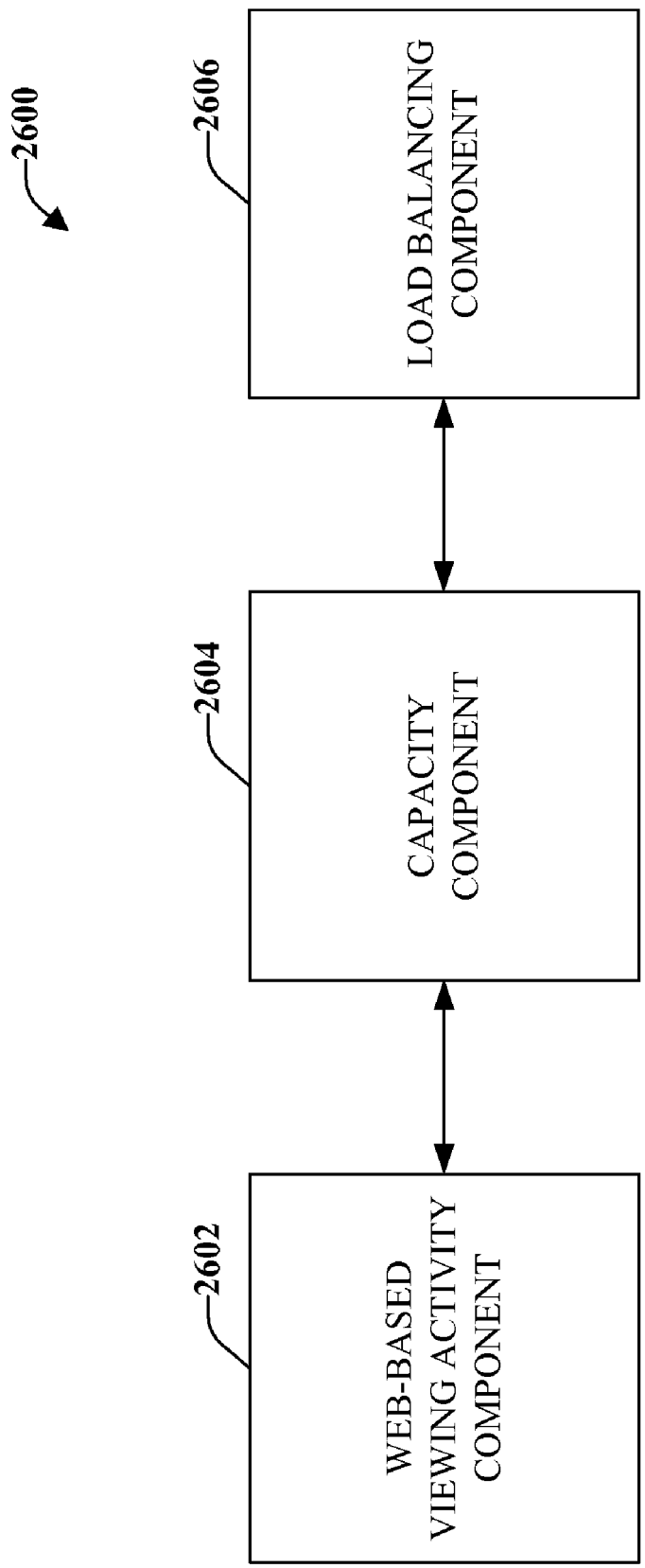
FIG. 26 illustrates a system for serving up large images quickly.

FIG. 26 illustrates a system 2600 for serving up (obtaining and displaying) large images quickly. Due to the vast amount of data available, a means to provide a user information on demand should be employed. System 2600 includes a web-based viewing activity component 2602 that interfaces with a capacity component 2604 and a load-balancing component 2606. The web-based viewing component 2602 is configured to determine a level of web-based viewing activity associated with a particular geographic location. The capacity component 2604 is configured to determine an available capacity to render images associated with the particular geographic location. The load-balancing component 2606 dynamically redistributes data associated with the images to be rendered as a function of image size and the viewing activity.

At times there are unpredictable events that occur and many people quickly become interested in viewing a particular event/place/location at a substantially similar time, referred to as "HOTNESS." The number of people attempting to view a particular area determines how many servers and how much capacity will be consumed by this interest. In order to ensure that all interested people can view a similar event at substantially the same time, a quick forecast of what should be available is determined as well as the means to acquire the requirements. Thus, the HOTNESS requirements are determined by a factor of the population plus tourism multiplied by an unforeseen event (or foreseen event) and can be expressed as:

HOTNESS=[(population+tourism)*unknown event]

Population is predictable and remains fairly constant over time, although the dynamics of that population are consistently changing. Tourism shifts over time but can be approximated, such as for known events (e.g. Olympics, sporting-events, . . . ). When the unknown event occurs (e.g., 9/11, tsunami, hurricane . . . ) that particular area may get "hot" because many people are trying to view that event (and associated location) at a substantially similar time. For example, there might be a thousand servers serving up images, the system 2600 can move or redistribute the data images to ensure that when an unknown event occurs the areas that are "hot" are on the largest amount of these servers that can be cached. There are two aspects associated with providing resources for hot zones; a naming scheme based on a quadrant and a technical architecture that can serve these images very quickly.

Figure 27:
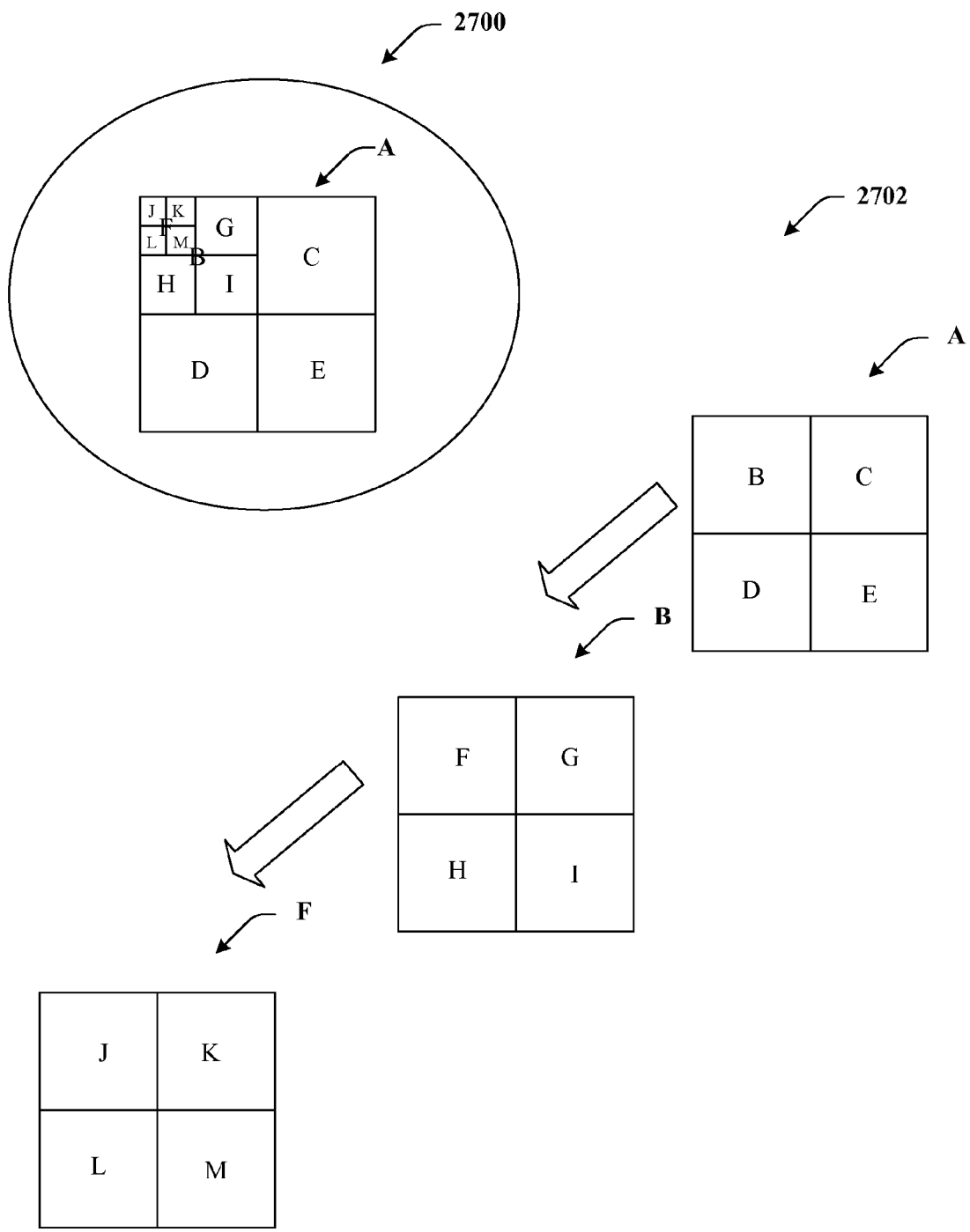
FIG. 27 illustrates a system for serving up large images utilizing a naming convention.

In a naming convention, the world is split into quadrants that are broken down into smaller and smaller quadrants or levels and can go from level 1 (or A) to about level 14 (or N) and beyond. FIG. 27 illustrates such a naming convention. At 2700 quadrant A is broken in quadrants B through M. An enlarged view of each quadrant is shown at 2702, where quadrant A is broken down into quadrants B, C, D, and E. Quadrant B is shown in enlarged view and broken into quadrants F, G, H, and I. Quadrant F is shown enlarged and broken out into quadrants J, K, L, and M. This process can continue in a similar manner providing greater and greater detail as desired.

The system can take for granted that at any given time the client or user asking for a particular set of tiles or quadrants knows how to ask the system for that quadrant in language that the system can understand. For example, if a user desires to view quadrant M, the user provides a request similar to the following:

TILE ID M.F.B.A.IMAGE.VE.COM

The user asks for four elements associated with the four quadrants in ascending order (which are M, F, B, and A in this example). At around the N and 0 level (not shown) there are billions of grades, so the Domain Name Server (DNS) name space can become large, however, the "hot" spot is actually small and segmented. There is usually no more than one hot spot in the same town or city and the entire world will not usually become hot at substantially the same time, so the lens of what people are trying to view is focused. Even in New York, hot spots occur only in selective areas. Additionally, hot spots remain hot only from a limited amount of time and thereafter they stop being "hot" and fall back to a normal and/or cold range.

Although the user is making the full request, as illustrated above, the DNS naming scheme is only concerned with about two of the entries. For the above entry what the system is acknowledging is:

*.B.A where * is a DNS wildcard and "B" and "A" are quadrants. The DNS wildcard indicates that the system is not concerned with the level of detail the user is requesting and the system generally looks for the two larger quadrants, provides an image for that particular area, and is resolved into a set of IP addresses.

In further detail, based upon the above request, there can be two IP addresses, indicating that the quadrant is spread across two machines or servers. When disaster happens (unforeseen event) and sector or quadrant K, for example, becomes extremely hot and a multitude of people want to view that quadrant at a similar time, the system looks at the graphic and determines that the hot area is:

TILE [K.F.B.A] IMAGE

The system can identify this as the hot area by counting the number of requests over a given time and making a determination that the number of requests has risen exponentially or based on other criteria. The system can copy the information for quadrant K, independent of the information of the other quadrants. The data/images for quadrant K is "slid across" other machines to expand the number of machines that have the data. This means that now there are more than two IP addresses and the new DNS entry (K.F.B.A) can resolve into a larger number of addresses, such as sixteen, for example. This allows sixteen machines or servers to service the "hot" spot requests. The system will be able to respond to the increase and dynamically shift the traffic around. Within minutes of detecting the "hot" spot, the data begins moving in a dynamic load balancing (which server to go to) fashion and re-slides the data depending on the amount of requests, or required granularity or depth of viewing.

Figure 28:
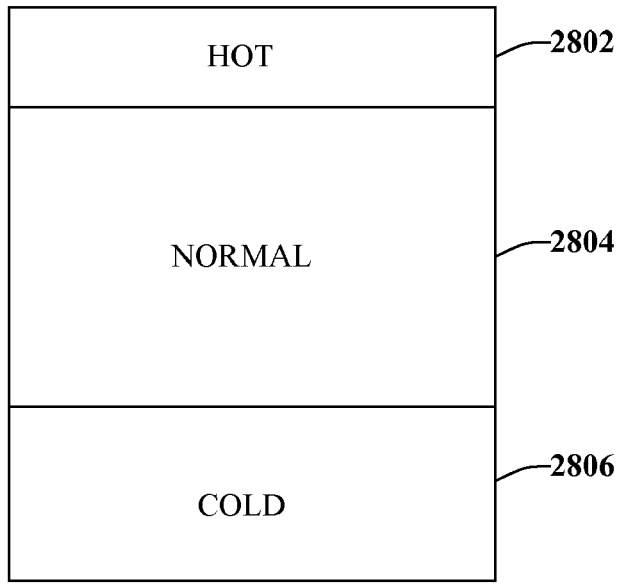
FIG. 28 illustrates a depiction of zones in which images, data, etc. can be associated.

Referring to FIG. 28, illustrated is a depiction of zones in which images, data, etc. can be associated. The system can take a sample of the number of incoming requests from users to determine the level of action for each quadrant. Based on the action level, each quadrant is associated with one of three segments: hot 2802, normal 2804, and cold 2806. Hot 2802 occurs when a large number of viewers request a data image of a particular quadrant. Cold 2806 is a quadrant that has few or no viewing requests. The range between hot 2802 and cold 2806 is the normal range 2804 and is the zone that contains the largest amount of data. Periodically the system removes the cold segments from the cluster to maintain memory capacity for the hot and normal segments. By way of example, the segments representing the United States can consumer over half a gigabyte of memory, thus, the system should intelligently decide what segments to dump to serve up images quickly.

Each entry in a quadrant has a counter that determines the level of normal 2804 or cold 2806. When the above algorithm decides an event has occurred (hotness) a determination of which quadrant to remove is made and also a determination as to which data needs to be sent or slid to a multitude of other machines. The best choices are machines, which are storing data from cold segments 2806 because these are the machines that generally have the least amount of activity and thus, surplus memory capacity. The cold imagery can be dumped off these machines, provided the scaling does not drop below two machines. At any time, there should be two machines that have the information, for redundancy purposes, and the data should not be deleted. If needed in the future, this data can be rescaled to more than two machines. Since copying data takes time, the system will not necessarily actively copy the data but will use a volume shuttle service (VSS) that will only copy data when they are actually touched, the first hot tile can be saved locally and local images extracted from that copy.

Figure 29:
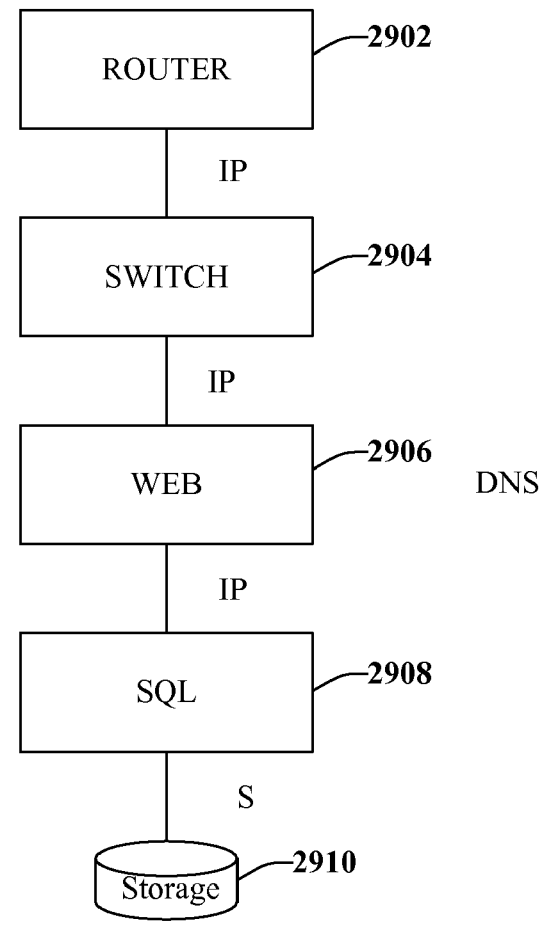
FIG. 29 illustrates an architecture for a conventional system that can be utilized to serve up large images quickly.

Conventional systems can be utilized with the disclosed embodiments and exemplary architecture of such conventional systems is shown in FIG. 29. The data in this architecture should take a full route through a router 2902, switch 2904, web server 2906, SQL 2908, and storage 2910 associated with IP, DNZ and storage dump. Every piece of data required to populate the network should go through each step in the route. It should be understood that other systems can be employed with the disclosed embodiments.

Figure 30:
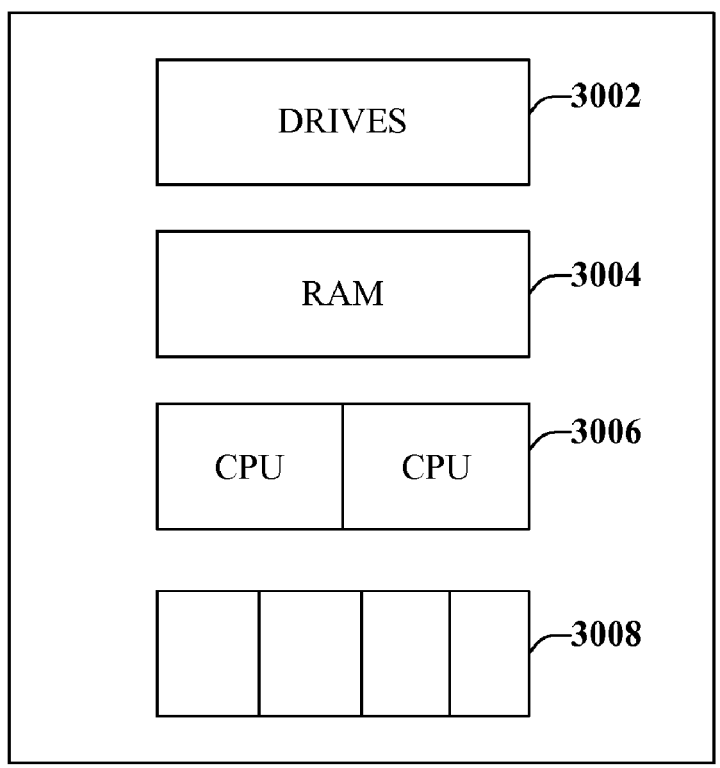
FIG. 30 is an exemplary architecture for a machine that employs the disclosed embodiments.

The subject embodiments can treat each image server as functional elements that hold the right data at the right time. The minimum number of machines that hold the same data should be two machines with each machine having the architecture that can be similar to (or different from) that shown in FIG. 30. Each machine can include a set of drives 3002 (e.g., RAD-1 Drives) and there can be anywhere from one to twenty-four or more drives. The minimum random-access memory (RAM) 3004 should be about 16 GB, although it is possible for the architecture to have less or more memory available than 16 GB. The system also has CPUs, 3006 etc. as illustrated. This is the simplest architecture that a given tile can be dumped into and each tile can be represented as a single file with all associated images (image file).

As discussed previously the tiles associated with a quadrant entry can go with any size resolution. The largest resolution is a 1 (A) and becomes progressing smaller in size, where 7 (G) is much smaller than 2 (B) and much larger than 11 (K). The image files are independent files and can move around independently. The starting level for viewing data might be about a 3 (C) or 4 (D) as a 1 (A) or 2 (B) might be too large.

Figure 31:
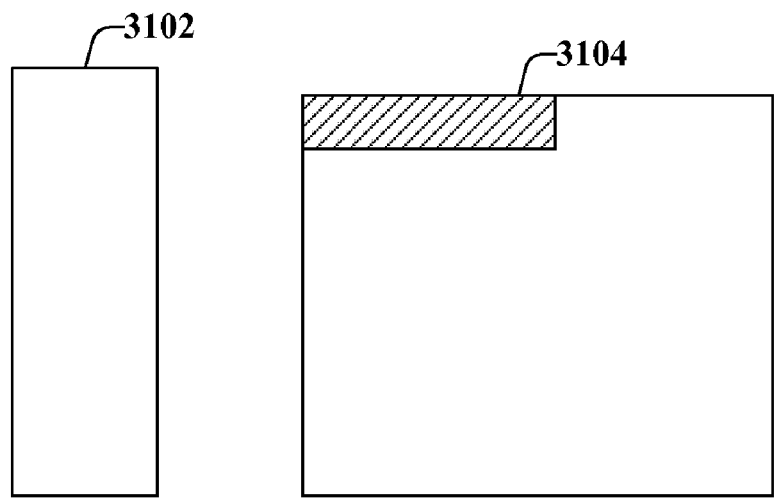
FIG. 31 illustrates an exemplary index file for a data image.

Each data image has an index file, as shown in FIG. 31 that stores the index entry 3102 for a tile 3104, which is just an offset in size. For example, if a user wants to view tile 6 (F), the index file would provide the entry for tile 6 (F). The index files are arranged in one or more logical volumes or logical files and the index is loaded into a module. In this way, the entire drive is memory mapped allowing the system to etch the pieces of the model and when a user requests a tile, the index (memory) id that gives an offset points to the drive, providing as many pages of data as needed to provide the image. The memory that provides the data can also dump the data when it is overlaid with new data. Therefore, from drive to network the data might only be copied once because the system took the data and performed a dump of the data, rather than copying or deleting the data.

Each memory works around the cold, normal, and hot segments or factors as discussed with reference to FIG. 28. If a particular segment gets cold, it is dumped to make room for the hot segments. If a segment is part hot, part normal, or part cold, only the really hot portion (which can be up to about 16 gigabytes or more) remains in memory. If this segment is touched, it will remain there and will not page forward. Thus, as fast as possible memory is moved around and data can be served up very quickly.

There can be a large amount of preprocessing done in preparation for the data to be in the above-described form. The tiles are placed in this format to efficiently serve the data to a multitude of users. The data is not stored as one file because it will be too large, but can be stored at levels 4 (D) and/or 5 (E), for example. Each file has an index version that can actually be generated repeatedly. It should be noted that the index is the metadata of the file. There are copies of the data in many places that can be moved because the file for each tile has its own index and "hotness" is localized on a quadrant boundary. If hot, it will move to as many IP addresses as needed so that the server can serve it up quickly with the index providing pointers and VSS to provide optimized copying.

Figure 32:
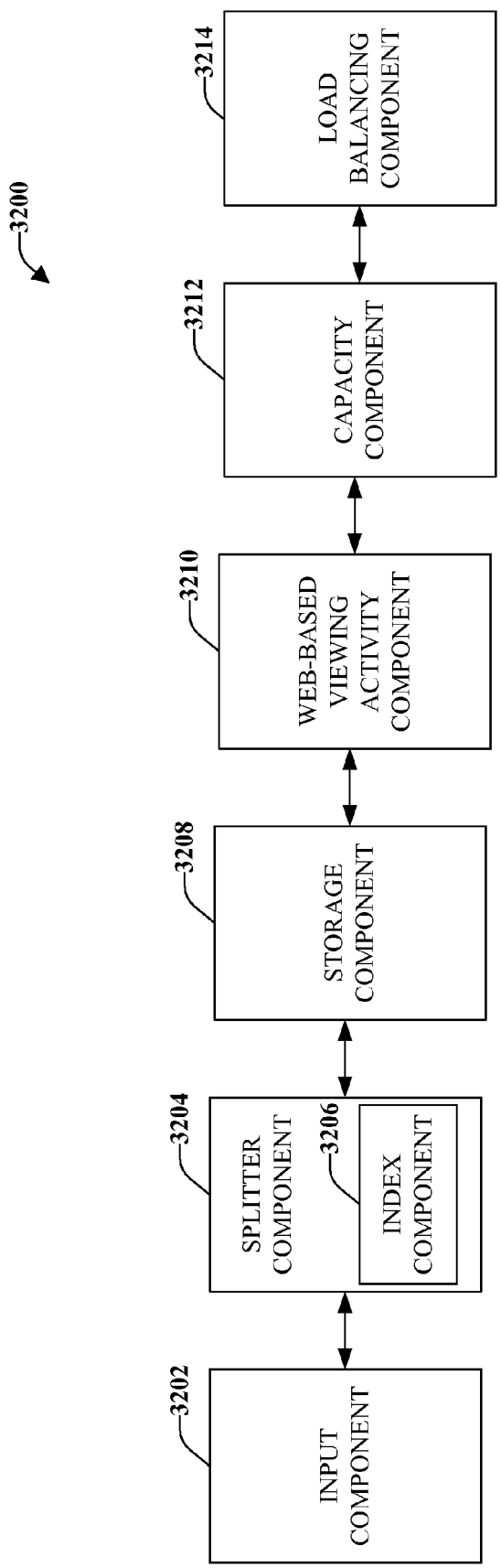
FIG. 32 illustrates a system for receiving, maintaining, and serving up large images expeditiously.

With reference now to FIG. 32, illustrated is a system 3200 for receiving, maintaining, and serving up large images expeditiously. System 3200 includes an input component 3202 that receives image data associated with a specific geographic area. The image data can be input by a multitude of users and/or entities. For example, the image data can be received from a multitude of devices including mobile or wireless devices.

The image data is communicated from the input component 3202 to a splitter component 3204, through, for example, an Internet connection. The splitter component 3204 splits the image data into at least two quadrants. An index component 3206 can be associated with the splitter component 3204 and is configured to provide location identification for each of the at least two quadrants. The quadrants can be stored in a storage component 3208. It should be understood that the quadrants can be distributed among a multitude of storage components 3208.

A web-based viewing activity component 3210 is configured to make a determination as to the level of web-based viewing activity that is associated with a particular geographic location. The web-based viewing activity component 3210 can make a determination based on information retained in the storage component 3208 and based on information received from a capacity component 3212. The capacity component 3212 can be configured to determine an available capacity to render images associated with a particular geographic location or region. The load-balancing component 3214 dynamically redistributes data associated with the one or more images to be rendered as a function of image size and the viewing activity. The viewing activity can be based on the number of requests to view a geographic area or location.

Figure 33:
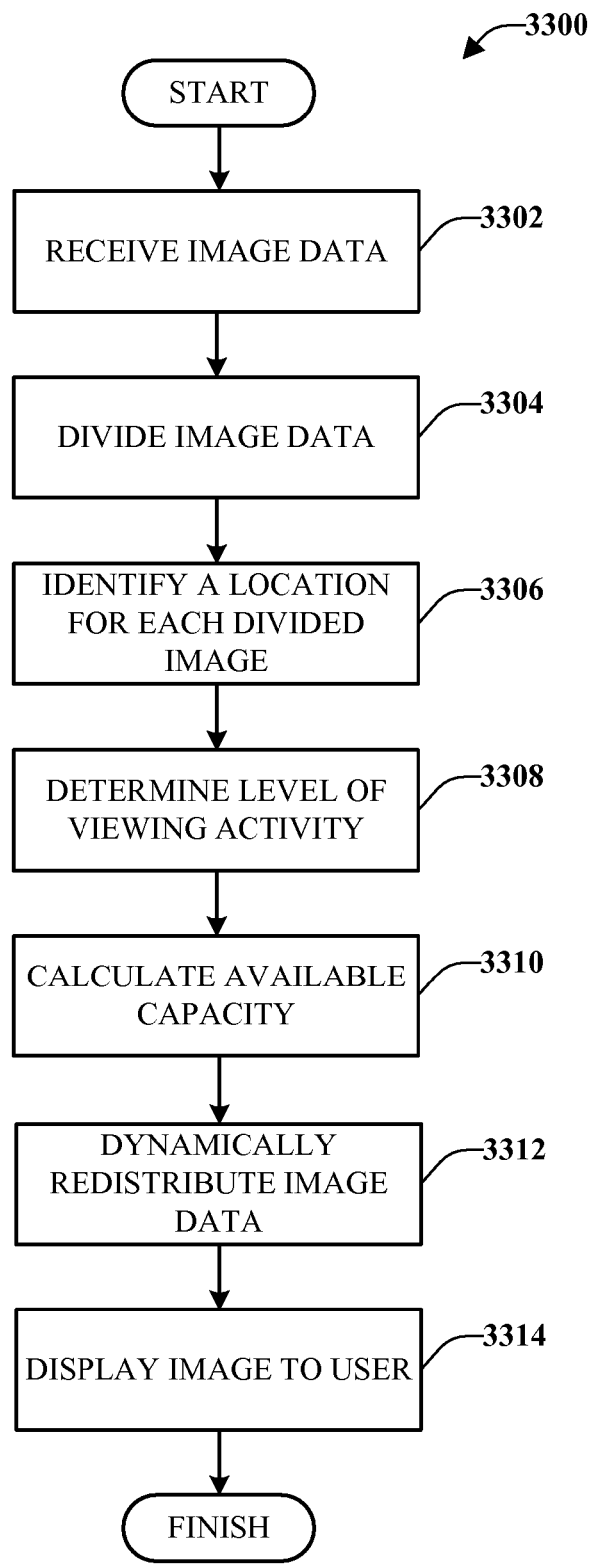
FIG. 33 illustrates a methodology for serving up large images quickly.

With reference now to FIG. 33, illustrated is a methodology 3300 for receiving, maintaining, and serving up large images expeditiously. The method beings at 3302 where image data is received. This image data can be received from a multitude of users and/or entities. The image data is divided or split, at 3304, to render the image in a smaller easier to store form. The image data should be split in at least two quadrants. The image data could be split into an unlimited number of quadrants, depending on the size and complexity of each quadrant. Location information is provided for each portion. At 3306, a location identification is provided for each quadrant to ensure that the quadrants can be reassembled when the image data is to be reformed for seamless viewing by a user.

When one or more user(s) requests a quadrant, a determination is made, at 3308, as the level of web-based viewing activity is associated with each particular quadrant or geographic location. If the number of requests received exceeds a threshold level, indicating the area has turned into a hot spot and the available capacity is calculated, at 3310, to determine if the images associated with the particular geographic location can be provided to the multitude of users at substantially the same time. Based on the calculated available capacity, the data associated with the image data is dynamically redistributed to facilitate providing or displaying such images, at 3314, to the multitude of users at substantially the same time.

The disclosed embodiments can be based on a socioeconomic model comprising a community of users that populate the layers of the map with specific data. The system allows local people to tailor information into the map given the fact that people who live in the area have a superior knowledge of the area than others. These local people are able to tailor the layer information to achieve more accuracy and detail based on the premise that there are a certain number and type of searches conducted among users. For example, the top 3% of searches are for specific things, such as a particular celebrity, category, hot issues, etc. There are also many small groups each making many small result searches, where this set of persons is much larger than the top three percent. For example, there are billions of groups consisting of ten people who care about a specific term and never care about the other "hot" topics. Geography is similar to this and people who live in a neighborhood are the experts about that neighborhood—where to park, where to eat, where to go at 2 a.m., etc.

There can be a weighting average based upon the local people who contribute to the system. A person can also be monitored for content contributions and if such monitoring proves unfavorable the person might no longer be permitted to post data if a determination is made that such person is providing corrupt, misleading, or malicious data. This determination can be based upon data provided by other users or other appropriate means.

Figure 34:
FIG. 34 illustrates an exemplary screen shot of an overlay edit entry that facilitates user entry of comments and other data.
Figure 35:
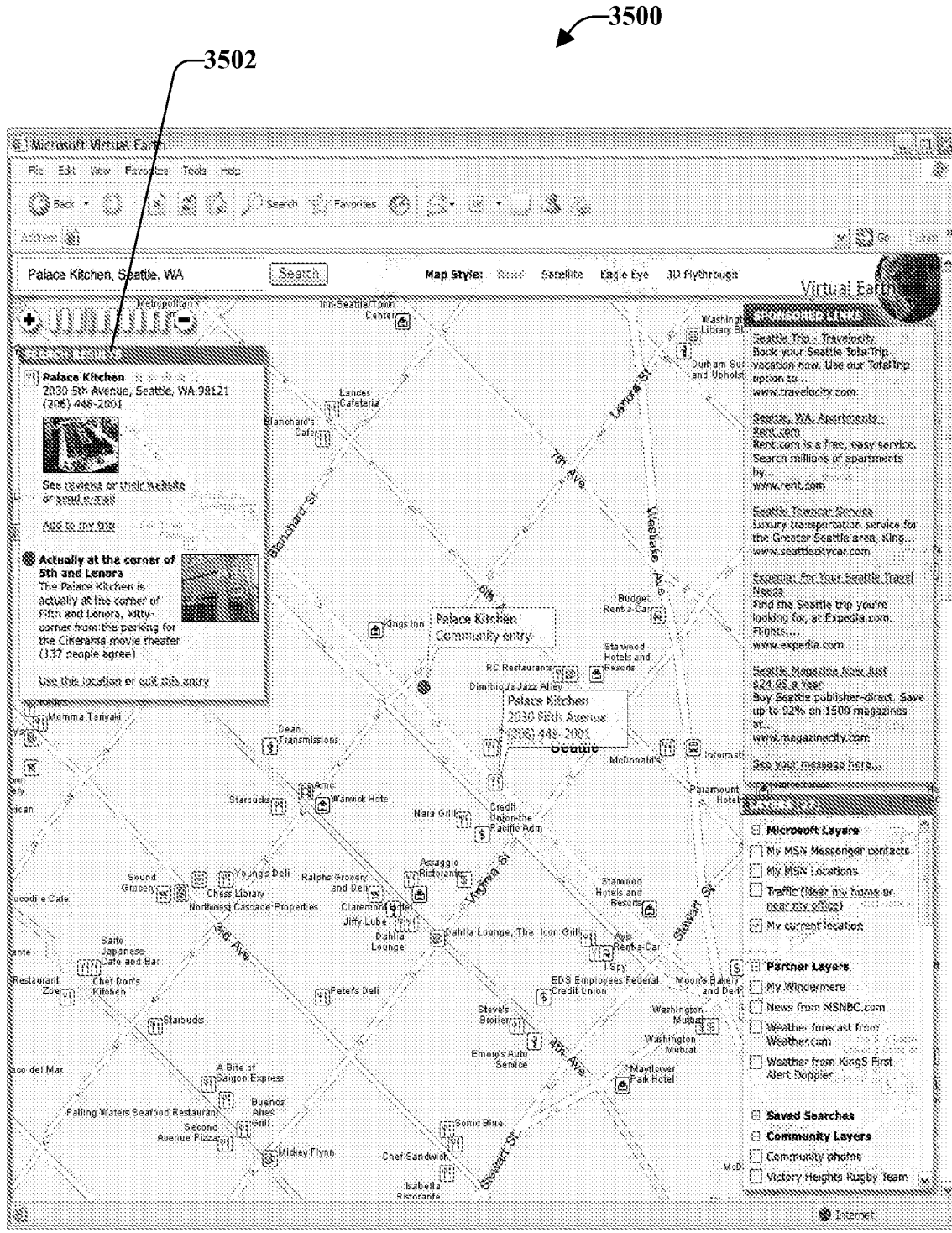
FIG. 35 illustrates an exemplary screen shot of search results.

FIG. 34 illustrates an exemplary screen shot of an overlay edit entry 3400 that facilitates user entry of comments and other data. The controls are translucent and displayed over the map, allowing the map to be viewed under the controls. The controls can include an edit entry 3402 which is an interface through which a user can add information about a particular location, place, thing, etc. The user can submit the edited information, which can be displayed to other users, as shown in FIG. 35, which illustrates an exemplary screen shot of search results 3500. The search results 3502 are provided as a control over the map. In such a manner, other users can see the edit information without the original data being changed. A change can be made to the information if a certain number of users confirm the edit.

Figure 36:
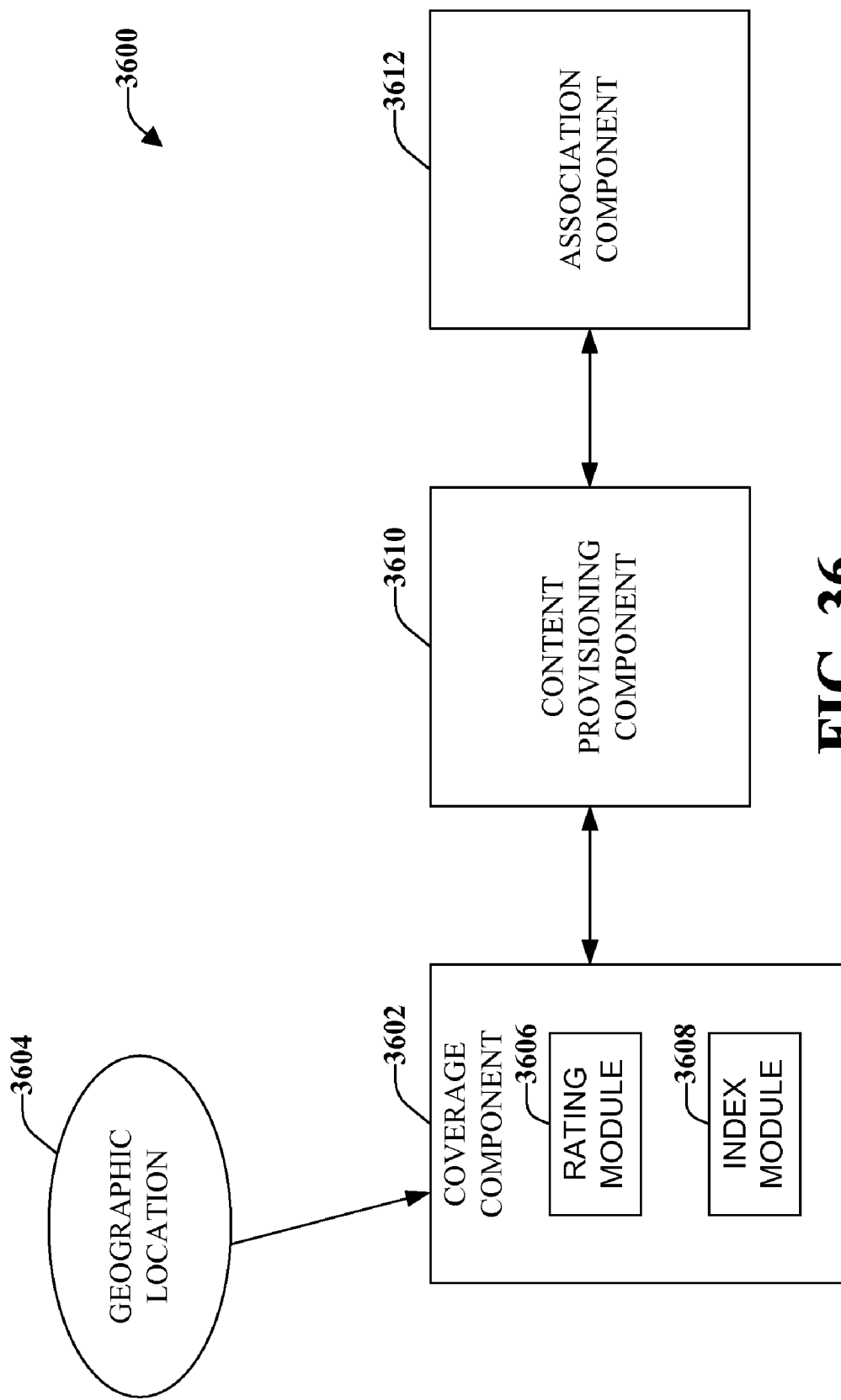
FIG. 36 illustrates a system that facilitates on-line advertising.

With reference now to FIG. 36, illustrated is a system 3600 that facilitates on-line or real-time advertising and can also be referred to as geo-diluted advertising. Geo-diluted advertising is geared toward commercial establishments or others that desire to advertise using the map features and associated geographic area(s), which might be at an extreme the entire world or more focused, such as two city blocks. An advertiser may want to advertise in a specific area and is willing to spend a particular amount of money (e.g., $2.00, $4.00, $10.00, . . . ) per click-through by a user, for example. A coverage component 3602 can be a tool or wizard that creates a layer for the desired geography. The coverage component 3602 receives information relating to advertisement coverage desired by advertisers for a particular geographic location or area 3604. The coverage component 3602 can include a rating module 3606 configured to rate the multitude of advertisers according to a predetermined rating scale. For example, a rating scale may be from 1 to 10 where an advertiser having a rating of 10 has dominance over the area while an advertiser of a 1 rating has a weak advertising position. Advertisers with higher ratings have a greater likelihood of the system displaying their ads for viewing by consumers.

By way of illustration and not limitation, a first advertiser has purchased or "bid on" a particular area, such as a city. A second advertiser, who is a competitor of a first advertiser, can purchase advertising for a much narrower geographic area 3604, such as two city blocks and may be willing to spend a specific amount for advertising, which might be higher than the amount the first advertiser is willing to pay for the same geographic area 3604. The rating module 3606 or tool or wizard can rate the first advertiser and the second advertiser according to the specified areas. In many situations, an advertiser that has a smaller or more narrow or focused area would be rated higher in that area than the advertiser marketing in the wider area. In this way, the localized advertiser would dilute the market allowing such advertiser to compete with larger advertisers.

The diluting occurs when a user zooms into the map or geographic area, or when a user is physically present in an area, then the rating for the smaller advertiser for that moment in time can be greater than the larger advertiser for that area allowing for effective competition. If a user is using a mobile electronic device the map layers can change dynamically while that user is moving around, such as driving, walking, etc. and while physically present in an area.

In an advertising system, similar to system 3600, there can be an index module 3608 that receives bids from advertisers that are bidding in a specific area. The index module 3608 interacts with the coverage component 3602 to rank the advertisers according to the most current bid for each advertiser. Thus, the bidding area for the advertisers can change constantly while allowing the advertisers to immediately see the results of bidding for a specific geographic region or area 3604 and may alter a bid based on the results.

The coverage component 3602 interfaces with a content provisioning component 3610 that provides a variety of image information sources relating to the particular geographic location. The image information sources include mapping details. The image information is displayed to a user physically present in the geographic area or remotely viewing the area.

The association component 3612 associates an advertiser with at least one of the image information sources that includes mapping information regarding points of interest in a particular geographic region. The association component 3612 facilitates the advertiser employing image information with the associated mapping information. The association component 3612 can further track or monitor the advertisements that are displayed to a multitude of users and can submit the monitored data to the advertiser. This can be accomplished by auto refreshing a display associated with the user device. This facilitates the advertiser compensating the associated source related to the mapping information for use of the image data.

The association component 3612 can monitor a user activity and tailor which advertisement is displayed based on whether the user is physically in the designated geographic location 3604 or remotely visiting the area. The advertisement displayed can be different or tailored for each situation. Further, the association component 3612 can tailor the advertisement based on a user preference. For example, the user may specify which types of advertisements the user would like and which advertisement types the user prefers not to receive. The association component 3612 can tailor the advertisement displayed to each user based on the user preference and/or the user location.

Figure 37:
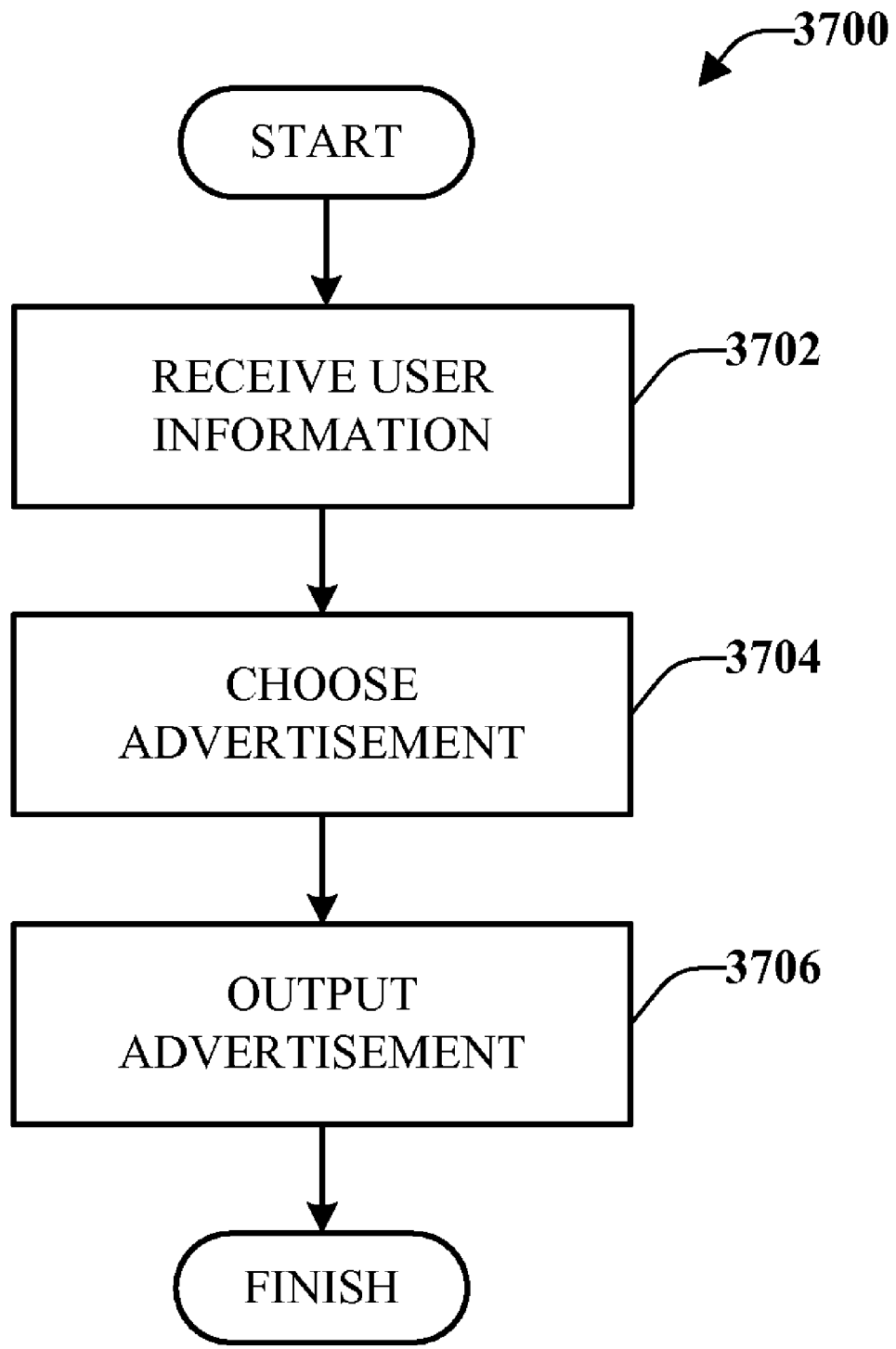
FIG. 37 illustrates a methodology for providing real-time advertising data.

FIG. 37 illustrates a methodology 3700 for providing real-time advertising data. The method starts at 3702 with receipt of user information that can be a user location information. The location of the user can be provided through GPS functionality or other location means. For example, the method can periodically or continually query for user location information while the user is known to be in a particular location, such as a retail shopping mall or outlet. The user information received, at 3702, can additionally or alternatively, relate to a user preference. The user preference can be established by the user through a user interface. The user preference can be determined by other means including obtaining information concerning stores, restaurants, or other places visited by the user.

The method 3700 continues, at 3704, when an advertisement is chosen. This advertisement can be chosen based in part on the user location. For example, when a user is within the vicinity of a retail establishment, a choice can be made to send an advertisement from the retail establishment. The method discriminates between a remote user and a user who is physically present in the geographic area and different advertisements can be output based on the user location status. The choice of advertisement can additionally or alternatively be tailored based on the received user preference.

Choosing the advertisement at 3704 can also include receiving from a multitude of advertisers a request to advertise in a particular geographic area. A determination is made as to which advertiser has priority in the particular geographic area. The priority can be set by determining a coverage area and ranking the advertiser based in part on the coverage area. The advertisement of the advertiser that has priority is output if it matches the user location information. Ranking can also be based on association diluting that is a product of the user's location The advertisement chosen is output to the user at 3706. For example, a user walking in a mall can receive a geo-coupon for 20% off in a store for the next 20 minutes. If the user leaves the area (or if 20 minutes passes) the coupon automatically expires. The disclosed systems and methods provide better targeting of ads with buyers specifying regions that they want their ads to display or when someone is searching for a particular event, place, within a predefined geographic area.

The advertisement output at 3706 can be changed based on a monitored user location. A user display can be automatically updated or refreshed if a determination is made that the advertisement displayed to the user should be changed. In addition, if the user leaves the area, the advertisement can be automatically removed from the user display, through a refresh process.

Figure 38:
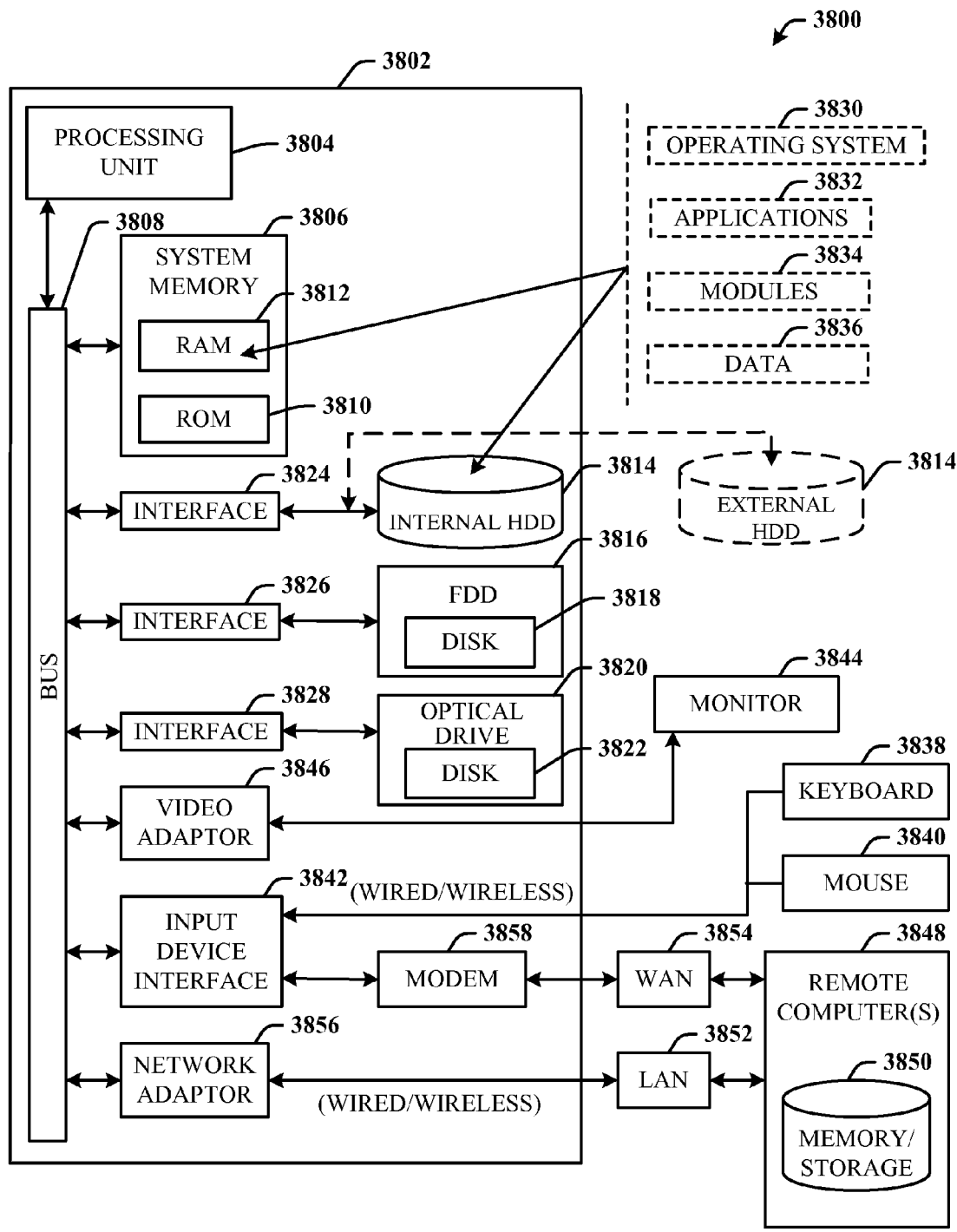
FIG. 38 illustrates a block diagram of a computer operable to execute the disclosed embodiments.

Referring now to FIG. 38, there is illustrated a block diagram of a computer operable to execute the disclosed architecture. In order to provide additional context for various aspects disclosed herein, FIG. 38 and the following discussion are intended to provide a brief, general description of a suitable computing environment 3800 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 38, the exemplary environment 3800 for implementing various aspects includes a computer 3802, the computer 3802 including a processing unit 3804, a system memory 3806 and a system bus 3808. The system bus 3808 couples system components including, but not limited to, the system memory 3806 to the processing unit 3804. The processing unit 3804 can be any of various commercially available processors. Dual microprocessors and other multi-processor architectures may also be employed as the processing unit 3804.

The system bus 3808 can be any of several types of bus structure that may further interconnect to a memory bus (with or without a memory controller), a peripheral bus, and a local bus using any of a variety of commercially available bus architectures. The system memory 3806 includes read-only memory (ROM) 3810 and random access memory (RAM) 3812. A basic input/output system (BIOS) is stored in a non-volatile memory 3810 such as ROM, EPROM, EEPROM, which BIOS contains the basic routines that help to transfer information between elements within the computer 3802, such as during start-up. The RAM 3812 can also include a high-speed RAM such as static RAM for caching data.

The computer 3802 further includes an internal hard disk drive (HDD) 3814 (e.g., EIDE, SATA), which internal hard disk drive 3814 may also be configured for external use in a suitable chassis (not shown), a magnetic floppy disk drive (FDD) 3816, (e.g., to read from or write to a removable diskette 3818) and an optical disk drive 3820, (e.g., reading a CD-ROM disk 3822 or, to read from or write to other high capacity optical media such as the DVD). The hard disk drive 3814, magnetic disk drive 3816 and optical disk drive 3820 can be connected to the system bus 3808 by a hard disk drive interface 3824, a magnetic disk drive interface 3826 and an optical drive interface 3828, respectively. The interface 3824 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 3802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 3812, including an operating system 3830, one or more application programs 3832, other program modules 3834 and program data 3836. All or portions of the operating system, applications, modules, and/or data can also be cached in the RAM 3812. It is appreciated that the various embodiments can be implemented with various commercially available operating systems or combinations of operating systems.

A user can enter commands and information into the computer 3802 through one or more wired/wireless input devices, e.g. a keyboard 3838 and a pointing device, such as a mouse 3840. Other input devices (not shown) may include a microphone, an IR remote control, a joystick, a game pad, a stylus pen, touch screen, or the like. These and other input devices are often connected to the processing unit 3804 through an input device interface 3842 that is coupled to the system bus 3808, but can be connected by other interfaces, such as a parallel port, an IEEE 1394 serial port, a game port, a USB port, an IR interface, etc.

A monitor 3844 or other type of display device is also connected to the system bus 3808 through an interface, such as a video adapter 3846. In addition to the monitor 3844, a computer typically includes other peripheral output devices (not shown), such as speakers, printers, etc.

The computer 3802 may operate in a networked environment using logical connections through wired and/or wireless communications to one or more remote computers, such as a remote computer(s) 3848. The remote computer(s) 3848 can be a workstation, a server computer, a router, a personal computer, portable computer, microprocessor-based entertainment appliance, a peer device or other common network node, and typically includes many or all of the elements described relative to the computer 3802, although, for purposes of brevity, only a memory/storage device 3850 is illustrated. The logical connections depicted include wired/wireless connectivity to a local area network (LAN) 3852 and/or larger networks, e.g. a wide area network (WAN) 3854. Such LAN and WAN networking environments are commonplace in offices and companies, and facilitate enterprise-wide computer networks, such as intranets, all of which may connect to a global communications network, e.g., the Internet.

When used in a LAN networking environment, the computer 3802 is connected to the local network 3852 through a wired and/or wireless communication network interface or adapter 3856. The adaptor 3856 may facilitate wired or wireless communication to the LAN 3852, which may also include a wireless access point disposed thereon for communicating with the wireless adaptor 3856.

When used in a WAN networking environment, the computer 3802 can include a modem 3858, or is connected to a communications server on the WAN 3854, or has other means for establishing communications over the WAN 3854, such as by way of the Internet. The modem 3858, which can be internal or external and a wired or wireless device, is connected to the system bus 3808 by the serial port interface 3842. In a networked environment, program modules depicted relative to the computer 3802, or portions thereof, can be stored in the remote memory/storage device 3850. It will be appreciated that the network connections shown are exemplary and other means of establishing a communications link between the computers can be used.

The computer 3802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 39:
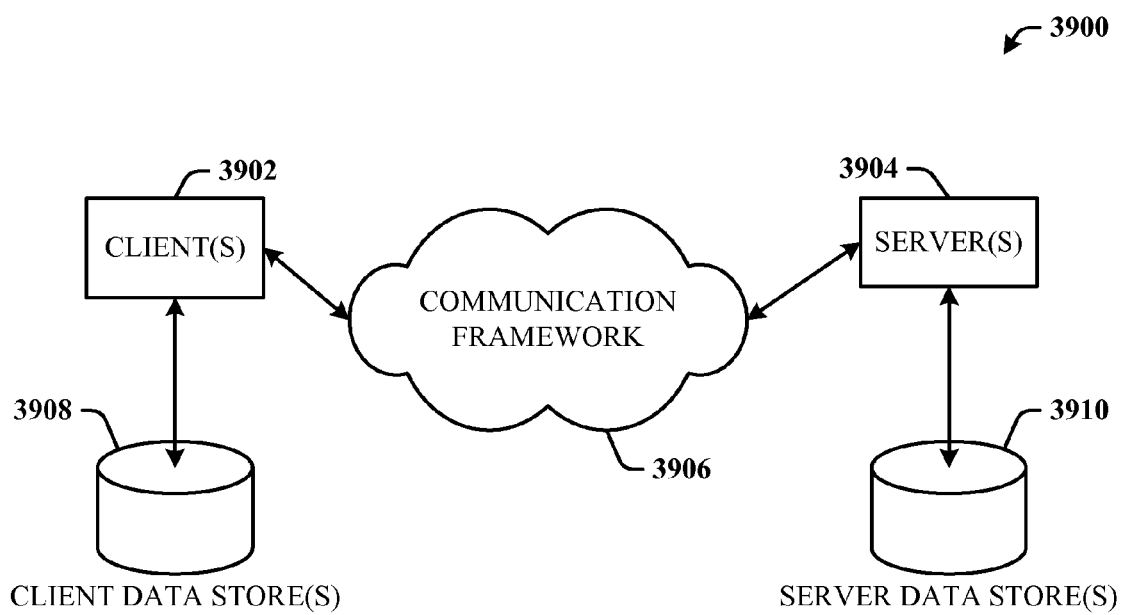
FIG. 39 illustrates a schematic block diagram of an exemplary computing environment operable to execute the disclosed embodiments.

Referring now to FIG. 39, there is illustrated a schematic block diagram of an exemplary computing environment 3900 in accordance with the various embodiments. The system 3900 includes one or more client(s) 3902. The client(s) 3902 can be hardware and/or software (e.g., threads, processes, computing devices). The client(s) 3902 can house cookie(s) and/or associated contextual information by employing the various embodiments, for example.

The system 3900 also includes one or more server(s) 3904. The server(s) 3904 can also be hardware and/or software (e.g., threads, processes, computing devices). The servers 3904 can house threads to perform transformations by employing the various embodiments, for example. One possible communication between a client 3902 and a server 3904 can be in the form of a data packet adapted to be transmitted between two or more computer processes. The data packet may include a cookie and/or associated contextual information, for example. The system 3900 includes a communication framework 3906 (e.g., a global communication network such as the Internet) that can be employed to facilitate communications between the client(s) 3902 and the server(s) 3904.

Communications can be facilitated through a wired (including optical fiber) and/or wireless technology. The client(s) 3902 are operatively connected to one or more client data store(s) 3908 that can be employed to store information local to the client(s) 3902 (e.g., cookie(s) and/or associated contextual information). Similarly, the server(s) 3904 are operatively connected to one or more server data store(s) 3910 that can be employed to store information local to the servers 3904.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for dynamically rendering a map as a function of a user parameter, comprising:

one or more processors executing computer-executable instructions that, when executed, provide components comprising:

a map retrieval component that is configured to receive a request for a web-based map from a first user, and to obtain a specific map geographic area responsive to the request for the web-based map;

a map annotation component that dynamically captures one or more visual annotations made to a web-based map presented to a second user, each user visual annotation being associated with a specific map geographic area;

a user authorization component configured to authorize sharing visual annotations captured from the second user with one or more other users;

an annotation sharing component configured to share visual annotations from the second user with one or more other users based on associated authorizations;

a map annotation stitching component that associates a captured visual annotation with a specific map geographic area;

an annotation selection component that selects one or more annotations for display from shared visual annotations based on information relating to a current position of a second user identified in a contact database of the first user, and that tailors the requested web-based map based on the selected annotations; and a rendering component that displays the tailored web-based map to the first user.

2. The system of claim 1, the rendering component obtains the specific map geographic area and related information from one or more remote servers.

3. The system of claim 1, further comprising a machine learning component that infers information relating to user annotations.

4. A method for dynamically rendering a map as a function of a user parameter, comprising:

receiving, by a map retrieval component, a request for a web-based map from a first user;

obtaining, by a map retrieval component, a specific map geographic area responsive to the request for the web-based map;

dynamically capturing, by a map annotation component, one or more visual annotations made to a web-based map presented to a second user, each user visual annotation being associated with a specific map geographic area;

authorizing, by a user authorization component, sharing visual annotations captured from the second user with one or more other users;

sharing, by an annotation sharing component, visual annotations from the second user with one or more other users based on associated authorizations;

associating, by a stitching component, a captured visual annotation with a specific map geographic area;

selecting, by an annotation selection component, one or more annotations for display from shared visual annotations based on information relating to a current position of the second user, the second user being identified in a contact database of the first user, tailoring, by an annotation selection component, the requested web-based map based on the selected annotations; and displaying, by a rendering component, the tailored web-based map to the first user.

* * * * *